(12) United States Patent
Sveum et al.

(10) Patent No.: US 11,565,895 B2
(45) Date of Patent: Jan. 31, 2023

(54) APPARATUS AND METHODS FOR SENSING VEHICLE POSITIONING AND VEHICLE RESTRAINT MOVEMENT

(71) Applicant: RITE-HITE HOLDING CORPORATION, Milwaukee, WI (US)

(72) Inventors: Matthew Sveum, Wauwatosa, WI (US); Alan Mushynski, Brookfield, WI (US); Jason Senfleben, Hartford, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 31 days.

(21) Appl. No.: 16/785,212

(22) Filed: Feb. 7, 2020

(65) Prior Publication Data

US 2020/0255234 A1    Aug. 13, 2020

Related U.S. Application Data

(60) Provisional application No. 62/803,033, filed on Feb. 8, 2019.

(51) Int. Cl.
*B65G 69/00* (2006.01)
*B65G 67/20* (2006.01)

(52) U.S. Cl.
CPC .................... *B65G 67/20* (2013.01)

(58) Field of Classification Search
CPC .................................................. B65G 69/003
See application file for complete search history.

(56) References Cited

U.S. PATENT DOCUMENTS

| | | | |
|---|---|---|---|
| 4,648,781 A | 3/1987 | Sikora | |
| 7,384,229 B2* | 6/2008 | Gleason | B65G 69/003 |
| | | | 414/401 |
| 8,065,770 B2* | 11/2011 | Proffitt | B65G 69/003 |
| | | | 14/69.5 |
| 9,481,531 B2* | 11/2016 | Stone | B65G 69/003 |
| 9,776,511 B2* | 10/2017 | Brooks | B60K 35/00 |
| 10,106,342 B2* | 10/2018 | Avalos | B60Q 9/00 |
| 2008/0095598 A1 | 4/2008 | Cotton et al. | |
| 2015/0191319 A1 | 7/2015 | Muhl et al. | |

(Continued)

FOREIGN PATENT DOCUMENTS

| | | |
|---|---|---|
| EP | 0369106 | 5/1990 |
| EP | 1321398 | 6/2003 |
| WO | 2018226422 | 12/2018 |

OTHER PUBLICATIONS

International Searching Authority, "International Search Report," issued in connection with International Patent Application No. PCT/2020/017274, dated May 14, 2020, 7 pages.

(Continued)

*Primary Examiner* — Mark C Hageman
(74) *Attorney, Agent, or Firm* — Hanley, Flight & Zimmerman, LLC

(57) ABSTRACT

Methods, apparatus, systems and articles of manufacture are disclosed for sensing RIG positioning and vehicle restraint movement. An example method includes determining a presence of a RIG and enabling a barrier to move to an operational position when the RIG is present.

19 Claims, 39 Drawing Sheets

(56) References Cited

U.S. PATENT DOCUMENTS

| | | | | |
|---|---|---|---|---|
| 2015/0217951 A1* | 8/2015 | Lessard | ............... | B65G 69/28 |
| | | | | 414/401 |
| 2015/0239686 A1 | 8/2015 | Stone et al. | | |
| 2020/0299076 A1* | 9/2020 | Yule | ................ | B65G 69/003 |

OTHER PUBLICATIONS

International Searching Authority, "Written Opinion," issued in connection with International Patent Application No. PCT/2020/017274, dated May 14, 2020, 9 pages.

IP Australia, "Examination Report", issued in connection with AU Patent Application No. 2020219806 dated Jul. 20, 2022, 3 pages.

Canadian Intellectual Property Office, "Examination Report", issued in connection with Canadian Patent Application No. 3,126,241 dated Nov. 7, 2022, 12 pages.

\* cited by examiner

APPARATUS AND METHODS FOR SENSING VEHICLE POSITIONING AND VEHICLE RESTRAINT MOVEMENT

RELATED APPLICATION

This patent claims the benefit under 35 U.S.C. § 119(e) of U.S. Provisional Patent Application Ser. No. 62/803,033 entitled, "Apparatus and Methods for Sensing Vehicle Positioning and Vehicle Restraint Movement," which was filed on Feb. 8, 2019, and is hereby incorporated by reference in its entirety.

FIELD OF THE DISCLOSURE

This disclosure relates generally to vehicle restraints for loading docks and, more particularly, to apparatus and methods for sensing RIG positioning and vehicle restraint movement.

BACKGROUND

To restrain a vehicle from accidentally moving too far away from a loading dock during loading and/or unloading a vehicle (e.g., a truck, trailer, etc.) parked at a loading dock, a hook-style vehicle restraint is often employed to engage an Interstate Commerce Commission bar (ICC bar) or rear impact guard (RIG) of the vehicle. An ICC bar or RIG includes a bar or beam that extends horizontally across the rear of a vehicle, below the bed of the truck or trailer. To release the vehicle, the restraint moves to a lowered position clear of the RIG. Sometimes, however, forward pressure from the vehicle can cause the hook to catch on the RIG and prevent the hook from retracting to a position (e.g., a fully stored position) that is clear of the RIG. Such a condition, if recognized by the driver of the vehicle, is remedied by what is known as a "bump-back," a process during which the vehicle backs up slightly toward a dock face of the loading dock to release the pressure from the hook and, thus, allow the hook to retract to a position clear of the hook.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
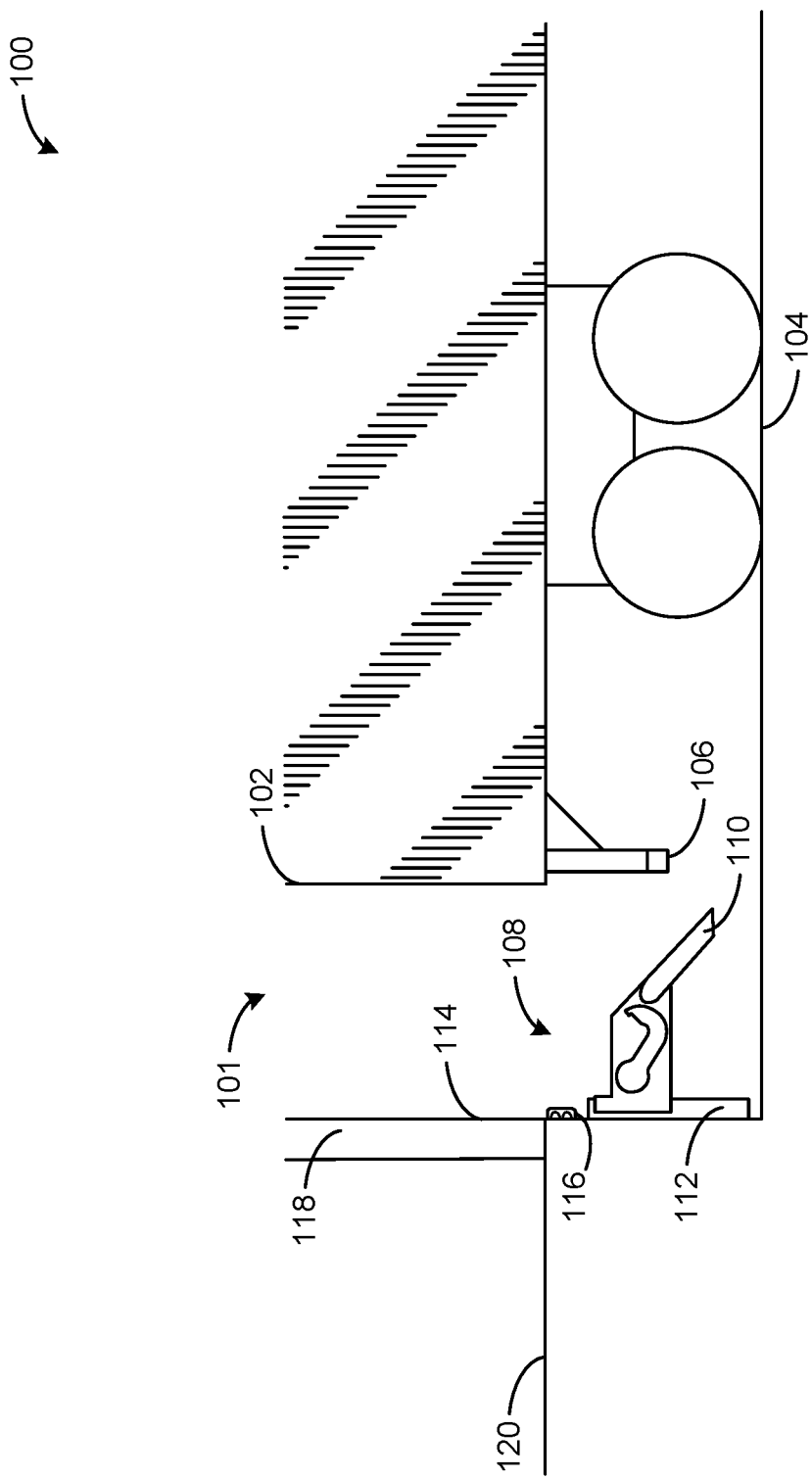
FIG. 1 is a side view of an example loading dock including an example vehicle restraint system constructed in accordance with teachings disclosed herein.

Vehicle restraint systems secure vehicles at loading docks during loading and/or unloading operations. Typically, as a driver backs a vehicle toward the vehicle restraint system, the driver may have relatively little information about a position of the vehicle relative to the vehicle restraint system. For example, the driver may have to rely on information from an operator at the loading dock who is watching the vehicle approaching the loading dock doorway. Therefore, in conventional approaches, a manual operator and/or driver observation is required to ensure the vehicle is properly positioned prior to activating a barrier of a vehicle restraint system. Specifically, a position of the RIG relative to the barrier can be observed to determine or verify whether the barrier can engage and secure the RIG and, thereby, prevent forward movement of the vehicle. However, in some examples, a driver and/or operator can inaccurately determine the position of the RIG relative to the dock. In some examples, the barrier can be damaged if it is commanded to actuate to engage the RIG while the RIG is positioned over an end portion of the barrier.

In some instances, a vehicle can move backward (e.g., toward a dock face wall) when a barrier of the vehicle restraint system is engaged with a RIG of a vehicle, thereby causing the RIG to separate or move away from the barrier. This can result in undesired movement of the vehicle during loading and/or unloading operations.

In some conventional implementations utilizing a rotating-hook style of barrier, the barrier may not be able to release the RIG (e.g., due to geometry of the hook) when a vehicle is positioned at an outer limit of the barrier's operational range. In some such examples, a driver of the vehicle has to "bump-back," or move the vehicle closer to the dock face wall, in order to allow the barrier to clear the RIG and move to a stored, lowered position. In some instances, a driver and/or operator can visually inspect a position of the barrier and the RIG to determine whether the vehicle needs to be bumped-back prior to disengaging the barrier from the RIG.

Examples methods, apparatus, systems, and articles of manufacture (e.g., physical storage media) disclosed herein determine and/or analyze characteristic(s) of a vehicle restraint system and/or a RIG of a vehicle secured by the vehicle restraint system. To determine or analyze the characteristic(s) the vehicle restraint system of the illustrated examples employs a horizontal RIG sensor, a vertical RIG sensor, a barrier sensor, and/or a vertical movement sensor. By utilizing data from one or more of these sensors, a controller associated with the vehicle restraint system can enable and/or disable actuation of the barrier to the operational position when the RIG is determined to be positioned such that the barrier can be actuated to secure the RIG. Further, the example vehicle restraint system disclosed herein can issue alerts to a driver and/or an operator to bump-back the vehicle, and/or issue alerts (e.g., audio and/or visual signals) to indicate whether the barrier is in an operational position, a stored position, whether the barrier can engage or disengage the RIG, whether the barrier is in engagement with the RIG, etc.

In some examples, example vehicle restraint systems disclosed herein include one or more horizontal RIG sensor(s) to sense a position of the RIG relative to a dock face wall (e.g., the RIG has moved closer to the dock face wall). In some examples, example vehicle restraint systems disclosed herein include one or more horizontal RIG sensor(s) to sense if the barrier is in direct contact with the RIG. In some examples, example vehicle restraint systems disclosed herein include one or more controller(s) to command the barrier to actuate (e.g., rotate) to ensure the barrier remains engaged with the RIG during a loading and unloading operation. In some examples, vehicle restraint systems disclosed herein include one or more example horizontal RIG sensor(s) to sense if a RIG is at an outer operating range of the barrier. In some such examples, example controller(s) disclosed herein can activate an alert to inform a driver to bump-back the vehicle prior to disengaging the barrier.

In some example methods, apparatus, systems, and articles of manufacture (e.g., physical storage media) disclosed herein, example vehicle restraint systems employ one or more vertical RIG sensor(s) to detect whether a position of the RIG interferes with an actuation path or envelope of a barrier of the vehicle restraint system.

Some example vehicle restraint systems disclosed herein employ one or more the vertical RIG sensor(s) in coordination with horizontal RIG sensor(s). For example, vehicle restraint systems disclosed herein actuate a barrier from a stored position to an operational position when: (1) the vertical RIG sensor first senses a RIG (e.g., indicating an interference) and then subsequently no longer senses the RIG, and (2) the horizontal RIG sensor measures or senses a decrease in distance between the RIG and the horizontal RIG sensor.

In some example methods, apparatus, systems, and articles of manufacture (e.g., physical storage media) disclosed herein, example vehicle restraint system(s) employ one or more barrier sensor(s) to detect whether the barrier of the vehicle restraint system experiences a fault prior to moving to an operational position (e.g., a "lower" fault) or experiences a fault by moving beyond an upper operational position limit (e.g., an upper fault).

In some example methods, apparatus, systems, and articles of manufacture (e.g., physical storage media) disclosed herein, example vehicle restraint system(s) employ one or more vertical movement sensor(s) to collect data pertaining to positional height values of the vehicle restraint system during loading/unloading operations. In some examples, a vertical movement sensor can be used to calculate speed data of the vehicle restraint system moving in the vertical direction during loading/unloading operations. In some examples, an example controller disclosed herein can analyze data from the vertical movement sensor(s) to detect if a landing gear collapse has occurred, if the vehicle is loaded with excess weight in the rear of the vehicle, if the vehicle restraint system returns to a desired "home" position when not in use, if springs and/or other components of the vehicle restraint system require repair, as well as to generate, in tandem with data from the other sensors, an accurate profile of the movement of the example vehicle restraint system(s) during loading and unloading operations. For example, the example controller(s) disclosed herein can analyze data from the vertical movement sensor(s) to determine if the vehicle restraint system moved down (e.g., toward the driveway) too quickly, and/or if the springs of the vehicle restraint system require maintenance. In other examples, data from any other sensors can be collected to map, analyze, and/or profile any other aspect(s) of the vehicle and/or the vehicle restraint system during loading/unloading operations.

As used herein, an Interstate Commerce Commission bar (ICC bar) and rear impact guard (RIG) of the vehicle mean an underride guard designed to withstand the force of a crash to prevent a car from sliding under a truck ICC bar, RIG and underride guard are used interchangeably herein.

FIG. 1 is an example side view of an example loading dock 100 including a loading bay 101 having an example vehicle restraint system 108 constructed in accordance with teachings disclosed herein. The vehicle restraint system 108 of the illustrated example restrains an example vehicle 102 to the loading dock 100 when the vehicle 102 is parked at the loading bay 101 of the loading dock 100 during loading and/or unloading operations. In some examples, the loading dock 100 can include a plurality of loading bays (e.g., similar to the loading bay 101).

The example vehicle 102 can be a truck, trailer, and/or any other vehicle that includes a RIG 106. In operation, the vehicle 102 approaches the vehicle restraint system 108 on a driveway 104 of the loading dock 100 with a rear end of the vehicle 102 oriented toward the vehicle restraint system 108.

The vehicle restraint system 108 of the illustrated example is positioned at an initial position (e.g., a first height relative to the driveway 104) when not in use, and moves (e.g., in the vertical direction) to adjust to an operation position (e.g., a second height relative to the driveway 104) when engaged by the vehicle 102. For example, the vehicle restraint system 108 of the illustrated example includes a ramp 110 to receive the RIG 106 of the vehicle 102, which (e.g., directly) contacts the vehicle restraint system 108 and pushes the vehicle restraint system 108 in a downward direction in the orientation of FIG. 1. The vehicle restraint system 108 of the illustrated example is mounted on a track 112, which restricts motion of the vehicle restraint system 108 to the vertical direction. The vehicle restraint system 108 of the illustrated example is mounted to the dock face wall 114 via the track 112. Additionally, the loading dock 100 of the illustrated example includes an example dock bumper 116 coupled to the dock face wall 114, which can absorb an impact from the vehicle 102 backing into the dock face wall 114. In some examples, a driver can back up the vehicle 102 to contact the dock bumper 116 during a bump-back operation. Once the vehicle 102 is in a position to enable locking, a hook and/or other element of the vehicle restraint system 108 secures the vehicle 102. After the vehicle 102 is secured, a doorway 118 of the example loading dock 100 can be utilized for operators to load and/or unload the vehicle 102, which is at a height similar to a platform 120 of the building.

Figure 2A:
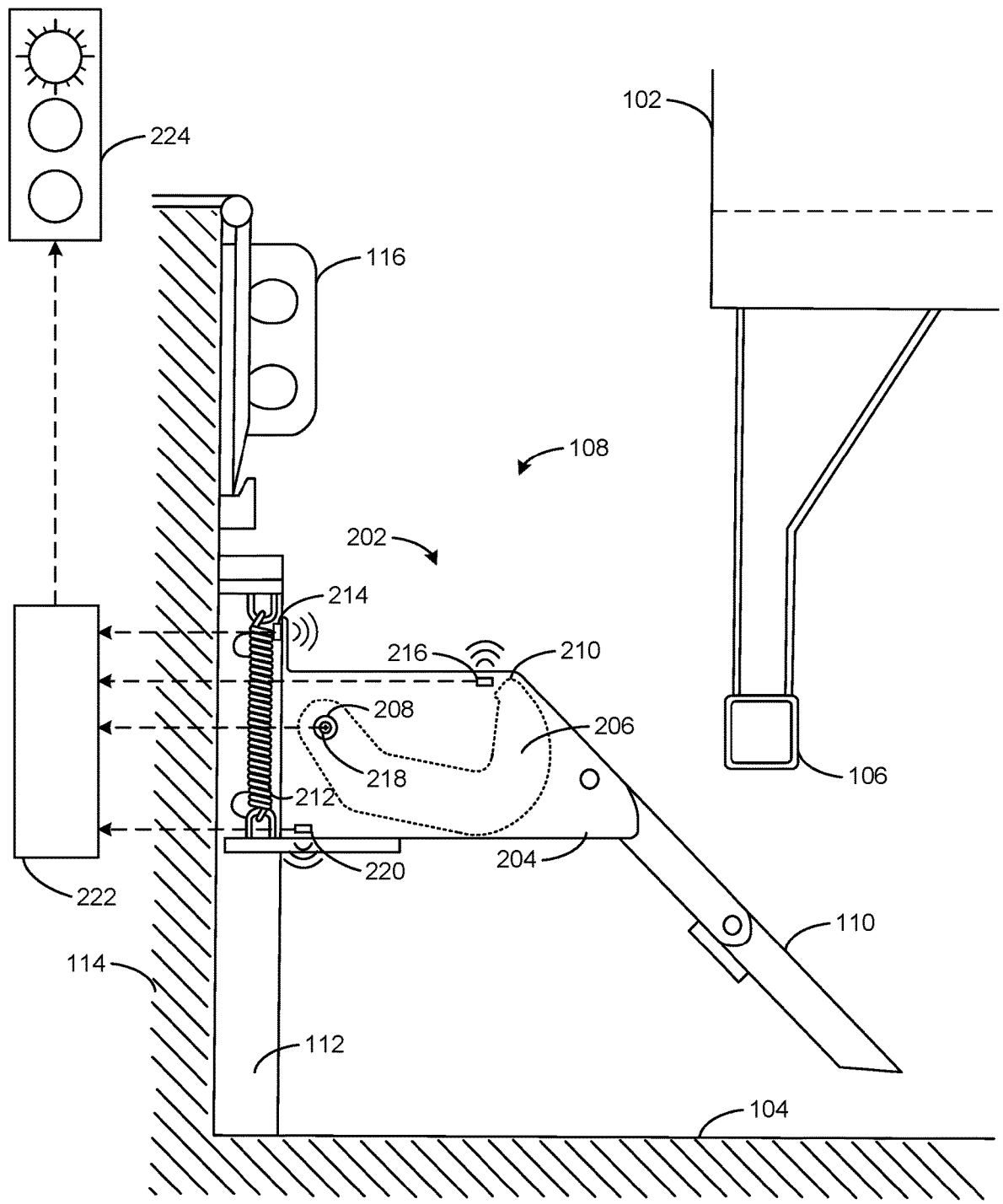
FIG. 2A is a detailed schematic, side view of the vehicle restraint system of FIG. 1 including an example horizontal RIG sensor, an example vertical RIG sensor, an example barrier sensor, an example vertical movement sensor, and an example controller disclosed herein.

FIG. 2A is a detailed schematic side view of the vehicle restraint system 108 of FIG. 1. The vehicle restraint system 108 of the illustrated example includes an example main body 202 having a first plate 204 and a second plate 226 (FIG. 2B) opposite the first plate 204. The example main body 202 of the illustrated example is a primary portion of the vehicle restraint system 108 that is in contact with the RIG 106 of the vehicle 102 when the vehicle 102 is restrained by the vehicle restraint system 108. The main body 202 of the illustrated example is directly connected to the ramp 110, enabling forces applied to the ramp 110 by the RIG 106 to transfer to the main body 202.

The main body 202 of the vehicle restraint system 108 of the illustrated example is connected to an example spring 212 to allow the main body 202 to translate or move in a vertical direction (e.g., perpendicular to the driveway 104 in the orientation of FIG. 2) to adapt to vehicles having different heights. The spring 212 of the illustrated example is attached to a portion of the main body 202 at a first end and to a portion of the track 112 at a second end opposite the first end. Thus, the second end of the spring 212 extends and compresses relative to the track 112, allowing movement of the main body 202 of the vehicle restraint system 108. When the RIG 106 contacts the ramp 110 as the vehicle 102 moves toward the dock face wall 114, a force applied in the vertical direction causes the main body 202 to translate in a substantially vertical direction in opposition to a spring force of the spring 212. As used herein, "vertical" refers to the direction substantially or approximately perpendicular (e.g., perpendicular within plus or minus ten degrees) or perfectly perpendicular to the driveway 104. As used herein, "horizontal" refers to the direction substantially or approximately parallel (e.g., parallel within plus or minus ten degrees) or perfectly parallel relative to the driveway 104.

The vehicle restraint system 108 of the illustrated example includes an example barrier 206 that is connected (e.g., rotatable) to the main body 202 via an example shaft 208. The barrier 206 of the illustrated example rotates between a stored position (e.g., as shown in FIG. 2A) and an operational position (e.g., a raised position relative to the main body 202). The operational position of the illustrated example includes a plurality of operational positions (e.g., as shown in FIGS. 8-16, 17A, 17B and 17C). To rotate the barrier 206, the vehicle restraint system 108 includes a drive system or transmission driven by a motor located in a motor housing 209. Rotation of the shaft in a first rotational direction causes the barrier 206 to rotate in the first rotational direction (e.g., a counterclockwise direction in the orientation of FIG. 2A) and rotation of the shaft 20 in a second rotational direction causes the barrier 206 to rotate in a second rotational direction (e.g., a clockwise direction in the orientation of FIG. 2A) opposite the first rotational direction. The barrier 206 of the illustrated example includes a distal end 210 that extends above the RIG 106 when the barrier 206 is in an operational position. The example barrier 206 of the vehicle restraint system 108 of the illustrated example is a hook that is rotatable around the shaft 208 to entrap and/or engage the RIG 106 of the vehicle 102. The barrier 206 of the illustrated example is disposed between the first plate 204 and the second plate 226 (FIG. 2B) of the main body 202. In some examples, the barrier 206 can have a different shape and/or move differently than the barrier 206 (e.g., the barrier 206 can be an obstruction that merely translates to entrap the RIG 106, an obstruction that rotates and translates to entrap the RIG 106, etc.).

The vehicle restraint system 108 of the illustrated example includes an example horizontal RIG sensor 214, an example vertical RIG sensor 216, an example barrier sensor 218 (e.g., a rotational sensor), and an example vertical movement sensor 220. The vehicle restraint system 108 of the illustrated example additionally includes an example controller 222 to receive signals from the horizontal RIG sensor 214, the vertical RIG sensor 216, the barrier sensor 218, the vertical movement sensor 220, and any other sensor(s), and to output control signal(s). The vehicle restraint system 108 of the illustrated example further includes an example alert device 224, configured to receive the control signal(s) from the controller 222 and issue alerts corresponding to different operational states of the vehicle restraint system 108 and/or different condition(s) of the loading dock 100.

Figure 2B:
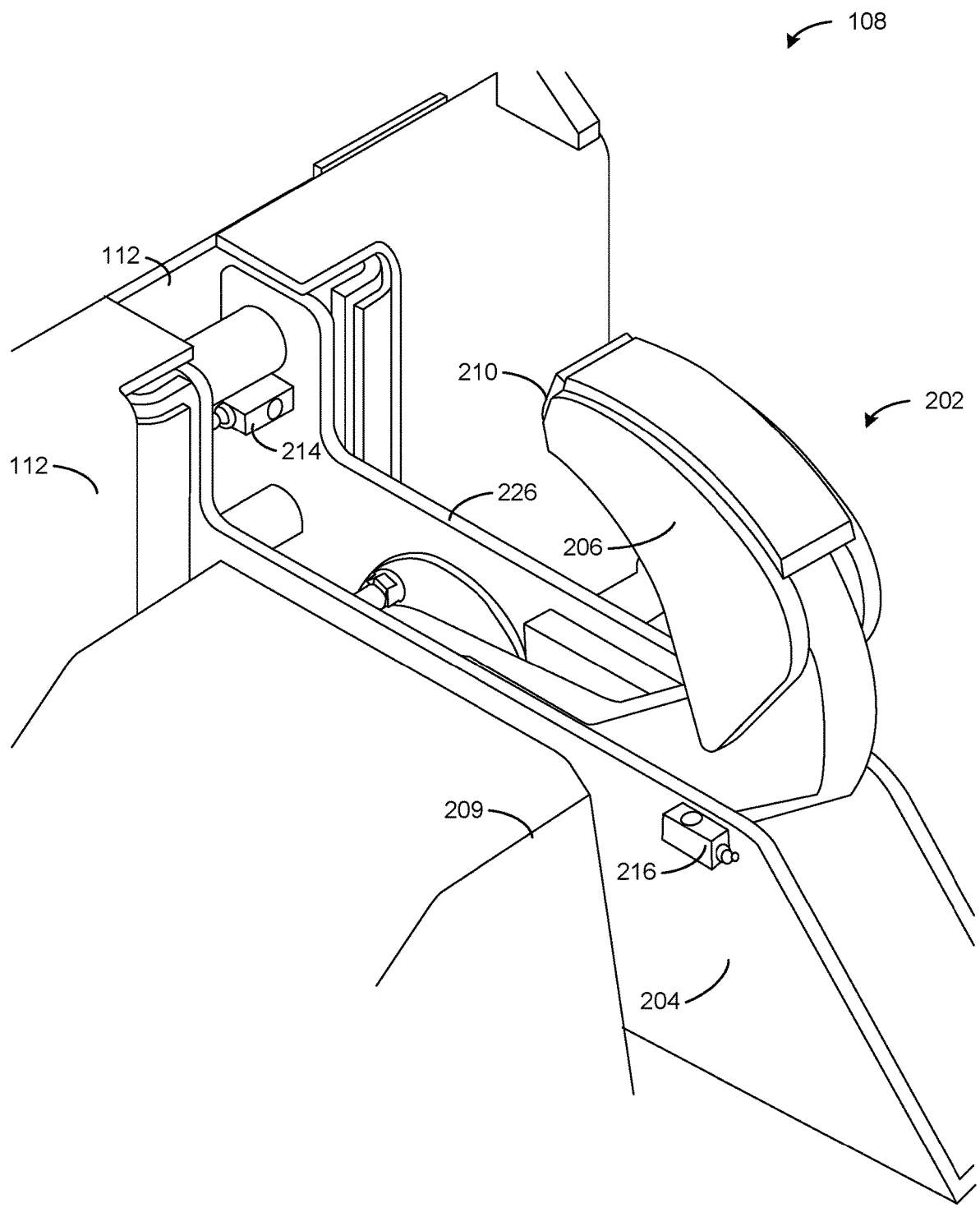
FIG. 2B is a perspective view of the example vehicle restraint system of FIG. 2A depicting an example mounting location of the horizontal RIG sensor and an example mounting location of the vertical RIG sensor of the vehicle restraint system of FIG. 2A.

The example horizontal RIG sensor 214 of the illustrated example senses or detects a presence of an object and/or measures distance to a detected object in the horizontal direction (e.g., a direction substantially parallel to the driveway 104) above the main body 202 of the vehicle restraint system 108. The horizontal RIG sensor 214 of the illustrated example is positioned on the main body 202 to enable a clear line of site to the RIG 106 (e.g., and/or the vehicle structure or frame 201 supporting the RIG 106), regardless of the height of the RIG 106. In some examples, the horizontal RIG sensor 214 can be positioned on or coupled to a surface of the track 112. In some examples, the horizontal RIG sensor 214 can be positioned on or coupled to the dock face wall 114 and/or any other component of the loading dock and/or the vehicle restraint system 108. The horizontal RIG sensor 214 of the illustrated example is positioned to project or orient a sensing beam (e.g., a light) in a substantially horizontal direction away from the dock face wall 114. To measure the horizontal distance position, the horizontal RIG sensor 214 of the illustrated example measures a distance between a reference and a detected object. The reference of the illustrated example is a position (e.g., a calibrated zero value) of the horizontal RIG sensor 214. However, the reference can be any other structure such as, for example, the dock face, the track, and/or any other reference. FIGS. 2A and 2B illustrate an example mounting location of the horizontal RIG sensor 214.

The vertical RIG sensor 216 of the illustrated example senses or detects the presence of an object positioned above (e.g., on top of) a portion of the main body 202. The vertical RIG sensor 216 of the illustrated example is a discrete sensor to sense a presence of an object. For example, the vertical RIG sensor 216 of the illustrated example detects when the RIG 106 of the vehicle 102 is positioned above or over the vertical RIG sensor 216 when the RIG 106 is near (e.g., adjacent) the distal end 210 of the barrier 206. In some examples, the vertical RIG sensor 216 can be mounted to the first plate 204 or the second plate 226 of the main body 202. When the vertical RIG sensor 216 is mounted to the first plate 204 or the second plate 226 and the barrier 206 is positioned between the first plate 204 and the second plate 226, the vertical RIG sensor 216 detects objects above the main body 202 without interference from the barrier 206 when the barrier 206 is in the operational position (e.g., above the main body 202) and/or the stored position (e.g., below the main body 202). Thus, the vertical RIG sensor 216 does not detect the presence of the barrier 206, which can otherwise result in a false positive reading (e.g., an indication that there is a RIG on the main body 202) when the barrier 206 moves between the operational state and the stored position (e.g., extends above the main body 202). FIGS. 2A and 2B illustrated example mounting locations of the vertical RIG sensor.

Figure 17A:
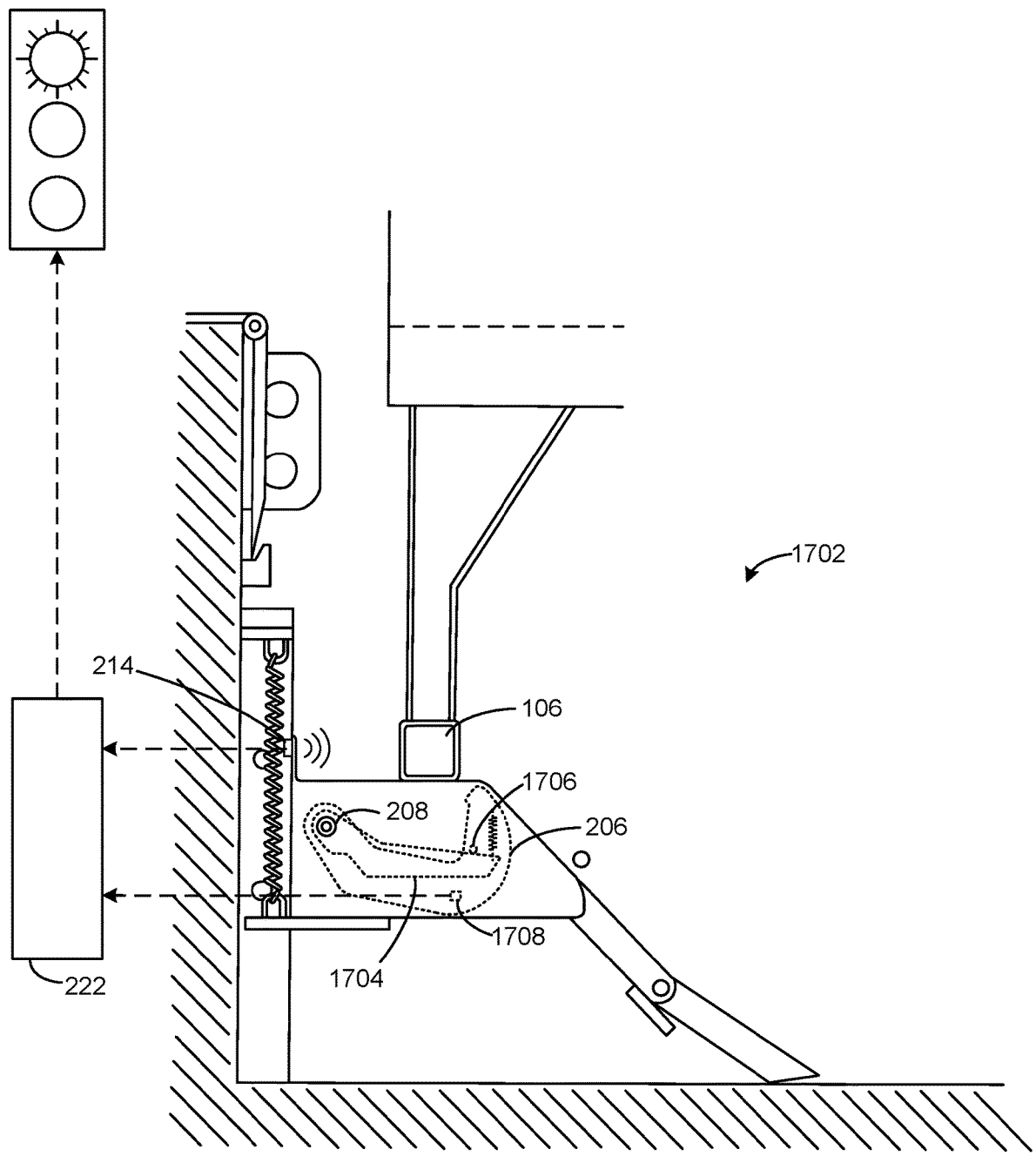
FIG. 17A is a side view of an example vehicle restraint system including an example horizontal RIG sensor and an example contact switch disclosed herein.

The example barrier sensor 218 of the illustrated example detects or senses a position (e.g., a rotational position) of the barrier 206. The barrier sensor 218 of the illustrated example is a rotary encoder disposed on the shaft 208. In some examples, the barrier sensor 218 can include one or more limit switches, laser sensors, ultrasonic sensors and/or any other sensor(s) to detect a position of the barrier 206. The controller 222 of the illustrated example analyzes signals from the barrier sensor 218 to detect a rotational position of the barrier 206. The controller 222 analyzes signals from the barrier sensor 218 and a contact plate and/or contact switch of the barrier 206 (e.g., as illustrated in FIG. 17A). For example, the barrier sensor 218 detects an angle at a time when the contact plate and/or contact switch indicates that the barrier 206 is in contact with the RIG 106 to determine whether the barrier 206 is properly positioned to entrap the RIG 106. The barrier sensor 218 of the illustrated example measures an angle of the barrier 206 and/or cancan sense whether the barrier 206 is in one or more defined positions (e.g., the stored position, the operational position, etc.). In some examples, the controller 222 employs signals from the barrier sensor 218 to determine that the barrier 206 is in a lower fault state when the barrier 206 has been actuated to the operational position, but the barrier sensor 218 senses the barrier 206 at an angle less than an expected angle for the commanded operational position. Similarly, in some examples, the controller 222 cancan determine that the barrier 206 is in an upper fault state when the barrier 206 has been actuated to the operational position, but the barrier sensor 218 measures the barrier 206 at an angle greater than an expected angle for the commanded operational position (e.g., indicating that the RIG 106 is not present). In some examples, the barrier sensor 218 can be implemented with one or more limit switches and/or any other sensor(s) to detect a rotational position of the barrier 206 including, but not limited to, the stored position, the operational position, the upper fault limit, the lower fault limit and/or any other position(s).

Figure 2C:
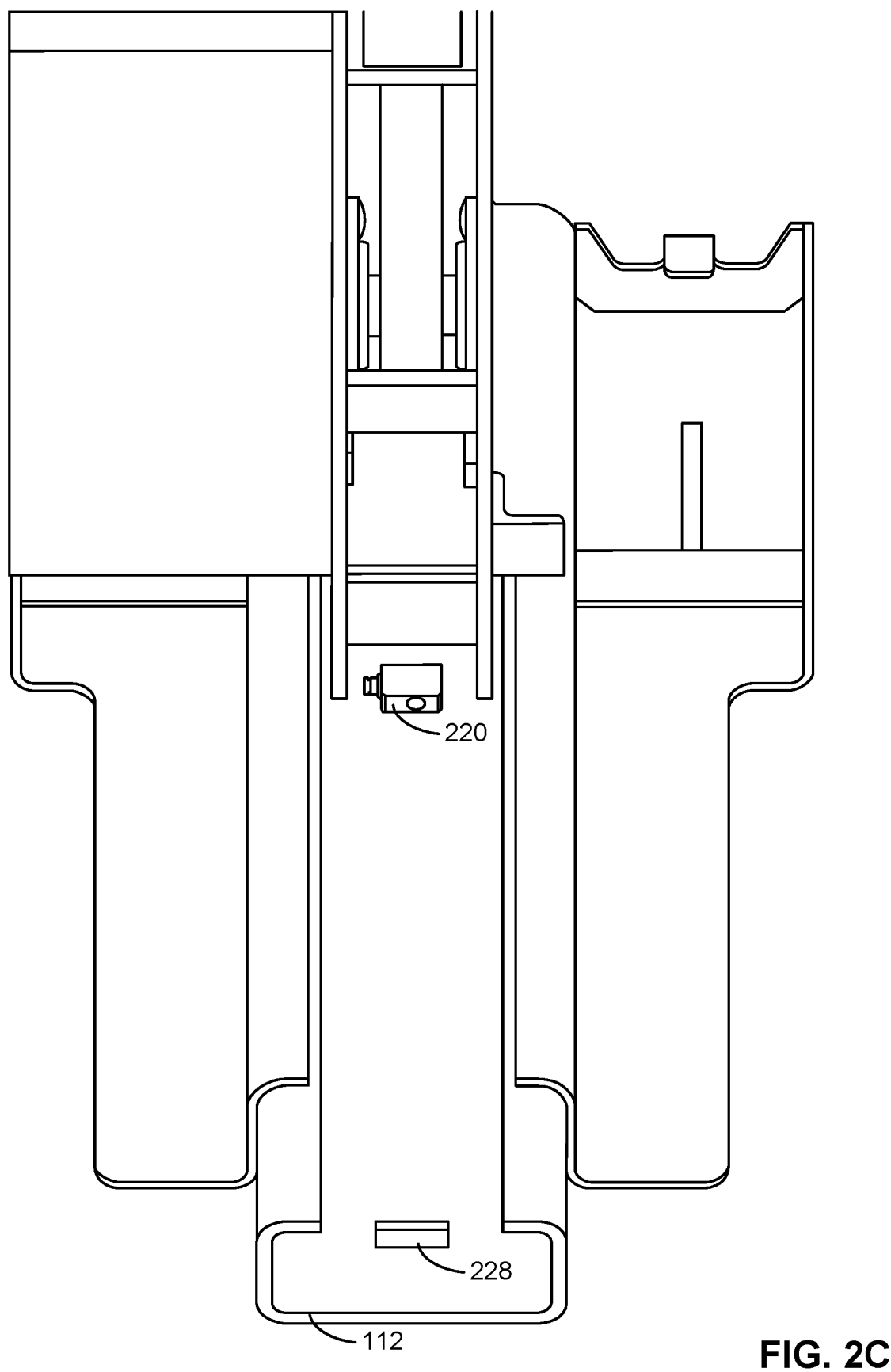
FIG. 2C is a bottom view of the example vehicle restraint system of FIG. 2A depicting an example mounting location of the vertical movement sensor of the vehicle restraint system of FIG. 2A.
Figure 2D:
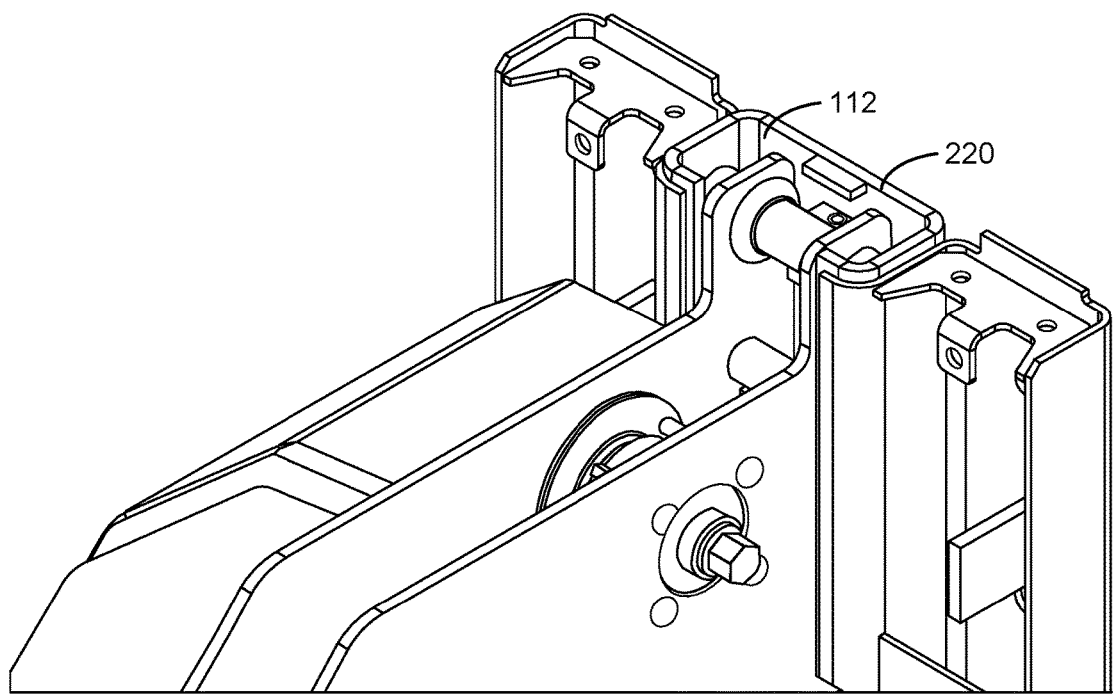
FIG. 2D is another perspective view of the example vehicle restraint system of FIG. 2C.

The vertical movement sensor 220 of the illustrated example senses a position of the main body 202. The vertical movement sensor 220 of the illustrated example communicates signals or data to the controller 222. To sense the vertical positions, the vertical movement sensor 220 of the illustrated example is aimed at a target or reference. For example, the target can include a static point on the track 112, the driveway 104, the dock face wall 114, and/or any other static point or reference that can be used to measure displacement of the main body 202 of the vehicle restraint system 108 relative to the ground. In some examples, the controller 222 employs the vertical movement sensor 220 to determine position values, velocity values, and/or acceleration values in the vertical direction of the vehicle restraint system 108 (e.g., the main body 202). In some examples, the vertical movement sensor 220 can be positioned or aimed at a target that is at an angle (e.g., a predetermined angle, a twenty-degree angle, etc.) relative to horizontal, and the controller 222 can use this angle (e.g., geometry) to determine vertical components for position, speed, and/or acceleration values. In some examples, the vertical movement sensor 220 is aimed at a static target within the track 112. In some examples, the vertical movement sensor 220 is aimed at the ground. FIGS. 2C and 2D illustrate example mounting locations of the example vertical movement sensor 220.

The horizontal RIG sensor 214, the vertical RIG sensor 216 and/or the vertical movement sensor 220 can be ultrasonic sensors, photo-electric sensors, laser sensor, inductive sensors, capacitive displacement sensors, confocal sensors, and/or any other sensors or combinations of sensors capable of detecting or sensing presence of an object and/or measuring a distance to an object. The horizontal RIG sensor 214, the vertical RIG sensor 216, the barrier sensor 218, and/or the vertical movement sensor 220 of the illustrated example move with the vehicle restraint system 108. The horizontal RIG sensor 214, the vertical RIG sensor 216, the barrier sensor 218, and/or the vertical movement sensor 220 of the illustrated example communicate data to the controller 222.

The controller 222 of the illustrated example receives signal(s) and analyzes the signal(s) from the horizontal RIG sensor 214, the vertical RIG sensor 216, the barrier sensor 218, and/or the vertical movement sensor 220, and issues commands and/or alerts based on the signals. In some examples, the controller 222 is located inside a building of the loading dock 100. In some examples, the controller 222 is remote from the sensors 214-220 and/or the loading dock 100 and can receive signals from one or more of the sensors 214-220 via a wireless network (e.g., a Wi-Fi network, a Bluetooth, etc.). In some examples, the controller 222 is dedicated to the loading bay 101 of the loading dock 100. In some examples, the controller 222 processes signals and issues commands and/or alerts to multiple bays of a loading dock. The controller 222 of the illustrated example issues commands enabling movement of the barrier 206 (e.g., from the stored position to the operational position, from the operational position to the stored position, etc.) based on the signals received from the sensors 214-220. For example, if the vertical RIG sensor 216 detects the presence of an object positioned above the main body 202 over the vertical RIG sensor 216, the controller 222 can disable an operation of the barrier 206 to prevent an operator form actuating the barrier 206 from the stored position to the operational position due to potential interference from the object (e.g., the RIG) detected above the distal end 210 of the barrier 206. Further, in such an example where the vertical RIG sensor 216 detects the presence of an object above the main body 202 and over the vertical RIG sensor 216, the controller 222 can issue an alert (e.g., a yellow light, a sound, a text-based sign, etc.) via the alert device 224 to inform a driver and/or an operator that the vehicle is not ready to be locked by the barrier 206. For example, the barrier 206 rotates counter-clockwise to contact the RIG 106 when actuated, and then is locked to prevent rotation in the clockwise direction until the controller issues a command signal to release the RIG 106. In some examples, an operator can only lock rotational movement of the barrier 206 when the controller 222 provides an indication via the alert device 224 (e.g., based on signals received from one or more of the sensors 214-220). Similarly, in some examples, an operator can only release the barrier 206 from a locked condition when the controller 222 provides an indication via the alert device 224 based on signals received from one or more of the sensors 214-220. In some example configurations, the barrier 206 can include a contact plate and/or a contact switch to indicate to the controller 222 when the barrier 206 is engaged with the RIG 106 (e.g., determine if a throat of the barrier 206 is in contact with the RIG 106). An example of such a configuration is illustrated in FIG. 17A.

Figure 3:
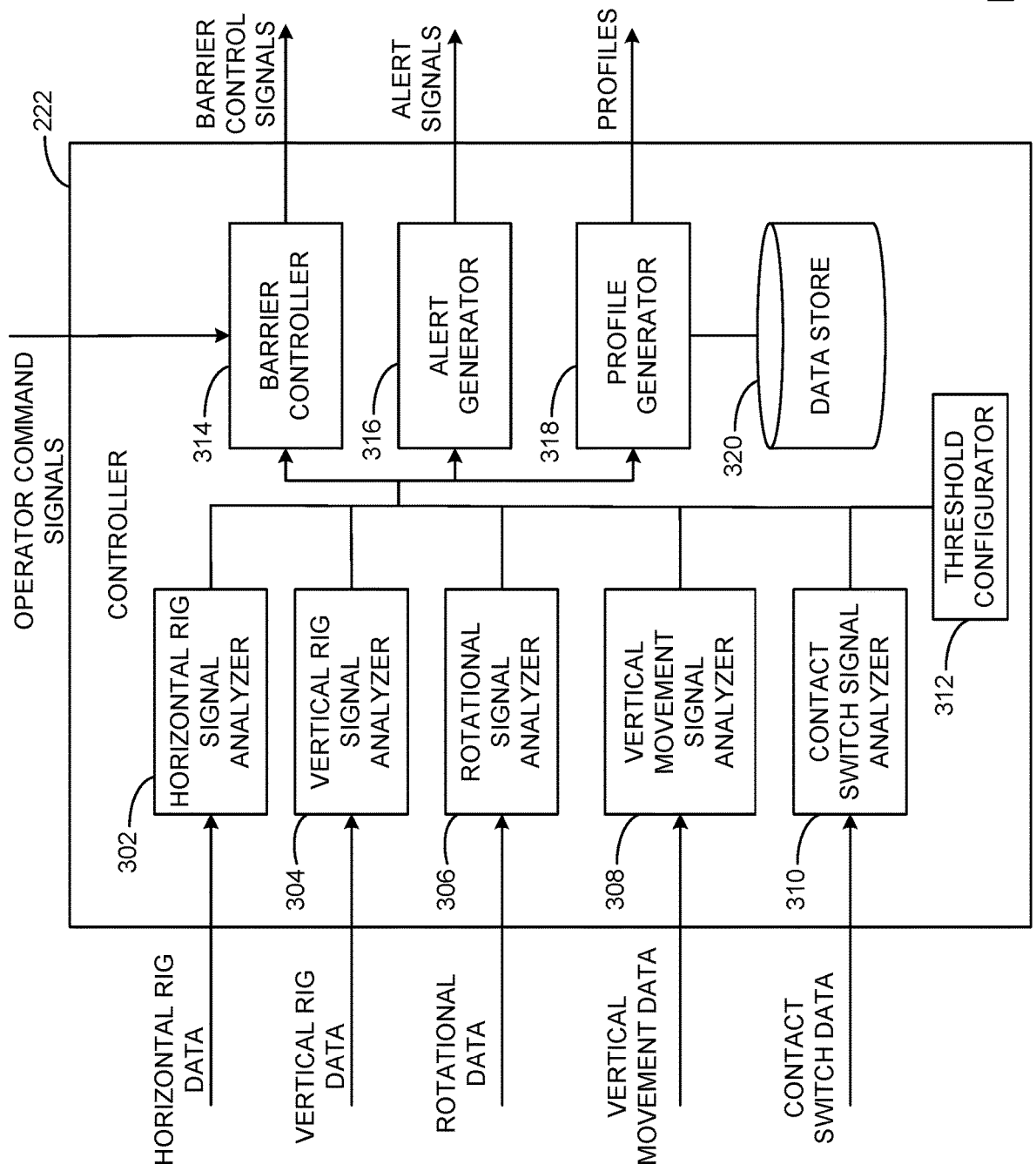
FIG. 3 is a block diagram of the controller of the example vehicle restraint system of FIGS. 1 and 2A.

In some examples, the controller 222 communicates with a user interface (e.g., a graphical user interface) to present data from one or more of the sensors 214-220 and/or from one or more analyzers (e.g., the analyzers 302-310 of FIG. 3). For example, the controller 222 can communicate plots and/or graphical representations of the data from one or more of the sensors 214-220 and/or one or more of the analyzers.

The alert device 224 of the illustrated example is capable of emitting alerts to drivers and/or operators associated with the vehicle 102 and/or the loading dock 100 (e.g., the loading bay 101). The alert device 224 of the illustrated example emits output signals (e.g., one or more lights and/or audible output signals) that are visible to a driver and/or an operator to indicate whether (a) the vehicle 102 is locked by the vehicle restraint system 108, (b) the vehicle 102 is not locked by the vehicle restraint system 108 but is in a condition to be locked, (c) the vehicle 102 is not locked by the vehicle restraint system 108 and is not in a condition to be locked, etc. The alert device 224 can additionally or alternatively emit output signals that are visible to the driver and/or the operator to inform the driver of the vehicle to perform a bump-back operation. For example, the controller 222 commands the alert device 224 to emit a first alert (e.g., an audible alarm and/or a first color light such as, for example, a yellow light, a purple light, a red light, a green light, etc.), indicating the vehicle 102 is not locked and is not in a condition to be locked if the horizontal RIG sensor 214 does not detect an object within a sensing range and/or does not detect an object within a maximum lock distance threshold. In another example, the controller 222 commands the alert device 224 to display a second alert (e.g., an audible alarm and/or a second color light such as, for example, a yellow light, a purple light, a red light, a green light, etc.) different than the first alert to indicate that the vehicle 102 is not locked but is in a condition to be locked (e.g., locking is enabled) if the barrier 206 is in the stored state and the horizontal RIG sensor 214 detects an object within a sensing range and/or within a maximum lock distance threshold. In some examples, the alert device 224 emits a third alert (e.g., an audible signal (e.g., an alarm) and/or a third color light) different than the first alert and/or the second alert to inform a driver and/or an operator of a state of the vehicle and/or of the vehicle restraint system 108. In some examples, the alert device 224 is text-based, and provides a message to a driver and/or an operator indicating a locking status of the vehicle 102. In some examples, the alert device 224 communicates to a central dock management system a status of the vehicle restraint system 108 associated with the loading bay 101. The alert device 224 can be any hardware and/or software capable of providing information to a driver and/or an operator based on signals received from one or more of the sensors (e.g., the horizontal RIG sensor 214, the vertical RIG sensor 216, the barrier sensor 218, the vertical movement sensor 220, etc.).

FIG. 2B is a perspective view of the vehicle restraint system 108 of FIG. 2A depicting an example mounting location of the horizontal RIG sensor 214 and an example mounting location of the vertical RIG sensor 216 of the vehicle restraint system 108. The horizontal RIG sensor 214 is disposed above the upper surfaces of the first plate 204 and the second plate 226 and is positioned proximate the track 112. The horizontal RIG sensor 214 is oriented to detect objects (e.g., the RIG 106) in a direction toward the barrier 206 (e.g., in the horizontal direction). When the barrier 206 is in the operational position, the distal end 210 of the barrier 206 extends above top surfaces of the first plate 204 and the second plate 226. Thus, without a RIG present, the horizontal RIG sensor 214 can detect the barrier 206, depending upon a sensing range or distance (e.g., in the horizontal direction) of the horizontal RIG sensor 214.

The vertical RIG sensor 216 is mounted on the first plate 204 and faces in a direction away from (e.g., perpendicular to) the direction that the horizontal RIG sensor 214. In some examples, the vertical RIG sensor 216 is mounted on the second plate 226 or on any other component(s) or structure(s) of the main body 202. As depicted in FIG. 2B, the vertical RIG sensor 216 does not detect the barrier 206, because the vertical RIG sensor 216 is offset from (e.g., outside of) a travel path of the barrier 206. Therefore, the vertical RIG sensor 216 is positioned to detect a RIG that can span across the first plate 204 and the second plate 226 without detecting the barrier 206.

FIG. 2C is a is a bottom view of the example vehicle restraint system 108 of FIG. 2A depicting an example mounting location of the vertical movement sensor 220 of the vehicle restraint system 108 of FIG. 2A. FIG. 2D is an alternative, perspective view of the vehicle restraint system 108 of FIG. 2C. The horizontal RIG sensor 214 is not shown in FIGS. 2C and 2D for clarity. The vertical movement sensor 220 is disposed within the track 112 and is aimed at an example target 228 (e.g., a stationary or fixed target). When the vehicle restraint system 108 moves up and down within the track 112, the vertical movement sensor 220 measures distance values based on position of the vertical movement sensor 220 relative to the target 228.

FIG. 3 is a block diagram of the controller 222 of the vehicle restraint system of FIG. 2A. The controller 222 of the illustrated example includes an example horizontal RIG signal analyzer 302, an example vertical RIG signal analyzer 304, an example rotational signal analyzer 306, an example vertical movement signal analyzer 308, an example contact switch signal analyzer 310, an example threshold configurator 312, an example barrier controller 314, an example alert generator 316, an example profile generator 318, and an example data store 320, which are communicatively connected with an example communication bus 321.

The horizontal RIG signal analyzer 302 of the illustrated example receives, accesses and/or analyzes data from the horizontal RIG sensor 214. In some examples, to measure a distance, the horizontal RIG sensor 214 of the illustrated example generates analog data corresponding to a distance of an object relative to the horizontal RIG sensor 214. In some examples, the horizontal RIG data corresponds to a distance between the dock face wall 114 and a detected object. In some examples, the horizontal RIG data corresponds to a distance between the dock bumper 116 and the object. In some examples, the horizontal RIG signal analyzer 302 determines or calculates a distance value based on a signal value (e.g., a voltage value, a current value, etc.) captured by the horizontal RIG sensor 214. In some such examples, the horizontal RIG signal analyzer 302 can utilize distance values to determine speed values based on the change in distance values over a time period. For example, the horizontal RIG signal analyzer 302 can determine a speed at which the vehicle 102 moved toward the dock bumper 116.

In some examples, the horizontal RIG signal analyzer 302 of the illustrated example compares the distance value associated with a signal from the horizontal RIG sensor 214 with a maximum locking distance threshold to determine if a detected object is within the maximum locking distance threshold. In some examples, while the barrier 206 is in the operational position, the horizontal RIG signal analyzer 302 of the illustrated example determines whether the RIG 106 has moved closer to the horizontal RIG sensor 214. In some such examples, in response to the RIG 106 moving closer to the horizontal RIG sensor 214 (e.g., due to creep during loading/unloading), the horizontal RIG signal analyzer 302 can communicate with the barrier controller 314 to cause the barrier 206 to further rotate to entrap or reengage the RIG 106. The horizontal RIG sensor 214 communicates data to the barrier controller 314, the alert generator 316 and/or the profile generator 318.

The horizontal RIG signal analyzer 302 of the illustrated example compares a distance indicated by the horizontal RIG signal with a release threshold to determine whether the barrier 206 can move to the stored position without interference from the RIG 106. In some examples, the horizontal RIG signal analyzer 302 accesses the maximum locking distance threshold and the release threshold from the threshold configurator 312. In some examples, if the horizontal RIG signal analyzer 302 determines that RIG 106 is at an outer limit of the locking range of the barrier 206 (e.g., beyond the release threshold), the alert generator 316 causes the alert device 224 to emit a bump-back alert to the driver.

The example vertical RIG signal analyzer 304 of the illustrated example receives, accesses and/or analyzes vertical RIG data from the vertical RIG sensor 216. The vertical RIG data of the illustrated example is a discrete signal indicating whether an object is present within a sensing range of the vertical RIG sensor 216 (e.g., directly above the main body 202 and the vertical RIG sensor 216). In some examples, the vertical RIG data can be a binary signal (e.g., with a "1" value representing an object detected within the sensing range and a "0" value representing no object detected within the sensing range, etc.). In some examples, the vertical RIG data can be digital data, analog data, an image, a video, and/or various combinations and pluralities thereof. In some examples where the vertical RIG data includes analog data, the vertical RIG signal analyzer 304 includes an analog-to-digital converter to convert the analog data to digital data. The vertical RIG signal analyzer 304 of the illustrated example determines whether or not a RIG is present above the main body 202 (e.g., whether a RIG is resting on top surfaces of the first plate 204 and the second plate 226 of the main body 202) based on the vertical RIG data. The vertical RIG signal analyzer 304 communicates the presence or absence of the object (e.g., a RIG) to the barrier controller 314, the alert generator 316, and/or the profile generator 318.

The example rotational signal analyzer 306 of the illustrated example receives, accesses and/or analyzes rotational data from the barrier sensor 218. The rotational data of the illustrated example is analog data corresponding to an angle of rotation of the shaft 208 connected to the barrier 206 relative to the main body 202. In some examples, the rotational data can include digital data or analog data. In some examples where the rotational data includes analog data, the rotational signal analyzer 306 includes an analog-to-digital converter to convert the analog data to a digital data.

The rotational signal analyzer 306 of the illustrated example employs the rotational data to determine if the barrier 206 is in a stored position, an operational position, an intermediate position, and/or an overextended position based on rotational data. In some examples, the rotational signal analyzer 306 converts raw signal data (e.g., voltage data, current data, etc.) to useful values representative of the rotational position (e.g., angular values). In some examples, the rotational signal analyzer 306 compares an angular value for the barrier 206 with one or more range(s) associated with a stored position, an operational position, and/or any other predetermined position. In some examples, the rotational signal analyzer 306 compares angular values for the barrier 206 with thresholds accessed from the threshold configurator 312. For example, the rotational signal analyzer 306 determines the barrier 206 is in the upper fault state when an angular value determined from data sensed by the barrier sensor 218 indicates the barrier 206 has exceeded an upper fault limit of the operational position (e.g., the range of angular values associated with the barrier 206 being in a position engaged with the RIG 106). The rotational signal analyzer 306 communicates rotational data to the barrier controller 314, the alert generator 316 and/or the profile generator 318.

The vertical movement signal analyzer 308 of the illustrated example receives, accesses and/or analyzes vertical movement data from the vertical movement sensor 220 of the vehicle restraint system 108. The vertical movement data of the illustrated example includes analog data corresponding to a position of the main body 202 relative to a reference (e.g., the driveway 104). In some examples, the vertical movement data can be digital data, analog data, an image, a video, and/or various combinations and pluralities thereof. In some examples where the vertical movement data is analog data, the horizontal RIG signal analyzer 302 includes an analog-to-digital converter to convert the analog data to digital data.

The vertical movement signal analyzer 308 of the illustrated example determines position values, velocity values, and/or acceleration values in the vertical direction (e.g., perpendicular to the driveway 104) of the vehicle restraint system 108. In some examples, the vertical movement signal analyzer 308 converts voltage, and/or current data to position, velocity, and/or acceleration data. In some examples, the vertical movement signal analyzer 308 compares a rate of change (e.g., a velocity, an acceleration, etc.) to a threshold accessed from the threshold configurator 312 to determine if the vehicle restraint system 108 moved irregularly (e.g., too quickly, with an acceleration exceeding a threshold, etc.). In some such examples, a rapid change in a height of the vehicle restraint system 108 can indicate a failure of the spring 212, a possible landing gear collapse on a trailer, a possible tilt state due to overloading in the rear of a trailer, etc. In some examples, the vertical movement signal analyzer 308 can compare a position of the main body 202 when the vehicle restraint system 108 is not in use (e.g., a vehicle is not in contact with the vehicle restraint system 108) with an initial position threshold range. The vertical movement signal analyzer 308 of the illustrated example can determine if the main body 202 is properly returning to an initial position when not engaged by a vehicle. In some examples, the vertical movement signal analyzer 308 can analyze the vertical movement data to determine a number of cycles that the spring 212 has experienced, and/or to determine loading characteristics on the spring 212 to determine whether spring maintenance may be required. In some examples, the vertical movement signal analyzer 308 determines whether a seal and/or shelter around the doorway 118 requires maintenance due to wear. The vertical movement signal analyzer 308 of the illustrated example can determine based on velocity, acceleration, and/or jounce data determined based on vertical movement data, a type of load that has been applied to the vehicle 102. For example, the vertical movement signal analyzer 308 can determine if a person, an empty fork truck, a loaded fork truck, and/or any other load has entered the vehicle 102. In some examples, the vertical movement signal analyzer 308 can determine a horizontal velocity of the RIG 106 based on the vertical movement data. For example, utilizing the vertical velocity of the vehicle restraint system 108 as calculated based on vertical movement data, an angle of a ramp on the main body 202 can be utilized to calculate the horizontal velocity of the RIG 106. For example, if the ramp has a forty-five-degree angle which the RIG 106 contacts, the horizontal velocity of the vehicle restraint system 108 as the vehicle 102 approaches the vehicle restraint system 108 can be calculated with knowledge of this geometry. The vertical movement signal analyzer 308 can communicate the vertical movement data, horizontal movement data and/or outcomes of the analyses on the vertical movement data to the barrier controller 314, the alert generator 316, and/or the profile generator 318.

The example contact switch signal analyzer 310 of the illustrated example receives, accesses and/or analyzes signals from a contact switch. For example, the contact switch signal analyzer 310 can access data from a contact switch of a vehicle restraint system (e.g., an example contact switch 1708 of an example vehicle restraint system 1702 of FIG. 17A). In some examples, the contact switch signal is a discrete binary signal indicating whether the contact switch has been activated (e.g., due to the barrier 206 contacting the RIG 106). In some examples, the contact switch data can be digital data, analog data, or a combination thereof. In some examples where the vertical movement data is analog data, the horizontal RIG signal analyzer 302 includes an analog-to-digital converter to convert the analog data to digital data.

In some examples, the contact switch signal analyzer 310 includes a timer to determine an amount of time from when a lock operation is initiated until a contact switch is actuated. In some examples, the contact switch signal analyzer 310 communicates such time values to the barrier controller 314 and/or to the alert generator 316 to generate alerts, move the barrier 206 to the stored position, etc., based on how long it took for the barrier 206 to contact the RIG. For example, if the contact switch signal analyzer 310 determines that from the time the lock operation was initiated until the time the barrier 206 contacted the RIG 106 was a half second within a time threshold (e.g., the contact switch signal analyzer 310 can determine a position of the barrier 260 based on this time and a known rotational velocity of the barrier 206). The contact switch signal analyzer 310 can communicate data to the barrier controller 314, the alert generator 316, and/or the profile generator 318.

If the barrier 206 moves at a constant angular velocity, the time for the barrier 206 to contact the RIG 106 can be compared to an expected time for the barrier 206 to reach the operational position to determine a state of the barrier 206. For example, the contact switch signal analyzer 310 can determine if the barrier 206 has stopped short of the operational position (e.g., indicating a possible lower fault state where the RIG 106 or another object has contacted the barrier 206 prior to the barrier 206 reaching its locked position) or if the barrier has moved beyond the operational position (e.g., indicating a possible upper fault state where the RIG 106 or other object has rotated beyond the operational position without contacting the RIG 106). For example, if it is expected that it would take a half second for the barrier 206 to reach the operational position and the barrier 206 has not contacted the RIG 106 (e.g., the contact switch data indicates no contact) after one second, the contact switch signal analyzer 310 can determine the barrier 206 is in the upper fault state. In some examples, data from the horizontal RIG sensor 214 can be utilized to determine when to enable locking (e.g., based on an object being detected and/or the object being within the locking distance threshold) and the control switch can be utilized to monitor the locking operation to ensure the barrier 206 moves to the operational position to entrap the RIG 106. The example threshold configurator 312 of the illustrated example receives, accesses and/or stores thresholds that can be utilized by one or more of the analyzers 302-310, the barrier controller 314, the alert generator 316, and/or the profile generator 318. For example, the threshold configurator 312 can store and/or access a maximum locking distance threshold (e.g., the maximum distance an object can be from the horizontal RIG sensor 214 to initiate locking), a change threshold (e.g., the amount of change of the position of the RIG 106 when the barrier 206 is in the locked position that causes the barrier 206 to rotate to better secure the RIG 106), a stored position threshold range for the vehicle restraint system 108 (e.g., the range within which the vehicle restraint system 108 should be positioned when not in use), and/or any other thresholds for use in decision making by components of the controller 222. In some examples, the threshold configurator 312 receives input from an operator to define values of one or more of the thresholds during a setup operation. In some examples, the threshold configurator 312 receives threshold settings from a central command device associated with a facility and/or from a remote location.

The example barrier controller 314 of the illustrated example receives or accesses data from the horizontal RIG signal analyzer 302, the vertical RIG signal analyzer 304, the rotational signal analyzer 306, the vertical movement signal analyzer 308, and/or the contact switch signal analyzer 310 and provides command signals to components associated with the barrier 206. The barrier controller 314 of the illustrated example provides command signals to a motor associated with the barrier 206 to move the barrier 206 between the stored position and an operational position. In response to signals from one or more of the sensors meeting certain criteria (e.g., as determined by the signal analyzers 302-310), the barrier controller 314 of the illustrated example enables locking of the barrier 206. In some examples, the criteria includes: the horizontal RIG signal analyzer 302 determining that the RIG 106 is present, the horizontal RIG signal analyzer 302 determining that the RIG 106 within a locking distance threshold, and/or the vertical RIG signal analyzer 304 determining the RIG 106 is not present above the vertical RIG sensor 216. When locking is enabled, an operator can initiate a locking operation (e.g., press a button, speak a vocal command, etc.) to move the barrier 206 from the stored position to the operational position and entrap the RIG 106.

Similarly, when an operator desires to unlock the barrier 206 (e.g., move the barrier 206 from the operational position to the stored position), the barrier controller 314 can ensure that one or more of the signal analyzers 302-310 satisfy conditions for releasing the barrier 206. For example, if the barrier 206 is in the locked position, and an operator initiates an unlock operation, the barrier controller 314 can determine, using the horizontal RIG signal analyzer 302, whether the RIG 106 is within a release threshold. In some such examples, in response to the user initiating an unlock operation and the horizontal RIG signal analyzer 302 indicating the RIG 106 is not within the release threshold relative to the horizontal RIG sensor 214 (e.g., due to creep during loading/unloading) the barrier controller 314 can prevent the barrier 206 from being lowered until release condition(s) are satisfied. In some examples, when an unlock operation is initiated, if a lower fault state is indicated by the rotational signal analyzer 306 and/or the contact switch signal analyzer 310, and/or if the barrier controller 314 determines that the barrier 206 is unable to move to the stored position, the barrier 206 can reverse the movement of the barrier 206 to return to the operational position until the horizontal RIG signal analyzer 302 detects movement of the RIG 106 closer to the dock face wall 114.

In some examples, the barrier controller 324 can be set to an auto-lock mode, which enables the vehicle restraint system 108 to automatically restrain a vehicle when it approaches the vehicle restraint system 108. In some such examples, the barrier controller 314 can monitor numerous conditions from the analyzers 302-310 to determine when to perform the auto-lock function. For example, if (a) the horizontal RIG signal analyzer 302 determines that the RIG is detected and within the locking distance threshold, and (b) the vertical RIG signal analyzer 304 does not detect the RIG, the barrier controller 314 can actuate the barrier 206 to the operational position to entrap the RIG. In some examples, the barrier controller 324 determines a status of the barrier 206 (e.g., whether the barrier 206 is in the operational state or the stored state). The barrier controller 324 can communicate (e.g., via a network) with a central computing system a status of the barrier 260 and data pertaining to control signals issued by the barrier controller 342. Numerous examples of decisions to enable actuation of the barrier and/or disable actuation of the barrier are described in connection with the flowcharts of FIGS. 18A, 18B, 19-23, 24A, 24B, and 25-27.

The example alert generator 316 of the illustrated example generates alerts based on conditions reported by one or more of the horizontal RIG signal analyzer 302, the vertical RIG signal analyzer 304, the rotational signal analyzer 306, the vertical movement signal analyzer 308, and/or the contact switch signal analyzer 310. The alert generator 316 of the illustrated example issues alert signals to the alert device 224 to provide alerts to the operator and/or the driver.

For example, if the horizontal RIG signal analyzer 302 determines an object (e.g., the RIG 106) is present within the locking distance threshold relative to the horizontal RIG sensor 214, and the vertical RIG signal analyzer 304 determines the object is present above the vertical RIG sensor 216 above the main body 202 of the vehicle restraint system 108, the alert generator 316 generates an alert to inform a driver to move the vehicle in reverse until the RIG 106 is not positioned directly over the vertical RIG sensor 216 (where it can interfere with the distal end 210 of the barrier 206).

The alert generator 316 can analyze statuses determined by one or more of the analyzers 302-310 and issue alerts associated with the statuses. For example, the alert generator 316 can issue one or more of the following statuses: (1) the vehicle is not restrained, but can be restrained by an operator; (2) the vehicle is not restrained, and is not ready to be restrained; (3) the vehicle is not restrained, and a lower fault has been encountered; (4) the vehicle is not restrained, and an upper fault has been encountered; (5) the vehicle is not restrained, and requires a bump-back operation to be restrained; (6) the vehicle is currently restrained, but the restraint can be disengaged by an operator; (7) the vehicle is currently restrained, but requires a bump-back operation before it can be disengaged by an operator, etc. In some examples, the alert generator 316 can issue specific alerts communicating information from one or more of the sensors 214-220 (e.g., the horizontal RIG sensor 214 does not detect a RIG 106, the vertical RIG sensor 216 detects a RIG 106, etc.). The alert generator 316 can additionally or alternatively issue any other alerts based on information received from one or more of the analyzers 302-310.

The alert generator 316 of the illustrated example can communicate (e.g., via a network) alerts to a central computing system (e.g., via a network). Some example decisions to generate and issue alerts via the alert generator 316 are described in connection with the flowcharts of FIGS. 18A, 18B, 19-23, 24A, 24B, and 25-27.

The example profile generator 318 of the illustrated example generates profiles for the vehicle restraint system 108. The profile generator 318 can access sensor data directly and/or access data from one or more of the analyzers 302-310. In some examples, the profile generator 318 can access alerts issued by the alert generator 316 and/or commands issued by the barrier controller 314. In some examples, the profile generator 318 stores position and motion (e.g., velocity, acceleration, etc.) data and curves for the vehicle restraint system 108. In some examples, the profiles can be reviewed by an operator to determine whether maintenance is required, review logs of behaviors as observed by one or more of the sensors, review previously encountered alerts and/or barrier actuations, etc. The profile generator 318 can store profiles in the data store 320. In some examples, the profile generator 318 additionally or alternatively communicates profiles to a central computing system where data from one or more controllers (e.g., associated with one or more loading bays of a loading dock) is accessed and utilized by an operator. In some examples, the profile generator 318 communicates the profiles to a central computing system via a network.

The example data store 320 of the illustrated example stores profiles generated by the profile generator 318, alerts generated by the alert generator 316, commands issued by the barrier controller 314, and/or any signal associated with one or more of the signal analyzers 302-310. The data store 320 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory, etc.). The data store 320 can additionally or alternatively be implemented by one or more double data rate (DDR) memories, such as DDR, DDR2, DDR3, mobile DDR (mDDR), etc. The data store 320 can additionally or alternatively be implemented by one or more mass storage devices such as hard disk drive(s), compact disk drive(s) digital versatile disk drive(s), etc. While, in the illustrated example, the data store 320 is illustrated as a single database, the data store 320 can be implemented by any number and/or type(s) of databases. Furthermore, the data stored in the data store 320 can be in any data format such as, for example, binary data, comma delimited data, tab delimited data, structured query language (SQL) structures, etc.

In some examples, the barrier 206 can implement means for restraining a vehicle at a loading dock 100. In some examples, the horizontal RIG sensor 214, the vertical RIG sensor 216, the horizontal RIG signal analyzer 302, and/or the vertical RIG signal analyzer 304 can implement means for detecting a presence of a RIG (e.g., the RIG 106). In some examples, the barrier controller 314 and/or the controller 222 can implement means for enabling the means for restraining to move to the operational position. In some examples, the vertical RIG sensor 216, the horizontal RIG sensor 214, and/or the barrier sensor 218, the horizontal RIG signal analyzer 302, the vertical RIG signal analyzer 304, and/or the rotational signal analyzer 306 can implement means for sensing a RIG positioned adjacent an end of the means for restraining. In some examples, the barrier sensor 218, the contact switch 1708, the rotational signal analyzer 306 and/or the contact switch signal analyzer 310 can implement means for measuring a rotational position of the barrier. In some examples, the vertical movement sensor 220 and/or the vertical movement signal analyzer 308 can implement second means for measuring a vertical position of the vehicle restraint system. In some examples, the contact switch 1708 and/or the contact switch signal analyzer 310 can implement second means for sensing engagement between the barrier and the RIG.

While an example manner of implementing the controller 222 of FIG. 1 is illustrated in FIG. 3, one or more of the elements, processes and/or devices illustrated in FIG. 3 can be combined, divided, re-arranged, omitted, eliminated and/or implemented in any other way. Further, the example horizontal RIG signal analyzer 302, the vertical RIG signal analyzer 304, the rotational signal analyzer 306, the vertical movement signal analyzer 308, the contact switch signal analyzer 310, the threshold configurator 312, the barrier controller 314, the alert generator 316, the profile generator 318, the data store 320, and/or, more generally, the example controller 222 of FIG. 3 can be implemented by hardware, software, firmware and/or any combination of hardware, software and/or firmware. Thus, for example, any of the example horizontal RIG signal analyzer 302, the vertical RIG signal analyzer 304, the rotational signal analyzer 306, the vertical movement signal analyzer 308, the contact switch signal analyzer 310, the threshold configurator 312, the barrier controller 314, the alert generator 316, the profile generator 318, the data store 320, and/or, more generally, the example controller 222 of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example horizontal RIG signal analyzer 302, the vertical RIG signal analyzer 304, the rotational signal analyzer 306, the vertical movement signal analyzer 308, the contact switch signal analyzer 310, the threshold configurator 312, the barrier controller 314, the alert generator 316, the profile generator 318, the data store 320, and/or, more generally, the example controller 222 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 222 of FIG. 1 can include one or more elements, processes and/or devices in addition to, or instead of, those illustrated in FIG. 3, and/or can include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
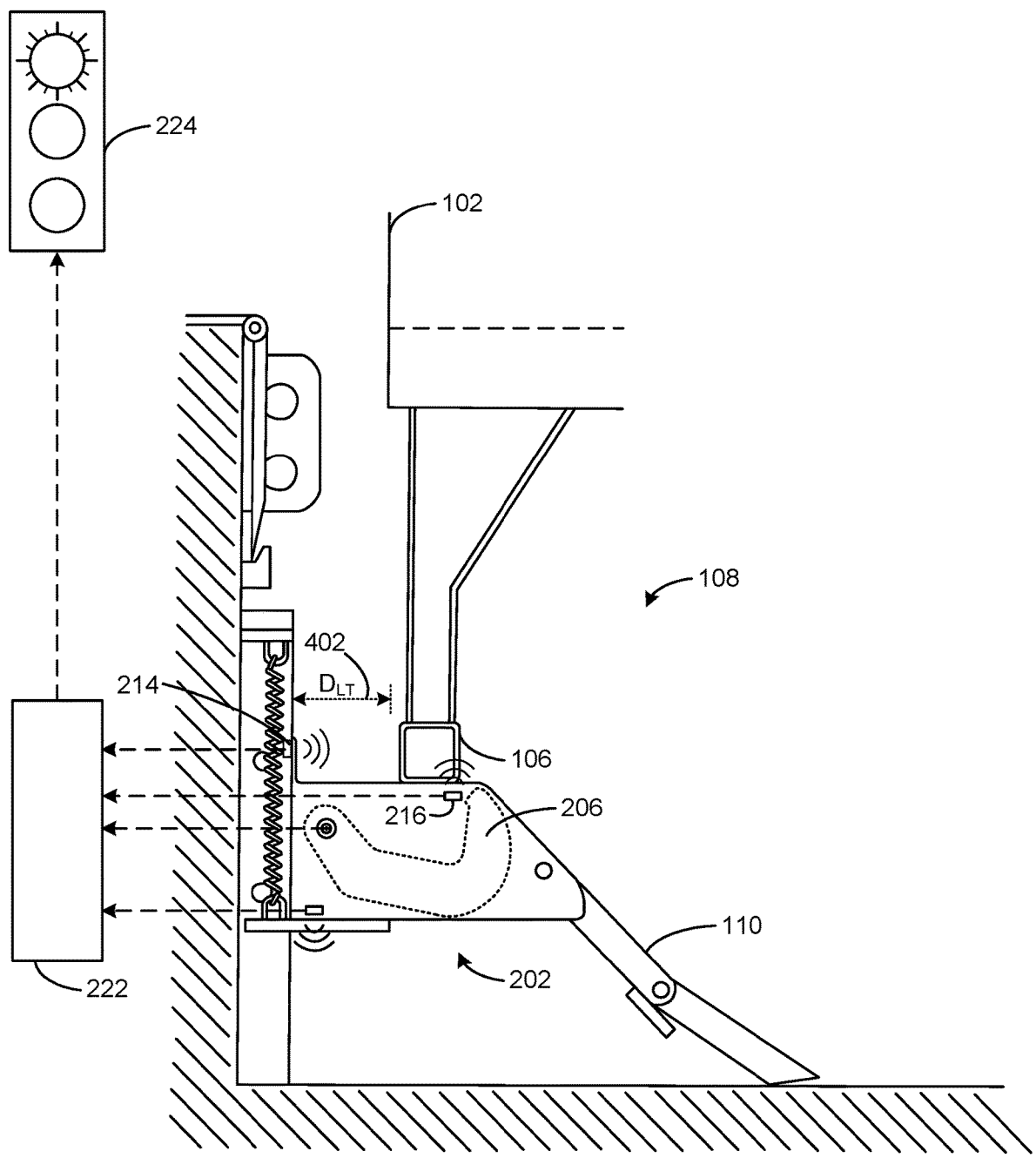
FIG. 4 is a side view of the example vehicle restraint system of FIG. 2A, but showing an example RIG of an example vehicle positioned over the example vertical RIG sensor.

FIG. 4 is a side view of the vehicle restraint system 108 of FIG. 2. In the view of FIG. 4, the vehicle 102 is closer to the dock face wall 114 compared to the position of the vehicle 102 shown in FIG. 2. As the vehicle 102 moves or reverses toward the dock face wall 114, the RIG 106 imparts a force on the ramp 110 to cause the main body 202 to move downward until the RIG 106 is positioned on the upper surfaces of the main body 202. In FIG. 4, the RIG 106 is positioned directly above the vertical RIG sensor 216. To detect a position of the RIG 106 relative to the dock face wall 114, the vehicle restraint system 108 of the illustrated example measures or determines if the RIG 106 is within a locking distance threshold 402 ($D_{LT}$). The locking distance threshold 402 ($D_{LT}$) is a distance measured between the RIG 106 and the horizontal RIG sensor 214. In some examples, the RIG 106 is within a sensing range of the horizontal RIG sensor 214 but is outside the locking distance threshold 402 ($D_{LT}$). Therefore, if both the RIG 106 is outside of the locking distance threshold 402 and positioned directly above the vertical RIG sensor 216, the controller 222 can disable locking capability. For example, the barrier controller 314 of the controller 222 may not allow an operator to initiate a locking operation. Additionally, or alternatively, the alert generator 316 of the controller 222 can issue an alert to the driver of the vehicle 102 to move the vehicle 102 toward the dock face wall 114.

Figure 5:
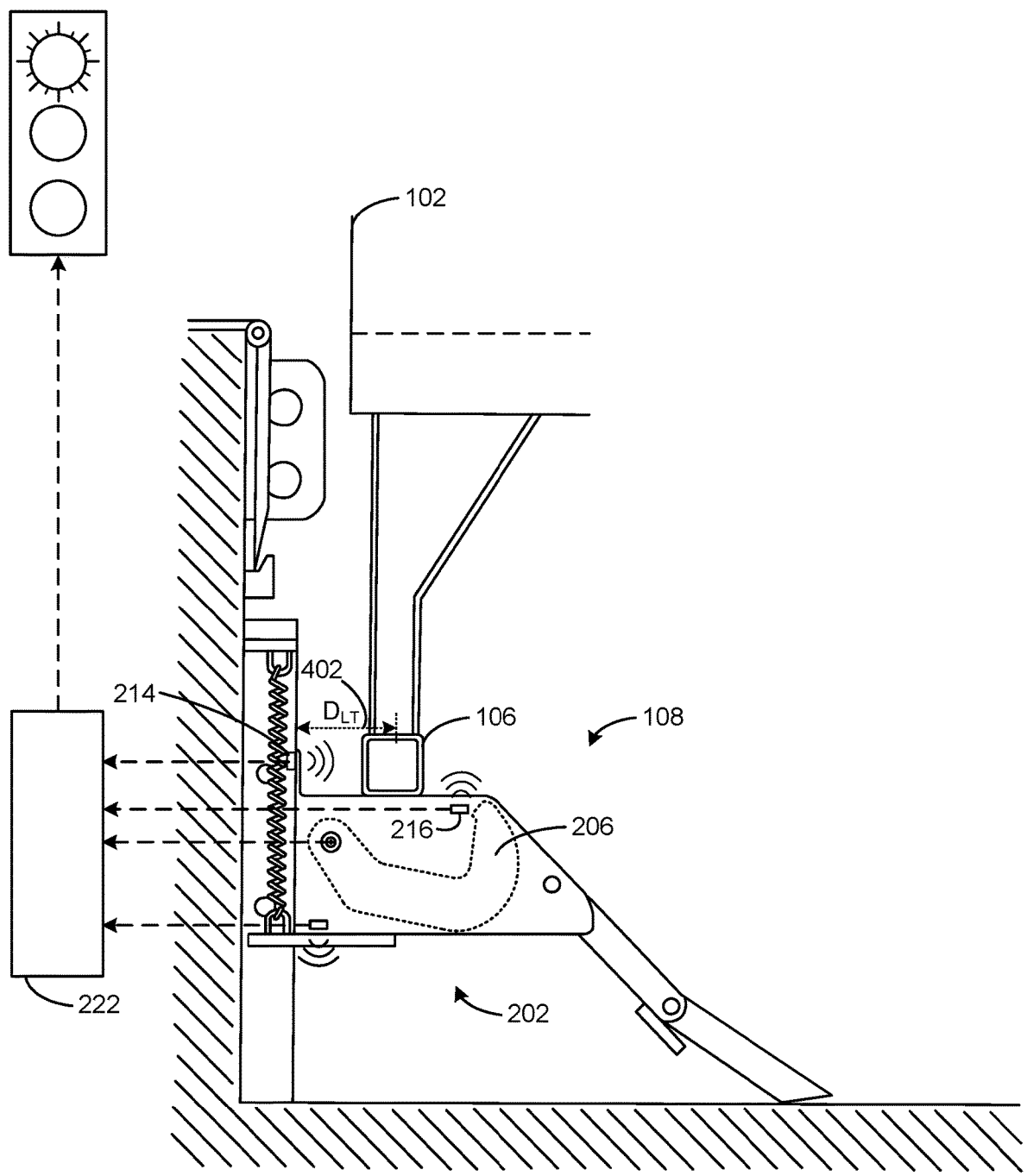
FIG. 5 is a side view of the example vehicle restraint system of FIG. 4, but showing the RIG at a different location relative to the example vertical RIG sensor.

FIG. 5 is a side view of the vehicle restraint system 108 and the vehicle 102 of FIG. 4 after the vehicle 102 has backed up further toward the dock face wall 114 of the loading dock and the RIG 106 is no longer positioned over (e.g., spaced away from) the vertical RIG sensor 216. In FIG. 5, the horizontal RIG sensor 214 detects the RIG 106, and determines that the RIG 106 (e.g., the left-side surface of the rear-impact guard, in the view of FIG. 5) is within the locking distance threshold 402 ($D_{LT}$). In FIG. 5, the vertical RIG sensor 216 does not detect an object. Therefore, the barrier 206 does not interfere with the RIG 106 when the barrier 206 moves from the stored position to the operational position. In the example of FIG. 5, the barrier controller 314 enables locking capability, as the barrier 206 can be moved to the operational position.

Figure 6:
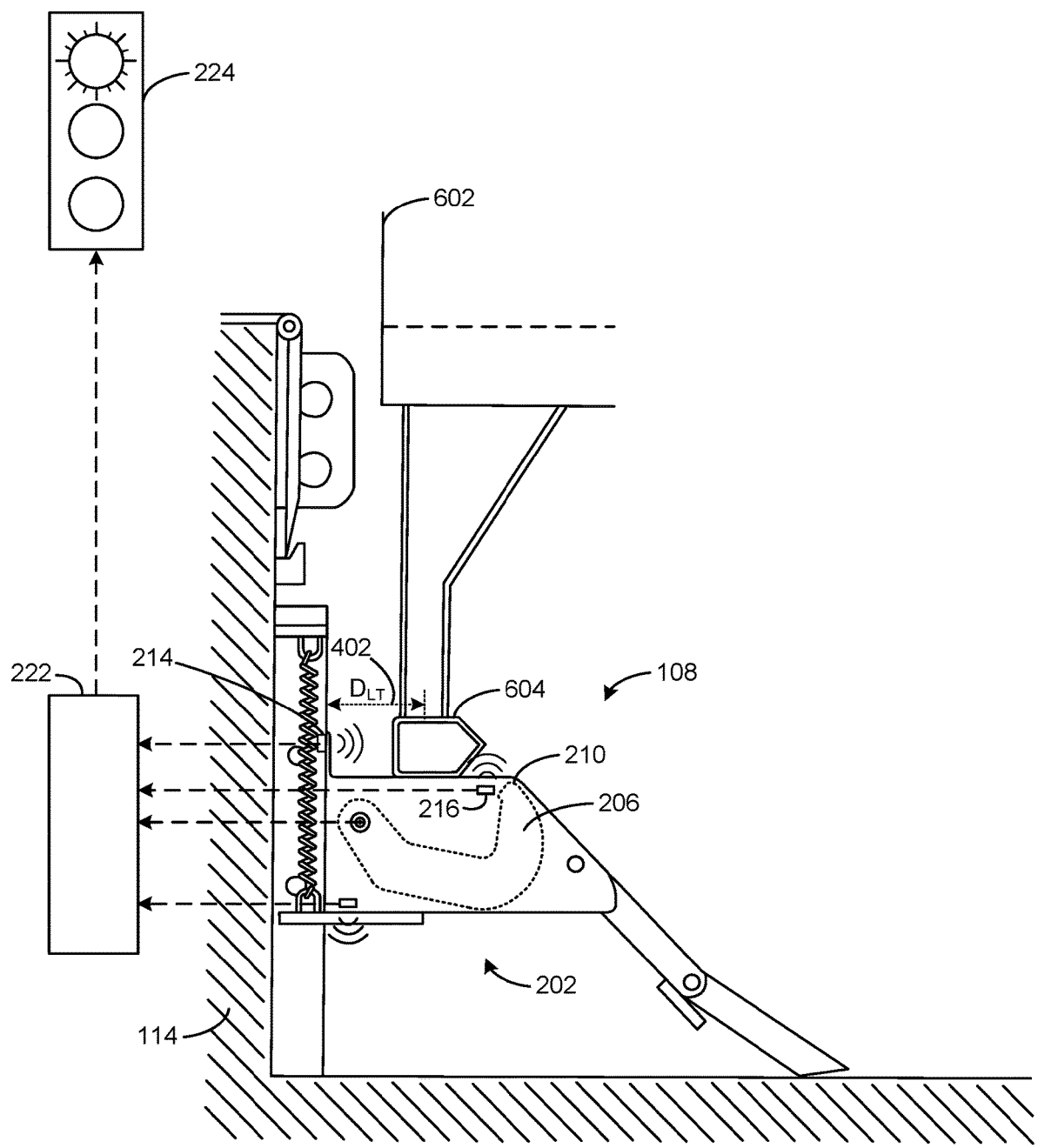
FIG. 6 is a side view of the example vehicle restraint system of FIG. 4 and showing an example alternative vehicle having an example elongated RIG.

FIG. 6 is a side view of the vehicle restraint system 108 of FIG. 5 and an example alternative vehicle 602 having an example elongated RIG 604. The elongated RIG 604 of the alternative vehicle 602 of FIG. 6, has a larger dimensional profile (e.g., a larger width) than the RIG 106 of the vehicle 102 of FIG. 1. Although the RIG 604 has a different (e.g., a larger) dimensional profile, the vehicle restraint system 108 of the illustrated example detects and/or determines when the barrier 206 can be actuated to the operational position. For example, the alternative vehicle 602 of FIG. 6 is not at the same distance (e.g., horizontal distance) to the dock face wall 114 as the position of the vehicle 102 shown in FIG. 5. Despite the alternative vehicle 602 of FIG. 6 being in the same position relative to the dock face wall 114 as the position of the vehicle 102 of FIG. 5, the elongated RIG 604 is positioned over the vertical RIG sensor 216, which triggers the vertical RIG sensor 216. The elongated nature of the elongated RIG 604 results in the possibility of interfering with the barrier 206 as the back end of the elongated RIG 604 is positioned over the distal end 210 of the barrier 206. As a result, the controller 222 prevents the barrier 206 from moving from the stored position to the operational position. In some examples, the controller 222 issues an alert via the alert device 224 to inform a driver of the alternative vehicle 602 to move the vehicle toward the dock face wall 114 in response to the vertical RIG sensor 216 sensing the elongated RIG 604.

Figure 7:
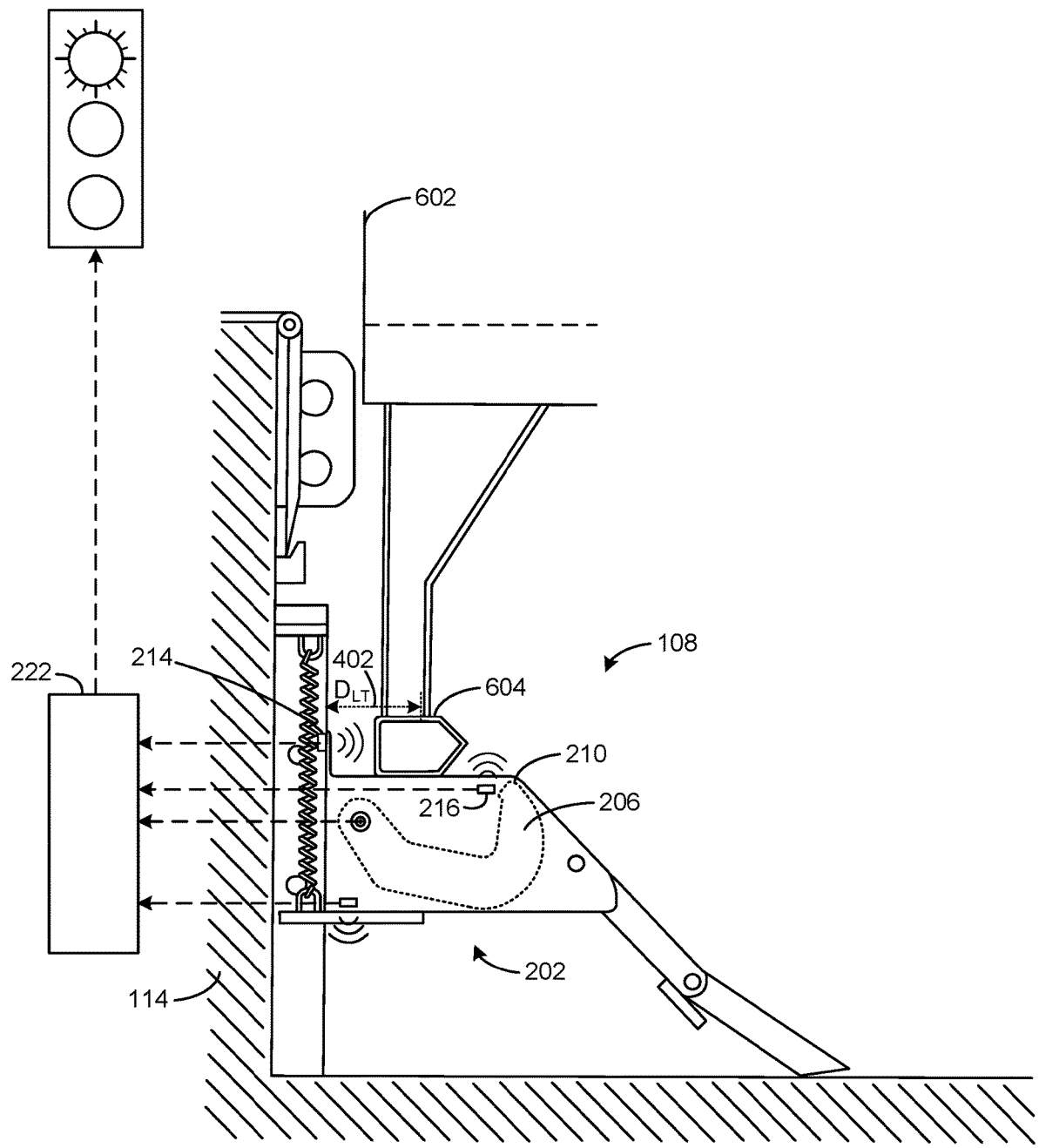
FIG. 7 is a side view of the example vehicle restraint system and the example alternative vehicle of FIG. 6, but showing the example elongated RIG located away from the example vertical RIG sensor.

FIG. 7 is a side view of the example vehicle restraint system 108 and the alternative vehicle 602 of FIG. 6 showing the elongated RIG 604 positioned away from (e.g., no longer in a line of sight or sensing path of) the vertical RIG sensor 216. In the illustrated example, the horizontal RIG sensor 214 detects the elongated RIG 604 within the locking distance threshold 402 ($D_{LT}$) and the vertical RIG sensor 216 does not detect the elongated RIG 604 (e.g., in a line of sight of the vertical RIG sensor 216). In response, the controller 222 enables operation of the barrier 206 from the stored position to the operational position. For example, the controller 222 enables manual operation of the barrier 206. In some examples, when locking functionality is enabled, the controller 222 commands the barrier 206 to move from the stored position to the operational position in response to the horizontal RIG sensor 214 detecting the elongated RIG 604 within the locking distance threshold 402 ($D_{LT}$) and the vertical RIG sensor 216 not detecting the elongated RIG 604.

Figure 8:
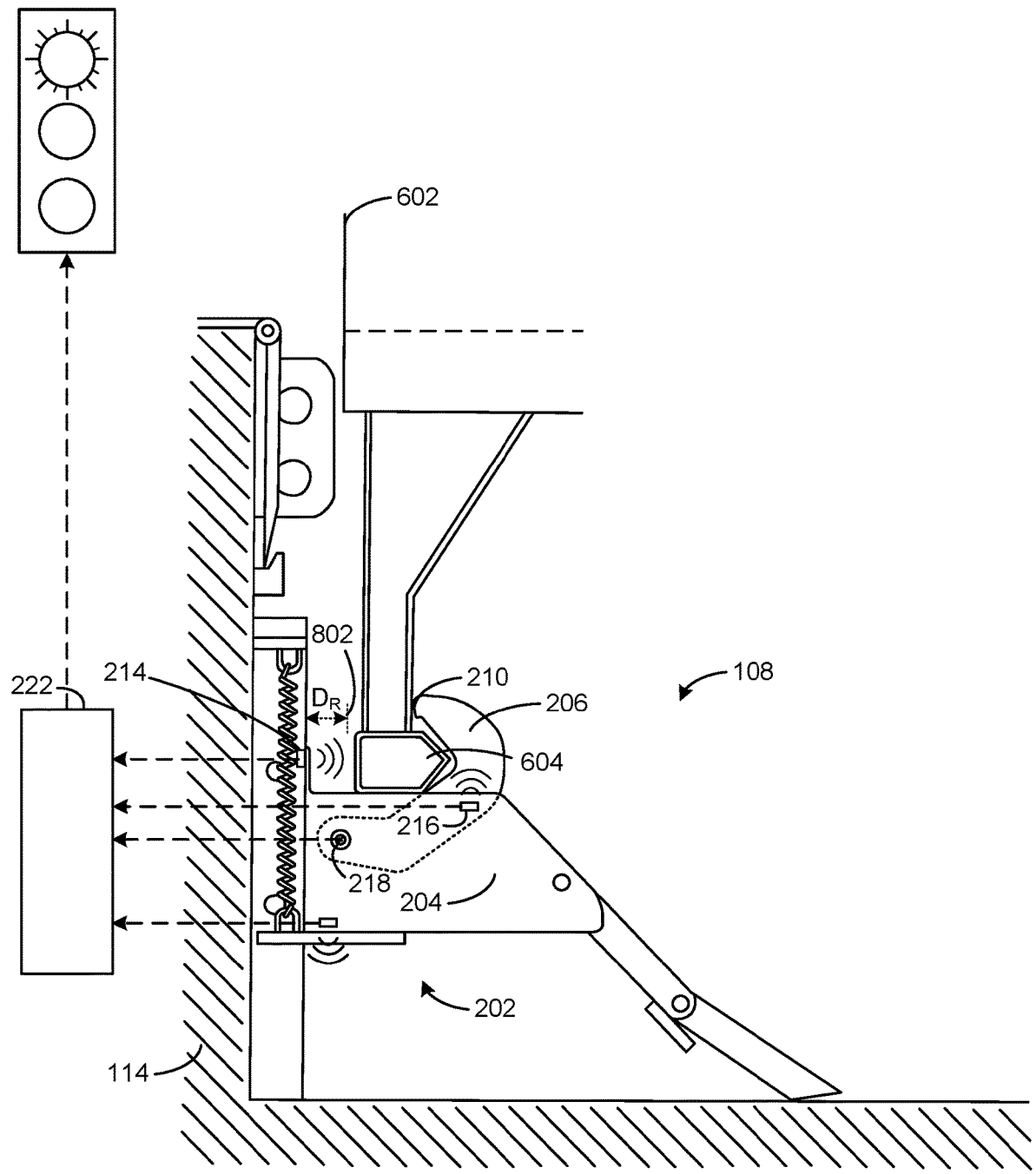
FIG. 8 is a side view of the example vehicle restraint system and the example alternative vehicle of FIG. 7, showing an example barrier of the example vehicle restraint system in a first operating position and in engagement with the example elongated RIG.

FIG. 8 is a side view of the example vehicle restraint system 108 and alternative vehicle 602 of FIG. 7 showing the barrier 206 in the operational position. When the barrier 206 is in the operational position, the distal end 210 of the barrier 206 extends above at least a portion of the elongated RIG 604, to entrap or engage the elongated RIG 604 and prevent movement of the alternative vehicle 602 in a direction away from the dock face wall 114. Although the distal end 210 of the barrier 206 extends above the main body 202 of the vehicle restraint system 108, the vertical RIG sensor 216 does not detect the barrier 206, as the vertical RIG sensor 216 is aligned with the first plate 204 of the main body 202, and the barrier 206 is disposed between the first plate 204 and the second plate 226. Therefore, the barrier 206 is offset from a sensing path of the vertical RIG sensor 216. The barrier sensor 218 of the illustrated example detects that the barrier 206 is in the operational position based on a measured angle of the barrier 206. For example, if the operational position of the barrier 206 occurs when the barrier 206 is at an angle (e.g., relative to the stored position) that is within an operational range (e.g., between of thirty degrees and sixty degrees), the controller 222 determines that the barrier 206 is in the operational position. The operational position can be a range of acceptable angular values. In some examples, the operational position includes a range extending from a first value (e.g., thirty degrees, forty degrees, etc.) to a second value associated with the upper fault state (e.g., indicating the barrier 206 fully rotated, and did not encounter the elongated RIG 604). If the barrier sensor 218 senses the barrier 206 at an angle less than a lower limit of the operational range (e.g., thirty degrees), the controller 222 determines that the barrier 206 is in a lower fault state (e.g., the distal end 210 of the barrier 260 encountered the elongated RIG 604 prior to the barrier 206 reaching the operational state). Similarly, if the barrier sensor 218 senses the barrier 206 is at an angle greater than the upper limit of the operational range (e.g., sixty degrees), the controller 222 determines that the barrier 206 is in an upper fault state (e.g., the barrier 206 did not encounter the elongated RIG 604 and thus rotated beyond a fully operational position). In some examples, if an operator commands the barrier 206 to move to the stored position (e.g., to unlock the alternative vehicle 602) when the barrier 206 is in the operational position, the horizontal RIG sensor 214 determines whether the elongated RIG 604 is within a release threshold 802 ($D_R$) relative to the horizontal RIG sensor 214. The release threshold 802 can be set to a value to ensure that the elongated RIG 604 is close enough to the dock face wall 114 to allow the barrier 206 to (e.g., fully) rotate back to the stored position.

Figure 9:
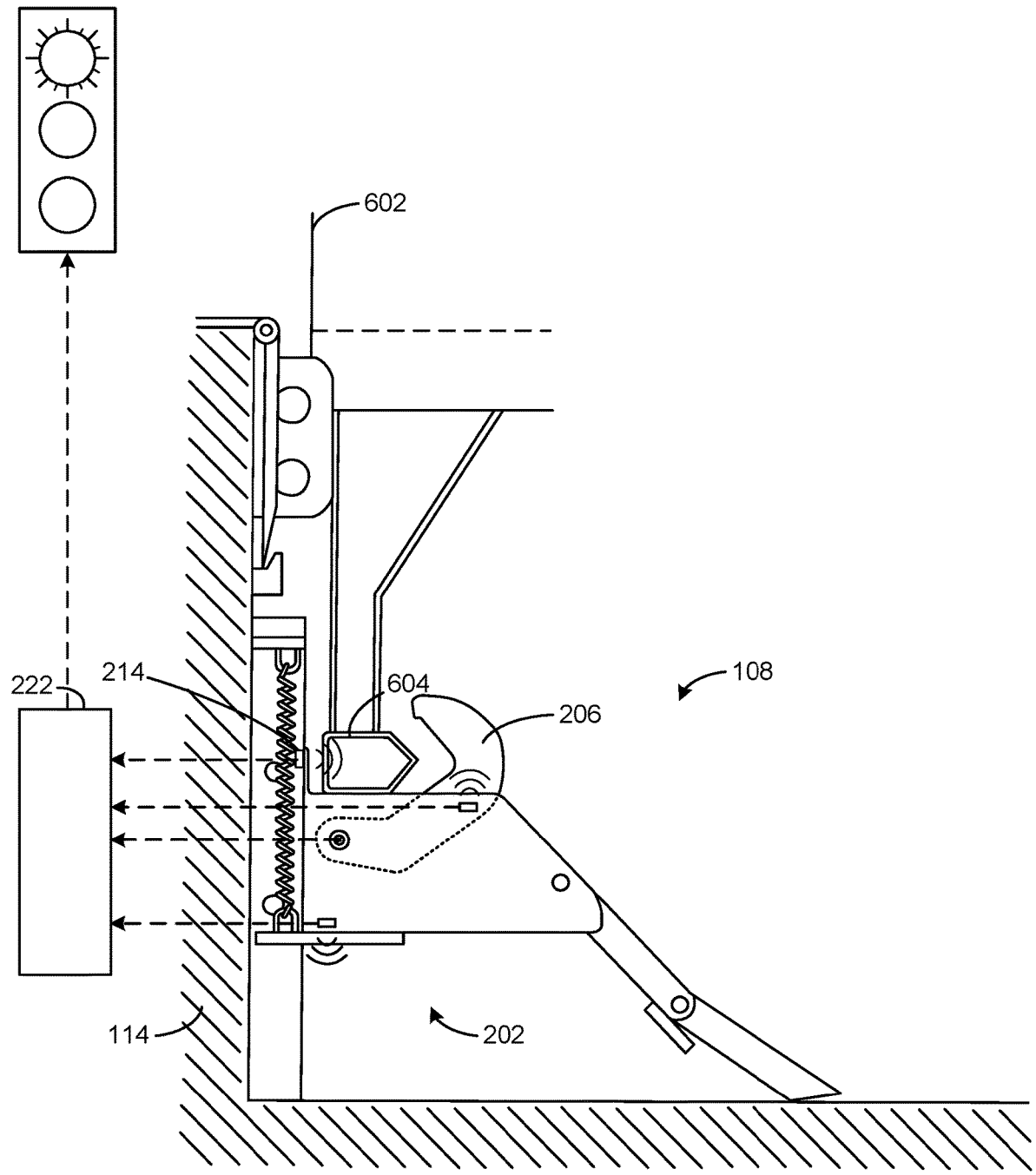
FIG. 9 is a side view of the example vehicle restraint system and the example alternative vehicle of FIG. 8, but showing the example alternative vehicle positioned closer toward the dock face.

FIG. 9 is a side view of the example vehicle restraint system 108 and the alternative vehicle 602 of FIG. 8 showing the alternative vehicle 602 positioned closer to the dock face wall 114 than the position of the alternative vehicle 602 of FIG. 6. For example, the alternative vehicle 602 can move further back toward the dock face wall 114 due to creep of the vehicle during a loading and/or unloading operation of the alternative vehicle 602. The horizontal RIG sensor 214 detects that the elongated RIG 604 has moved closer to the dock face wall 114. The controller 222 compares the distance value conveyed by the signal of the horizontal RIG sensor 214 with a previously determined distance value (e.g., which can be stored in the data store 320) to determine if the change in position of the elongated RIG 604 is greater than a change threshold. Such change in distances can indicate that the elongated RIG 604 has moved away from the barrier 206 and the barrier 206 is no longer in engagement with the elongated RIG 604. In response to the controller 222 determining the distance from the horizontal RIG sensor 214 value has changed more than the change threshold, the controller 222 issues a command signal for the barrier 206 to rotate further to reengage or entrap the elongated RIG 604.

Figure 10:
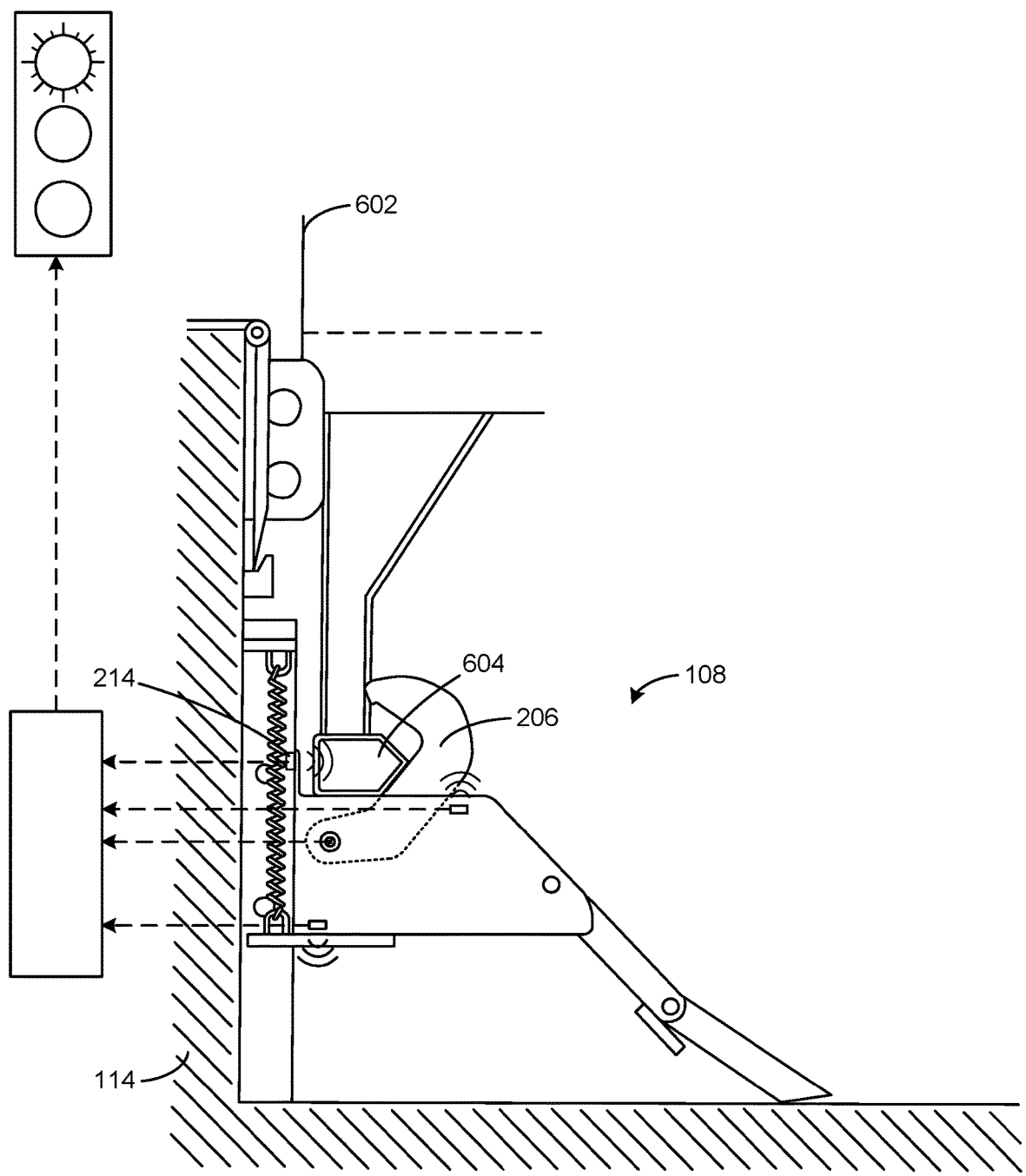
FIG. 10 is a side view of the example vehicle restraint system and the example alternative vehicle of FIG. 9, but showing the example barrier of the example vehicle restraint system further in a second operating position and in engagement with the example elongated RIG.

FIG. 10 is a side view of the example vehicle restraint system 108 and alternative vehicle 602 of FIG. 9 after the barrier 206 of the vehicle restraint system 108 has been further rotated to engage the elongated RIG 604. In this position, the barrier 206 is in contact with the elongated RIG 604 restricting motion of the alternative vehicle 602 in a direction away from the dock face wall 114.

FIGS. 11-16, 17A, 17B-17C and 17D-17G illustrate other example vehicle restraint systems 1102-1702, 1750 and 10 disclosed herein. In some examples, the vehicle restraint systems 1102-1702, 1750, and 10 can be used in the loading dock 100 of FIG. 1 (e.g., in place of the vehicle restraint system 108). Those components of the example vehicle restraint systems 1102-1702, 1750 and 10 of FIGS. 11-16, 17A, 17B-17C, and 17D-17G that are substantially similar or identical to the components of the vehicle restraint system 108 described above and that have functions substantially similar or identical to the functions of those components will not be described in detail again below. Instead, the interested reader is referred to the above corresponding descriptions. To facilitate this process, similar reference numbers will be used for like structures. For example, the vehicle restraint systems 1102-1702, 1750, and 10 of the illustrated examples include a barrier 206, a track 112, an alert device 224, and/or a controller 222.

Figure 11:
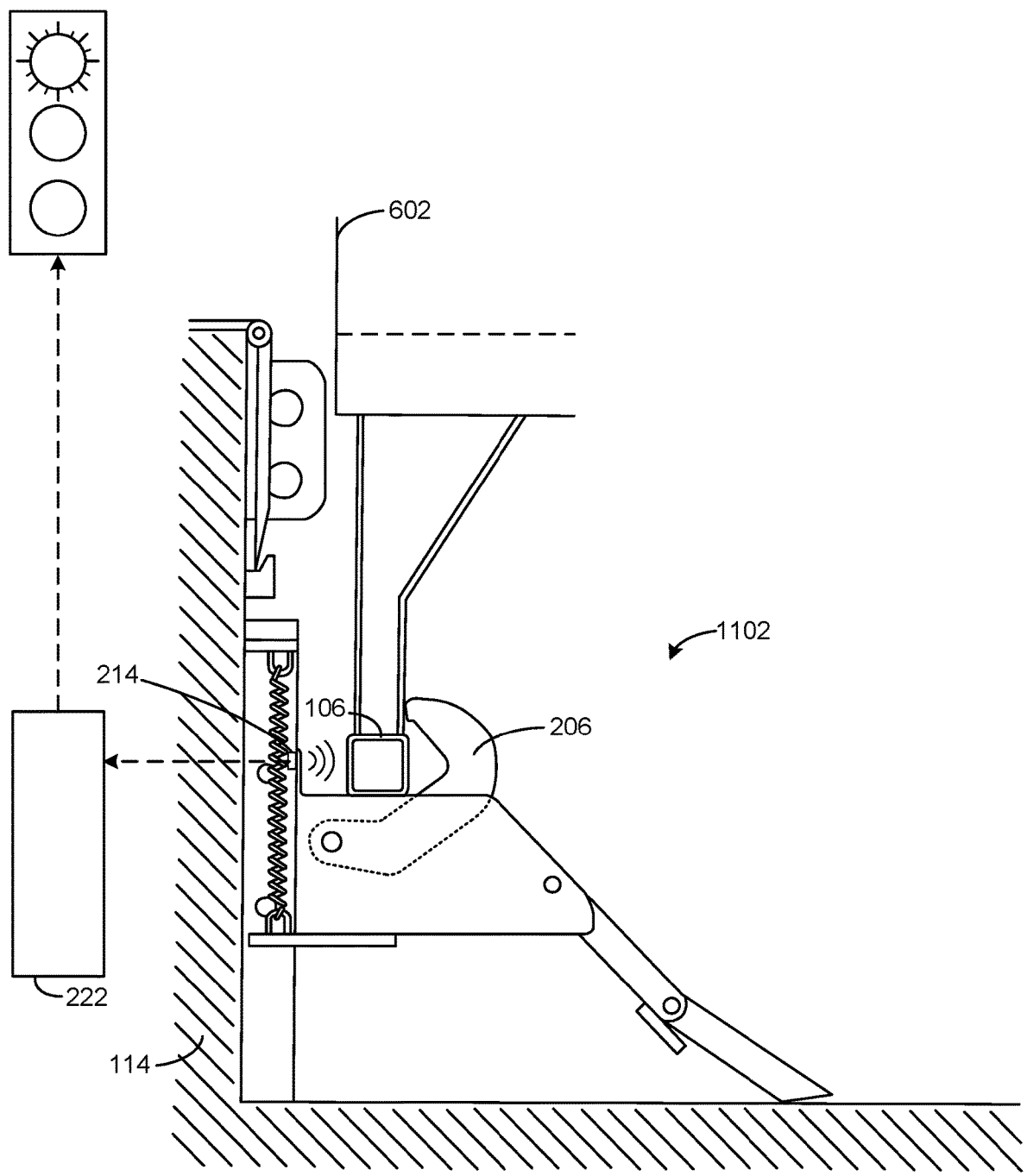
FIG. 11 is a side view of another example vehicle restraint system including an example horizontal RIG sensor disclosed herein.
Figure 20:
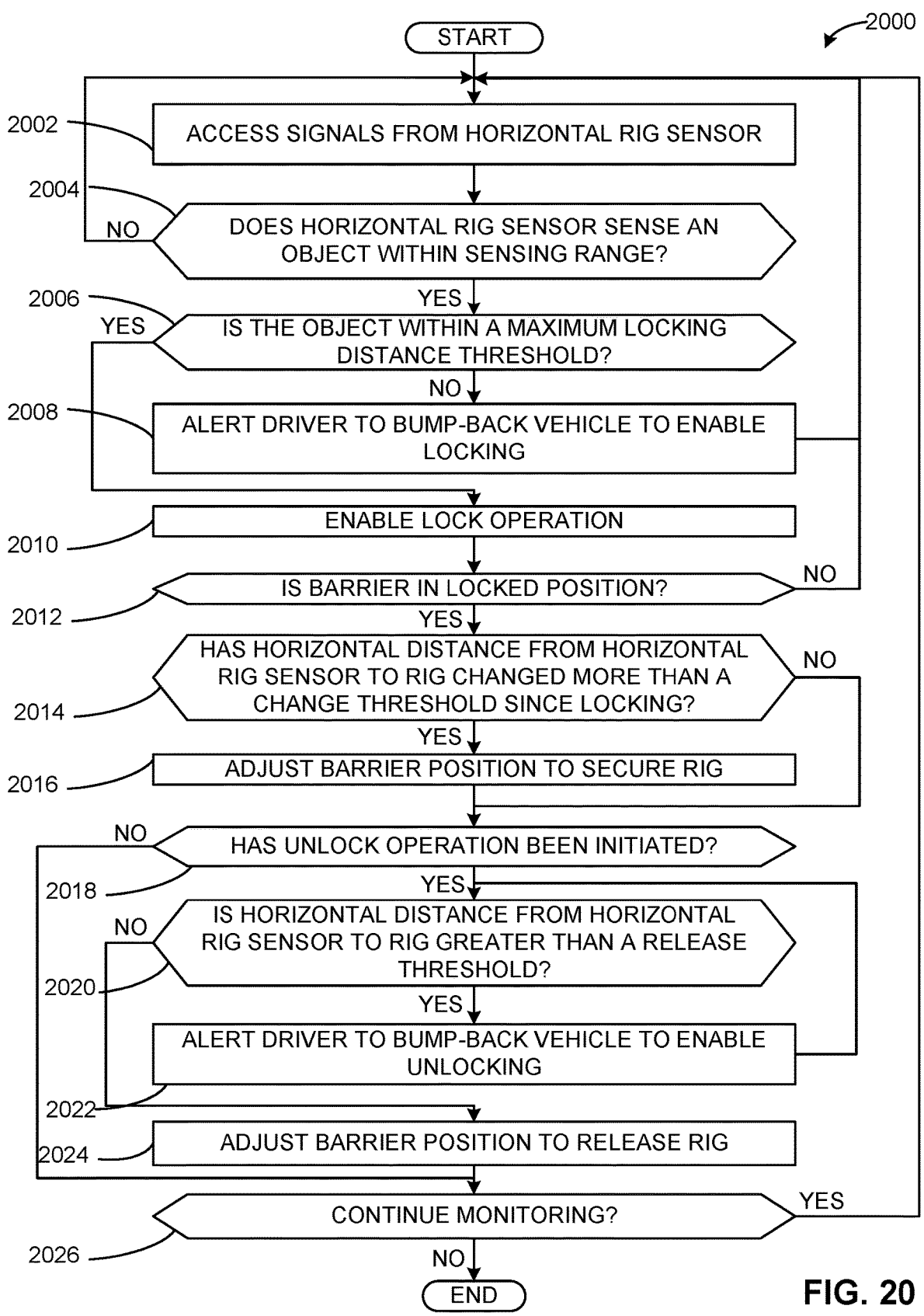
FIG. 20 is an example flowchart representative of example machine readable instructions which can be executed to implement the example controller of FIG. 2 to analyze sensor data and issue commands and alerts for an example vehicle restraint system having an example horizontal RIG sensor disclosed herein.

FIG. 11 is a side view of another example alternative vehicle restraint system 1102 disclosed herein. The vehicle restraint system 1102 of the illustrated example includes the horizontal RIG sensor 214. The controller 222 employs the horizontal RIG sensor 214 to determine whether an object is present within a sensing proximity and/or whether the object is within a locking distance threshold 402 ($D_{LT}$). The controller 222 of the illustrated example enables the barrier 206 to be moved to the operational position when the horizontal RIG sensor 214 senses the RIG 106 within the locking distance threshold 402 ($D_{LT}$). The controller 222 of the illustrated example issues an alert to inform a driver to move the vehicle closer to the dock face wall 114 when the RIG is detected but the RIG is not within the locking distance threshold 402 ($D_{LT}$). In some examples, if an operator inputs a command to unlock the barrier 206 (e.g., move the barrier from the operational position to the stored position), the horizontal RIG sensor 214 detects whether the RIG 106 is within a release threshold ($R_T$). In some such examples, if the RIG 106 is within the release threshold, the barrier 206 can be moved to the stored position. Conversely, if the RIG 106 is not within the release threshold, the controller 222 can issue an alert for a driver to move the vehicle 102 toward the dock face wall 114. Example instructions to implement the controller 222 of the vehicle restraint system 1102 are illustrated in FIG. 20.

Figure 12:
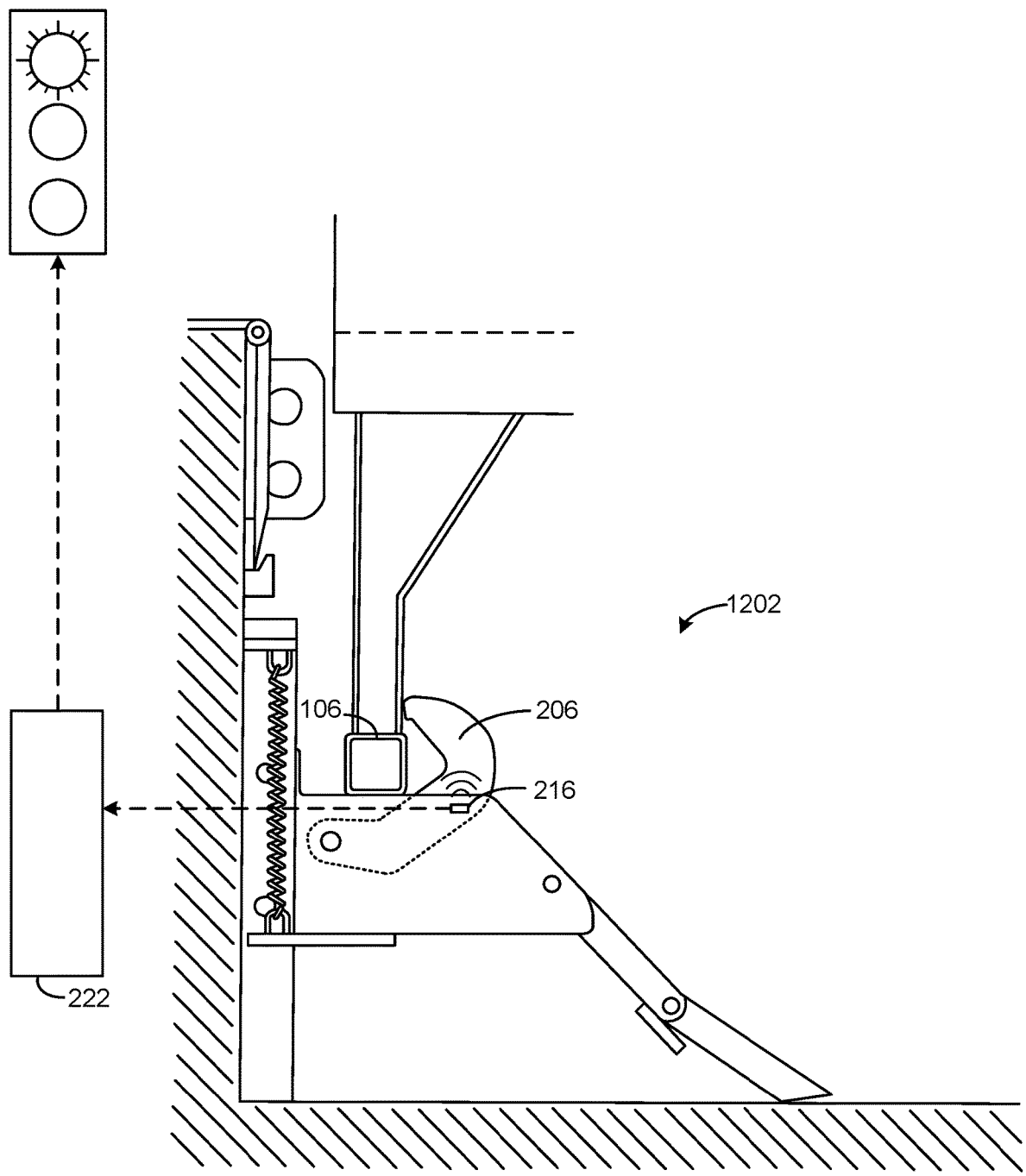
FIG. 12 is a side view of another example vehicle restraint system including an example vertical RIG sensor disclosed herein.
Figure 21:
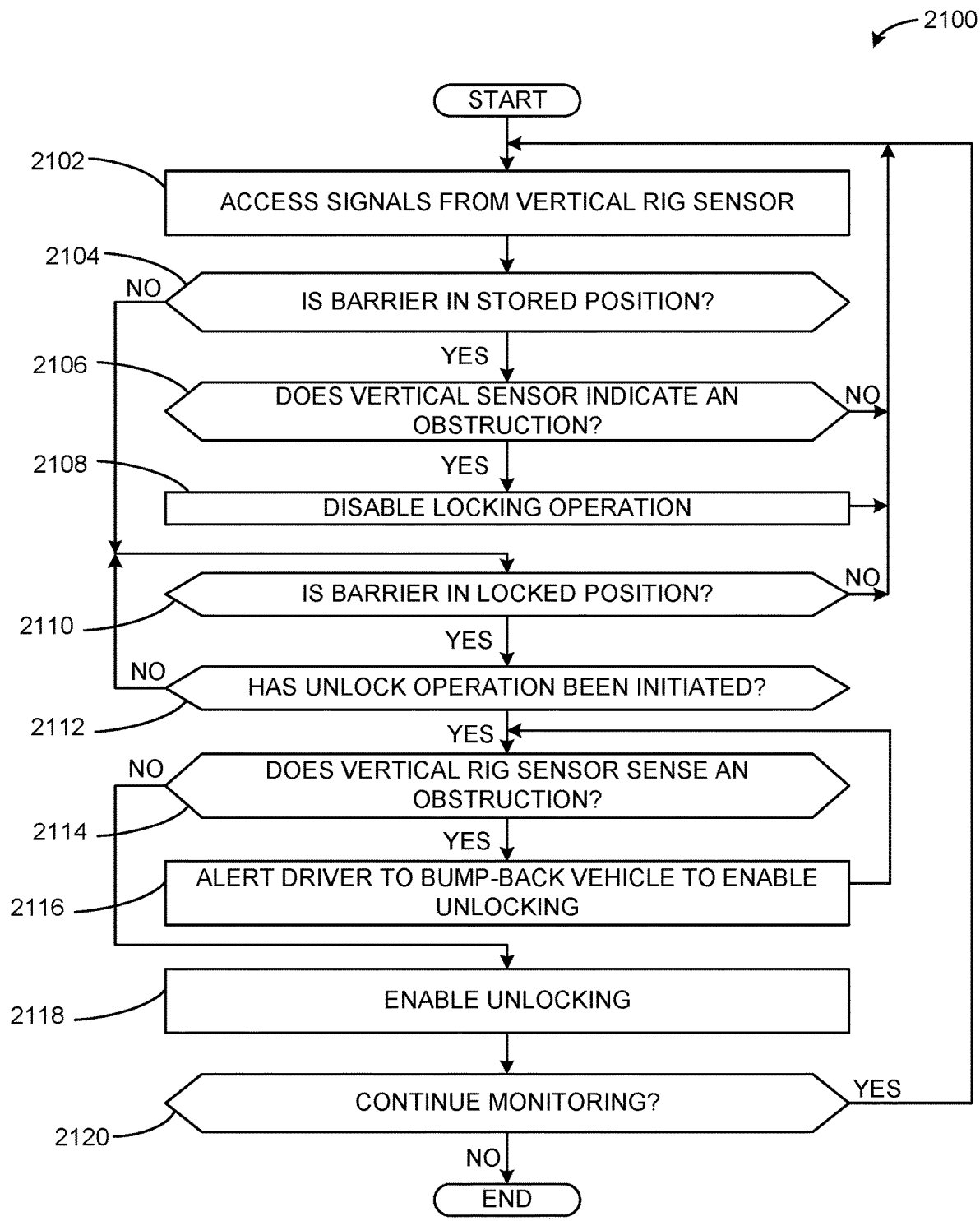
FIG. 21 is a flowchart representative of example machine readable instructions which can be executed to implement the example controller of FIG. 2 to analyze sensor data and issue commands and alerts for an example vehicle restraint system having an example vertical RIG sensor disclosed herein.

FIG. 12 is a side view of another example vehicle restraint system 1202 disclosed herein that includes the vertical movement sensor 220. In this example, the controller 222 determines whether there is a potential for interference when actuating the barrier 206 from the stored position to the operational position. In response to the vertical RIG sensor 216 detecting the RIG 106, the controller 222 prevents actuation of the barrier 206 until the vertical RIG sensor 216 no longer senses the RIG. Example instructions to implement the controller 222 of the vehicle restraint system 1202 are illustrated in FIG. 21.

Figure 13:
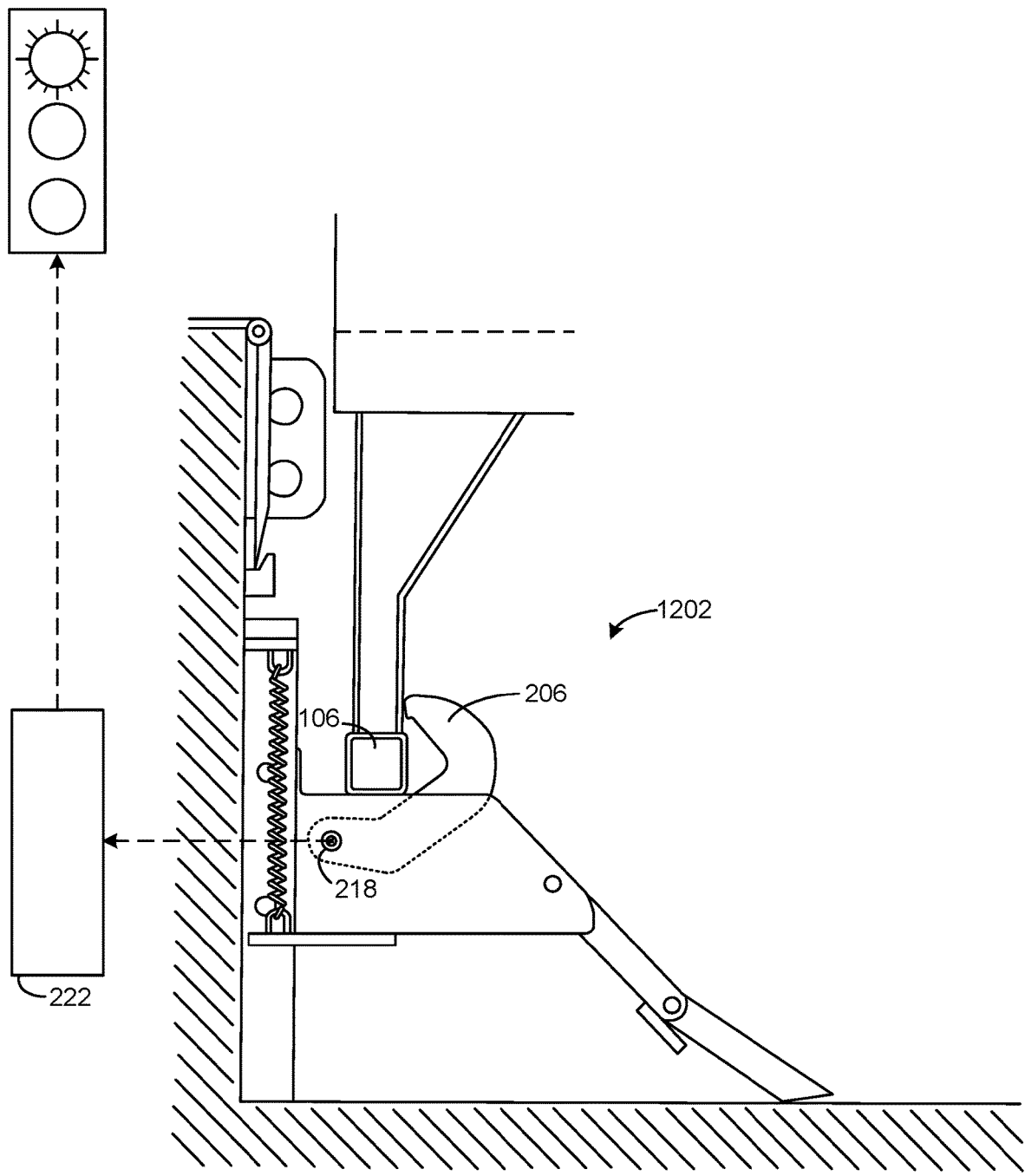
FIG. 13 is a side view of another example vehicle restraint system including an example barrier sensor disclosed herein.
Figure 22:
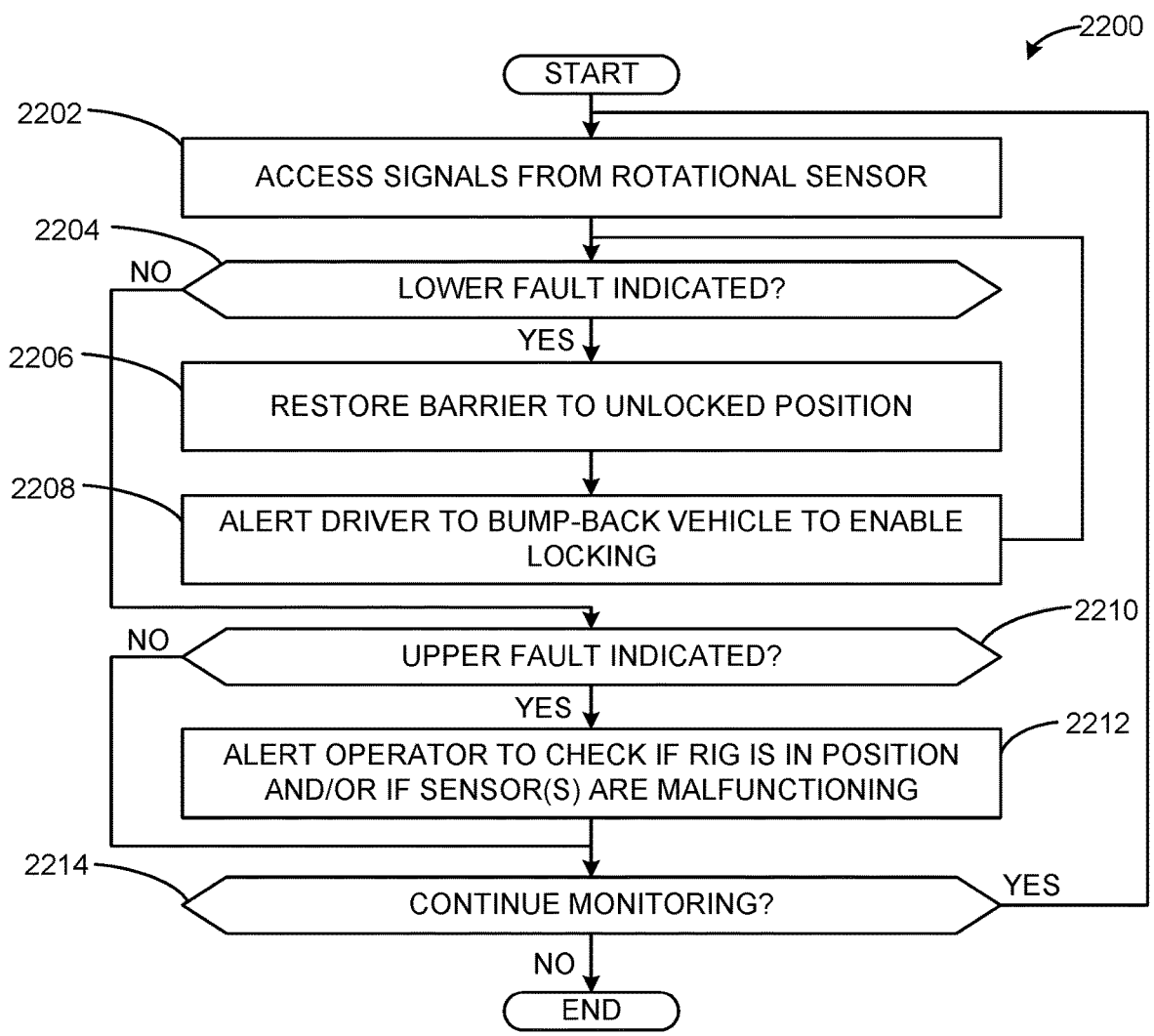
FIG. 22 is a flowchart representative of example machine readable instructions which can be executed to implement the example controller of FIG. 2 to analyze sensor data and issue commands and alerts for an example vehicle restraint system having an example a barrier sensor disclosed herein.

FIG. 13 is a side view of another example vehicle restraint system 1302 disclosed herein including the barrier sensor 218. The controller 222 determines the position of the barrier 206 based on the signal from the barrier sensor 218 and determines whether the barrier 206 is in the lower fault state, the upper fault state, the stored position, and/or the operational position. The controller 222 issues corresponding alerts and/or commands based on the detected rotational position of the barrier 206. For example, if the barrier 206 is in the upper fault state or the lower fault state, the controller 222 commands the barrier 206 to return to the stored state and issue an alert to inform an operator of the fault condition. Example instructions to implement the controller 222 of the vehicle restraint system 1302 are illustrated in FIG. 22.

Figure 14:
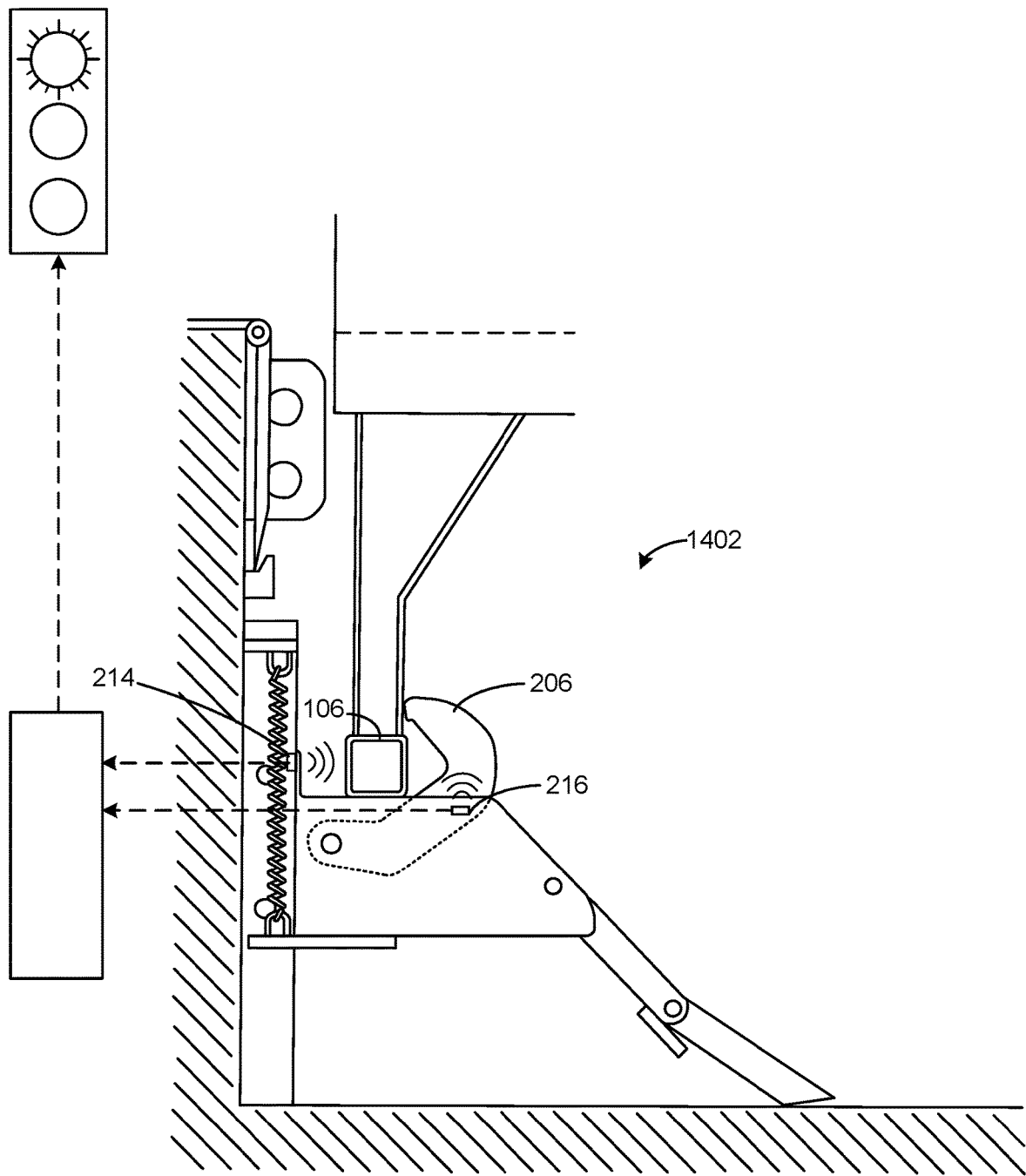
FIG. 14 is a side view of another example vehicle restraint system including an example horizontal RIG sensor and an example vertical RIG sensor disclosed herein.
Figure 23:
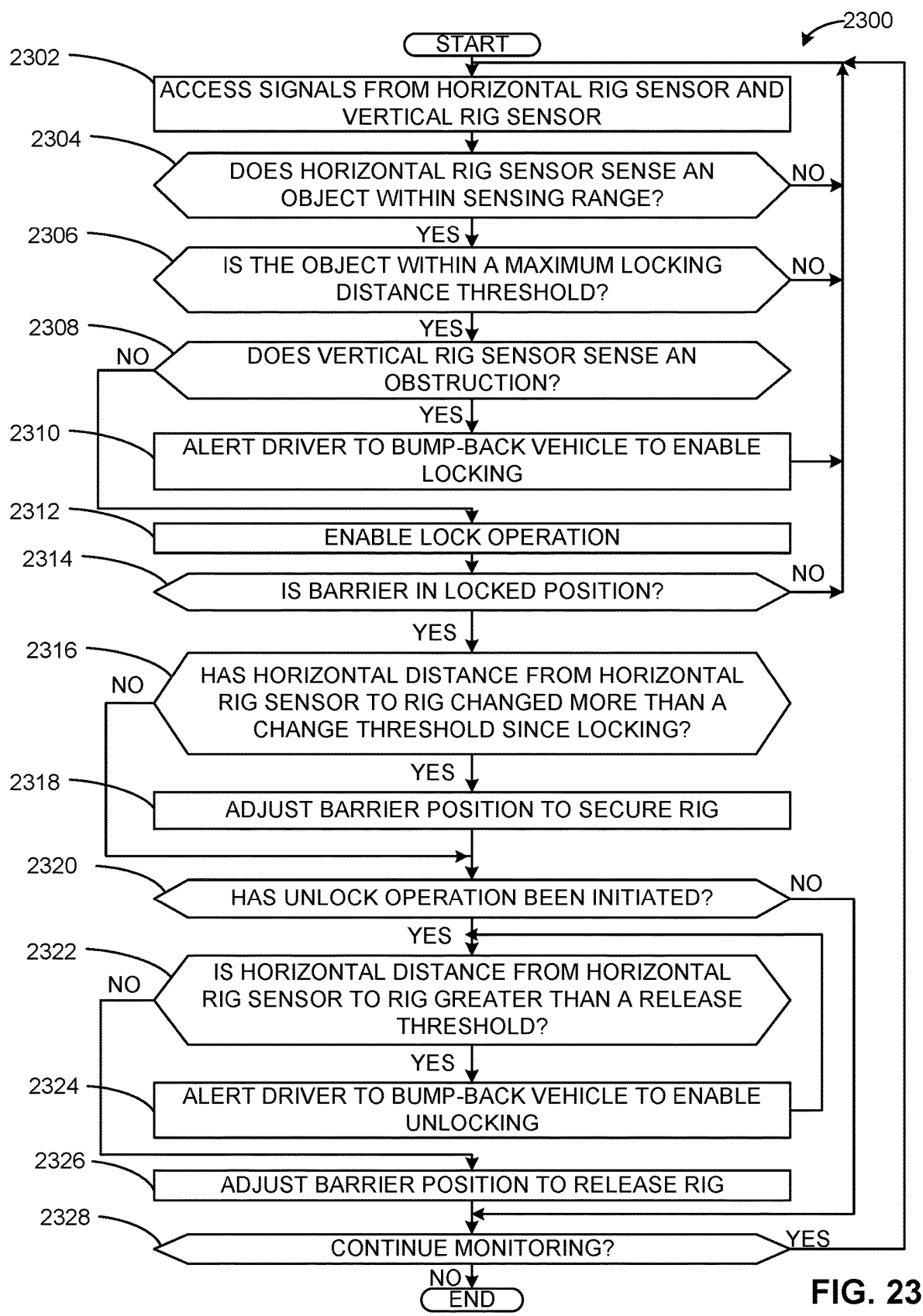
FIG. 23 is a flowchart representative of example machine readable instructions which can be executed to implement the example controller of FIG. 2 to analyze sensor data and issue commands and alerts for an example vehicle restraint system having an example horizontal RIG sensor and an example vertical RIG sensor disclosed herein.

FIG. 14 is a side view of an example vehicle restraint system 1402 disclosed herein including the horizontal RIG sensor 214 and the vertical RIG sensor 216. Example instructions to implement the controller 222 of the vehicle restraint system 1402 are illustrated in FIG. 23.

Figure 15:
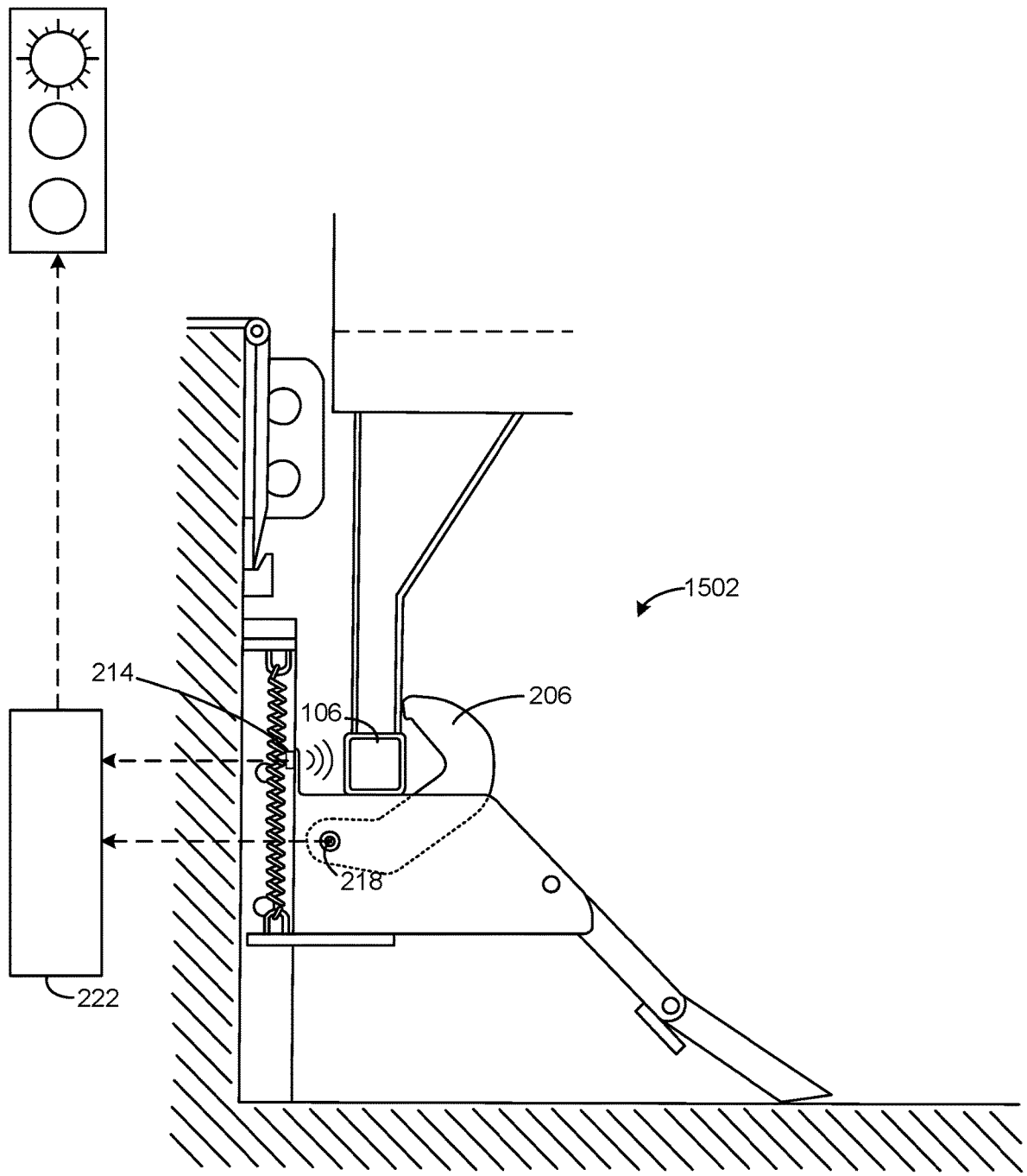
FIG. 15 is a side view of another example vehicle restraint system including an example horizontal RIG sensor and an example barrier sensor disclosed herein.
Figure 24A:
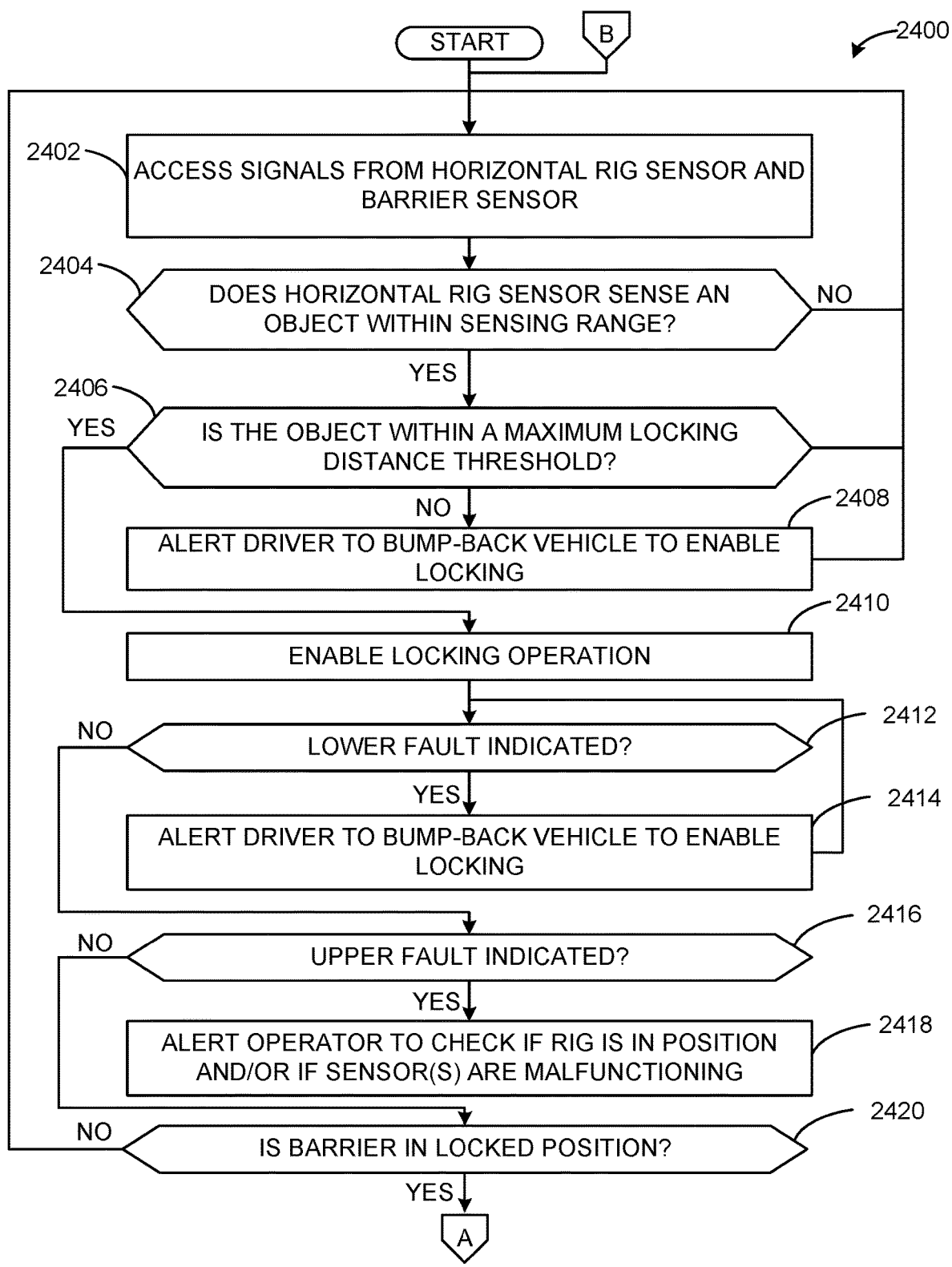
FIGS. 24A-24B illustrate a flowchart representative of example machine readable instructions which can be executed to implement the example controller of FIG. 2 to analyze sensor data and issue commands and alerts for an example vehicle restraint system having an example horizontal RIG sensor and an example barrier sensor disclosed herein.
Figure 24B:
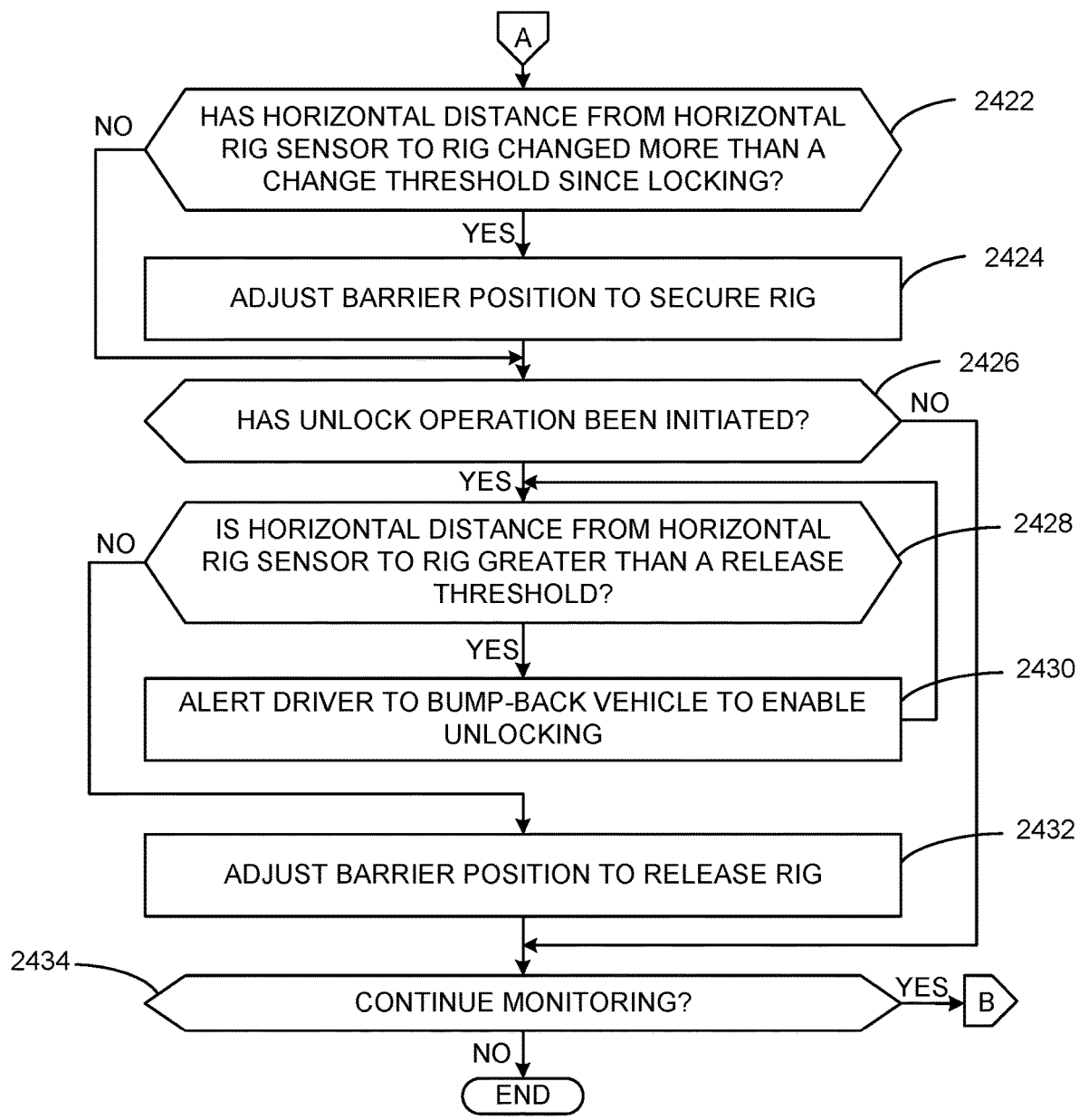

FIG. 15 is a side view of an example vehicle restraint system 1502 including the horizontal RIG sensor 214 and the barrier sensor 218. In some examples, the controller 222 includes an auto-lock function. For example, if the barrier sensor 218 detects a lower fault (e.g., indicating that the barrier 206 can have interfered with the RIG 106), the controller 222 commands the barrier 206 to return to the stored position. Additionally, if the horizontal RIG sensor 214 detects that a distance from the horizontal RIG sensor 214 to the RIG 106 has decreased, the controller 222 automatically causes the barrier 206 to move to the operational position. Example instructions to implement the controller 222 of the vehicle restraint system 1402 are illustrated in FIGS. 24A-24B.

Figure 16:
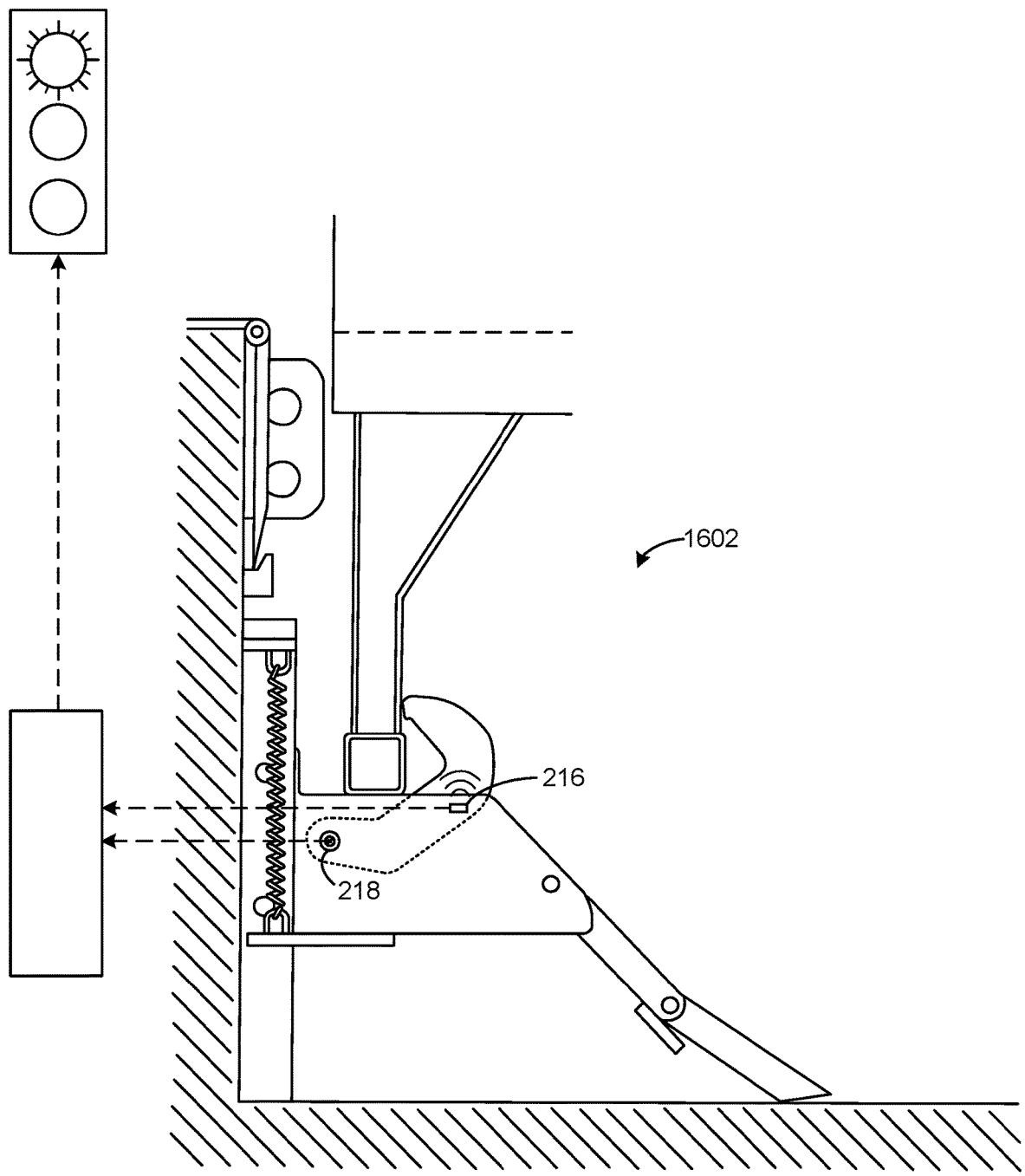
FIG. 16 is a side view of another example vehicle restraint system including an example vertical RIG sensor and an example barrier sensor disclosed herein.
Figure 25:
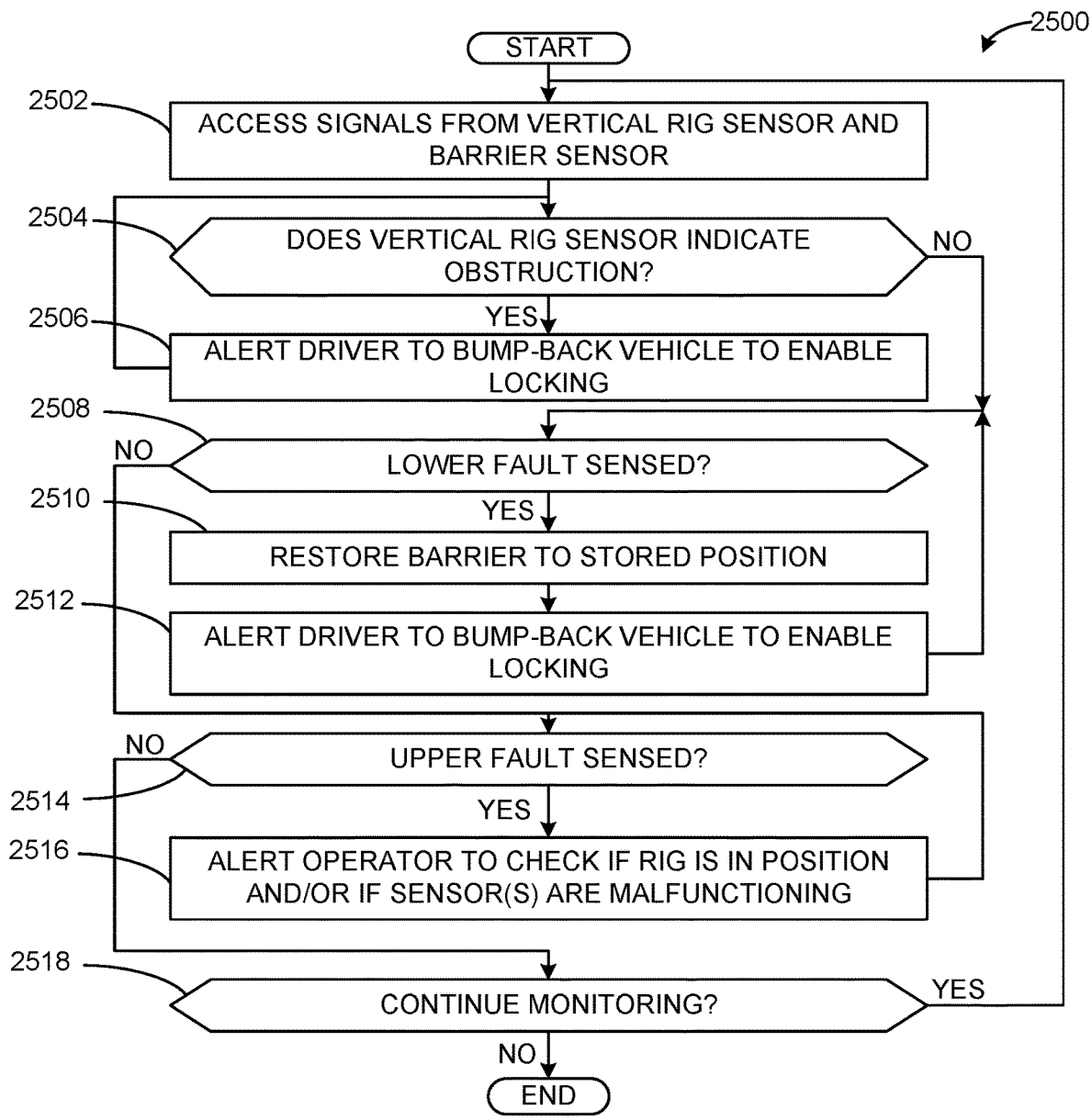
FIG. 25 is a flowchart representative of example machine readable instructions which can be executed to implement the example controller of FIG. 2 to analyze sensor data and issue commands and alerts for an example vehicle restraint system having an example vertical RIG sensor and an example barrier sensor disclosed herein.

FIG. 16 is a side view of another example vehicle restraint system 1602 disclosed herein including the vertical RIG sensor 216 and the barrier sensor 218. Example instructions to implement the controller 222 of the vehicle restraint system 1402 are illustrated in FIG. 25.

Figure 26:
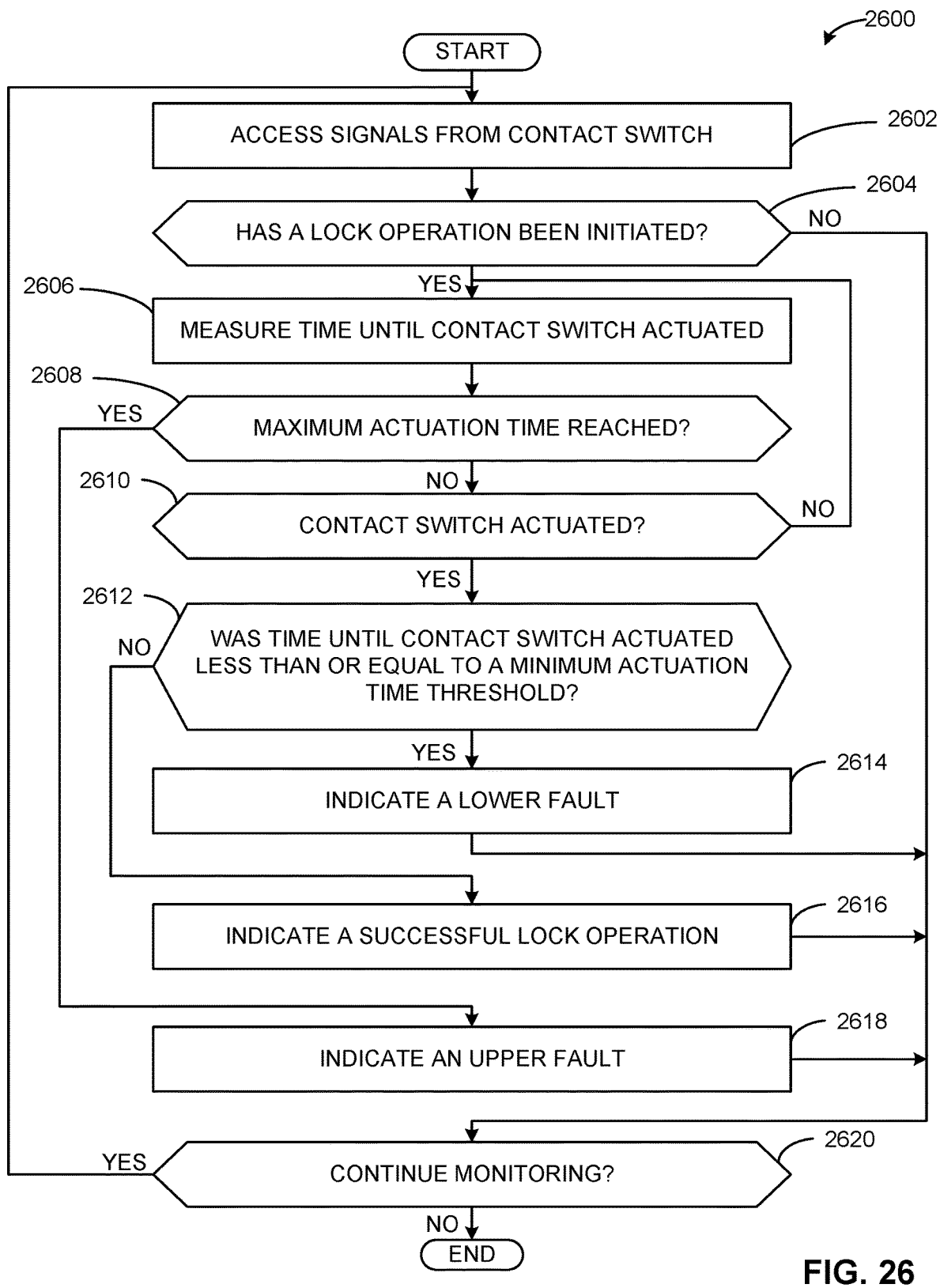
FIG. 26 is a flowchart representative of example machine readable instructions that can be executed to implement the example controller of FIG. 2 to analyze sensor data and issue commands and alerts for an example vehicle restraint system having an example contact switch disclosed herein.

FIG. 17A is a side view of another example vehicle restraint system 1702 disclosed including the horizontal RIG sensor 214 and an example contact switch 1708. The vehicle restraint system 1702 includes an example contact lever 1704 that is connected to the shaft 208. When the barrier 206 is in the stored position, the contact lever 1704 is maintained in a first position against a stop pin 1706 (e.g., biased by a spring). When the barrier 206 moves to the operational position and contacts the RIG 106, the contact lever 1704 is depressed. The contact lever 1704 contacts an example contact switch 1708 when the contact lever 1704 is depressed. In some examples, the controller 222 determines an angular position of the barrier 206 based on an amount of time between the moment that the barrier starts moving to the operational position and the moment that the contact switch 1708 is engaged (e.g., activated). For example, the controller 222 determines, based on a known angular velocity of the barrier 206, that the barrier 206 is in a lower fault state, an upper fault state, or in the operational position. In response to determining that the barrier 206 is in a lower fault state based on the amount of time it took for the barrier 206 to contact the RIG 106, the controller 222 causes the barrier 206 to return to the stored position. In some examples, the controller can attempt to move the barrier 206 to the operational position when the horizontal RIG sensor 214 detects that a distance from the horizontal RIG sensor 214 and the RIG 106 has decreased. The horizontal RIG sensor 214 can be advantageously employed along with the contact switch 1708, where the horizontal RIG sensor 214 indicates a position of the vehicle to determine whether the barrier 206 can be actuated to the operational position, and the contact switch provides an indication as to whether the barrier 206 is engaged with the RIG 106. Example instructions to implement the controller 222 of the vehicle restraint system 1402 are illustrated in FIG. 26.

Figure 17B:
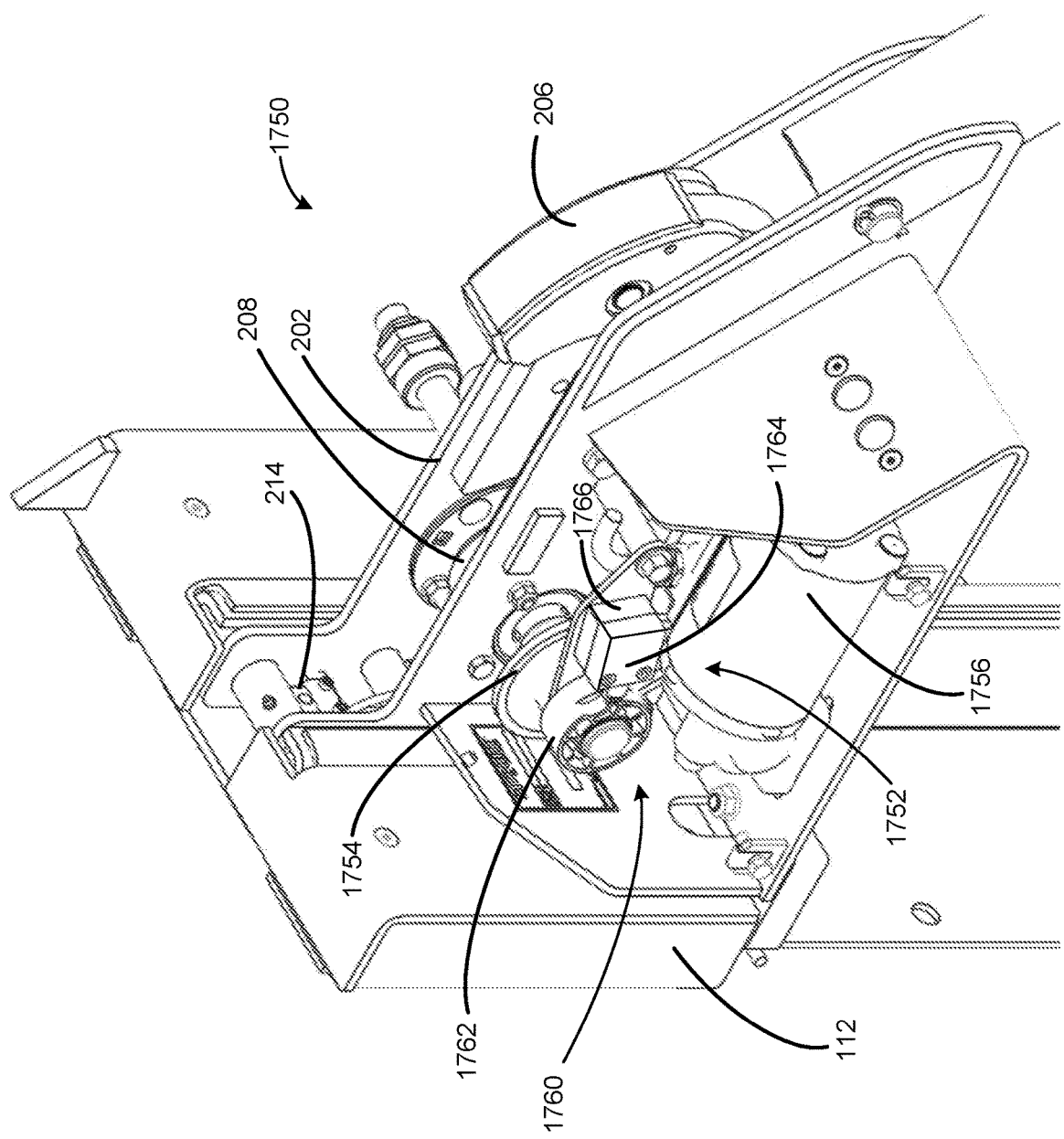
FIG. 17B is perspective view of another example vehicle restraint system disclosed herein including an example horizontal RIG sensor.
Figure 17C:
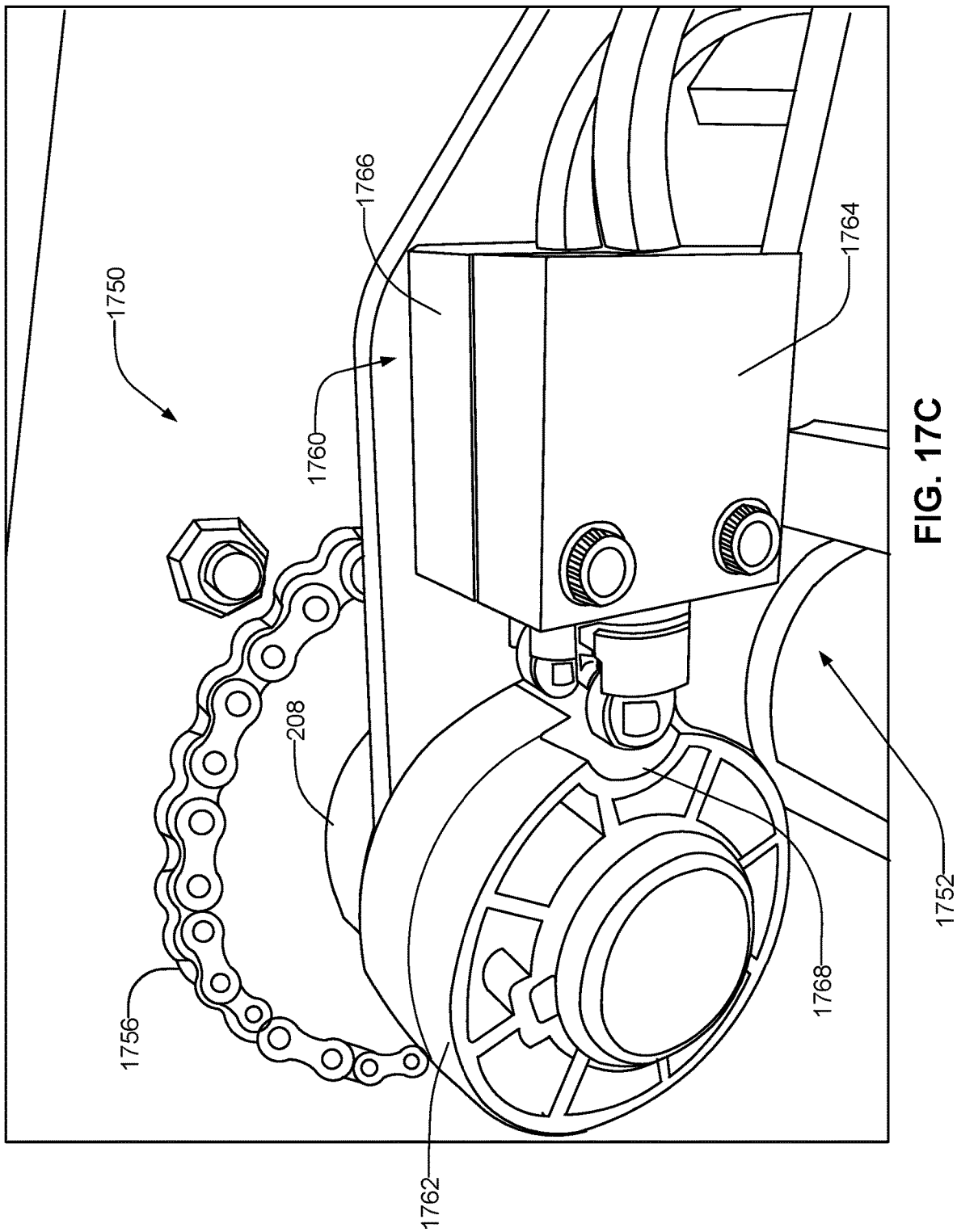
FIG. 17C is an enlarged, partial view of the example vehicle restraint system of FIG. 17B.

FIG. 17B is a perspective view of another example vehicle restraint system 1750 disclosed herein. FIG. 17C is an enlarged, partial view of the example vehicle restraint system 1750 of FIG. 17B. The vehicle restraint system 1750 of the illustrated example includes the horizontal RIG sensor 214 to determine whether an object (e.g., the RIG 106) is present within a sensing proximity and/or whether the object is within a locking distance threshold 402 ($D_{LT}$) as described, for example, in connection with the example vehicle restraint systems 108, 1102-1702 of FIGS. 1-16 and 17A.

To rotate the barrier 206 of the illustrated example between the stored position and the operational position (e.g., a raised position relative to a main body 202), the vehicle restraint system 1750 of the illustrated example includes the drive system 1752 (e.g., a transmission). The drive system 1752 of the illustrated example includes a sprocket 1754 that is driven by a motor 1756. The sprocket 1754 of the illustrated example is coupled (e.g., keyed, fixed, etc.) to the shaft 208. The motor 1756 (e.g., via an output shaft of the motor) is operatively coupled to the sprocket 1754 via a chain 1758 (FIG. 17C). In some examples, the shaft 208 and (e.g., the output shaft of) the motor 1756 can be operatively coupled via a gear train (e.g., two or more gears), a gear box, a belt and/or other transmission(s). Rotation of the sprocket 1754 in a first rotational direction via the motor 1756 causes the barrier 206 to rotate in the first rotational direction (e.g., a counterclockwise direction in the orientation of FIG. 17B) and rotation of the sprocket 1754 in a second rotational direction via the motor 1756 causes the barrier 206 to rotate in a second rotational direction (e.g., a clockwise direction in the orientation of FIG. 17B) opposite the first rotational direction.

To detect a rotational position of the barrier 206 (e.g., the stored position, the operational position, the lower fault position and/or the upper fault position, etc.), the vehicle restraint system 1750 of the illustrated example includes a barrier sensing system 1760. The barrier sensing system 1760 of the illustrated example includes a cam 1762, a first limit switch 1764 and a second limit switch 1766. The cam 1762 is coupled (e.g., fixed, attached or keyed) to an end of the shaft 208 and rotates with the shaft 208. The cam 1762 of the illustrated example rotates relative to the first limit switch 1764 and the second limit switch 1766. The cam 1762 includes a first indicator 1768 (FIG. 17C) and a second indicator (similar to the first indicator 1768 but located on the cam 1762 opposite the first indicator 1768 in the orientation of FIG. 17B). The first indicator 1768 of the illustrated example interacts with the first limit switch 1764 and the second indicator of the illustrated example interacts with the second limit switch 1766. For example, alignment of the first indicator 1768 (e.g., immediately adjacent) with the first limit switch 1764 is indicative of the barrier 206 being in the stored position and alignment of the second indicator (e.g., immediately adjacent) with the second limit switch 1766 is indicative of the barrier 206 being in the operating position. The cam 1762 can include a third indicator that aligns with the first limit switch 1764 to indicative that the barrier 206 is in the upper fault position and/or a fourth indicator that aligns or interacts with the second limit switch 1766 to indicate that the barrier 206 is in the lower fault position.

Figure 17D:
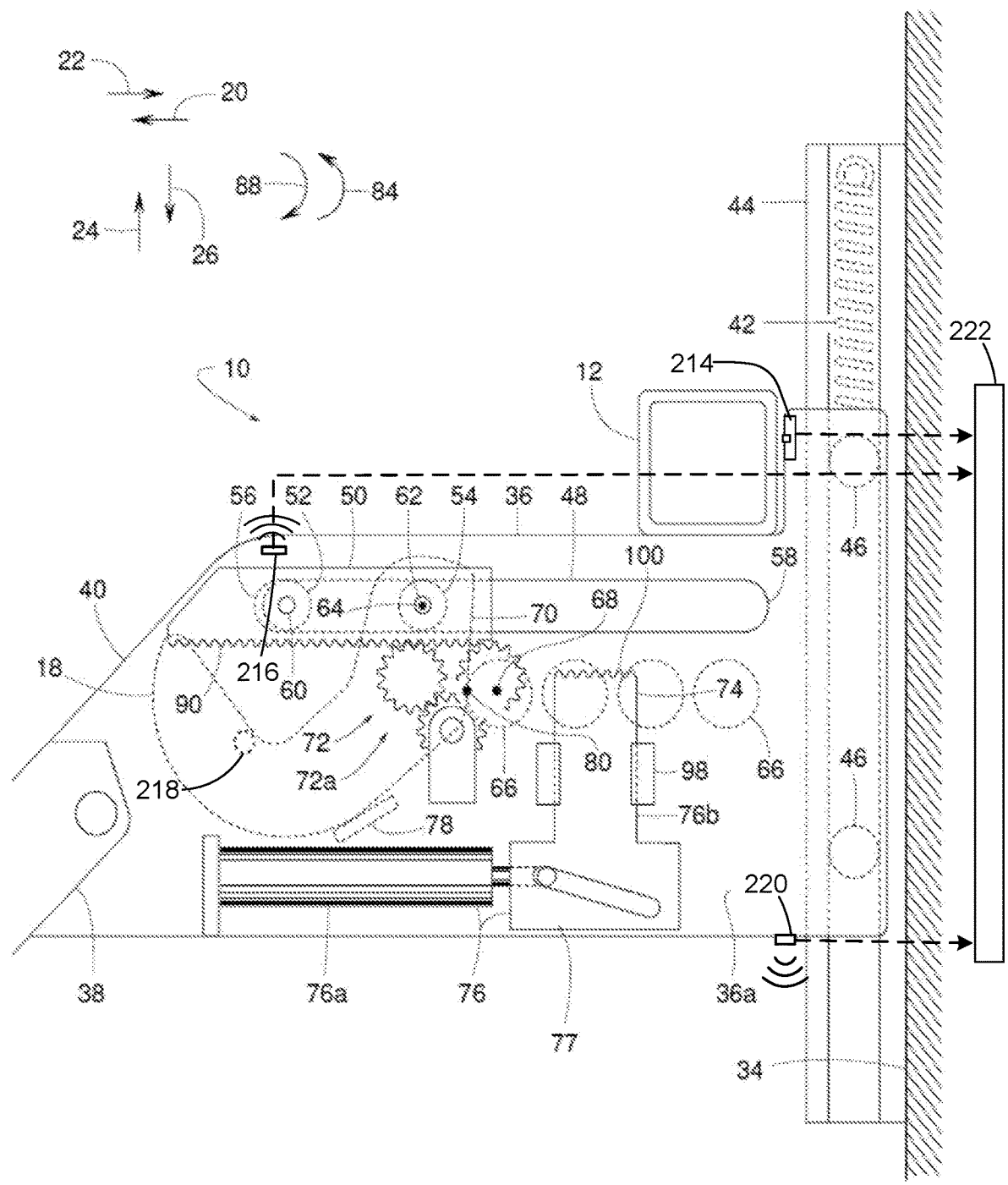
FIG. 17D-17G are side views of another example vehicle restraint system disclosed herein including an example horizontal RIG sensor, an example vertical RIG sensor and an example vertical sensor.

FIG. 17D illustrates another example vehicle restraint 10 disclosed herein. Specifically, the vehicle restraint system 10 of the illustrated example includes the horizontal RIG sensor 214, the example vertical RIG sensor 216, the example barrier sensor 218 and the example vertical movement sensor 220 of FIGS. 2A and 2B. The horizontal RIG sensor 214, the example vertical RIG sensor 216, the barrier sensor 218 and the example vertical movement sensor 220 communicate one or more signals to the controller 22 to enable operation of the vehicle restraint system 10 (e.g., as described, for example, in connection with the example vehicle restraint systems 108, 1102-1702 of FIGS. 1-16 and 17A).

In the illustrated example, the vehicle restraint system 10 includes a main track 44, a carriage frame 36 (including a first panel 36a and a second panel opposite the first panel 36a), a main track follower 46 (e.g., rollers, sliding blocks, etc.) that enables the carriage frame 36 to travel along the main track 44, and a bias element 42 (e.g., spring) to urge the carriage frame 36 in an upward direction 24. The vehicle restraint system 10 of the illustrated example includes a secondary track 48 (e.g., a slot, a channel, a bar, a groove, a ledge, etc.) formed in or carried on the carriage frame 36. A track follower 50 moves (slides, glides or otherwise travels) in guided relationship along the secondary track 48. For example, the track follower 50 moves (slides, glides or otherwise travels) in guided relationship along a longitudinal length (e.g., in a forward direction 20 and a rearward direction 22) of the secondary track 48 between a first or front end 56 (e.g., a forward end) and a second or rear end 58 (e.g., a rearward end) of the secondary track 48. The term, "guided relationship" refers to one structure or feature guiding the travel of another structure or feature. The track follower 50 of the vehicle restraint 10 of FIG. 17D includes a front roller 52 and a rear roller 54 (e.g., a back roller). In the illustrated example, the front roller 52 and the rear roller 54 are substantially equal in elevation (e.g., in the vertical direction) regardless of whether the barrier 18 is in the raised position, the stored position and/or the capturing position.

In some examples, the vehicle restraint system 10 also includes a first shaft 60 coupling the track follower 50 and the front roller 52, and a second shaft 62 coupling the track follower 50 to both the barrier 18 and the rear roller 54 such that the barrier 18 pivots about a pivot 64 (e.g., a pivot axis, a pivot point, etc.) defined by a second shaft 62. Some examples of the vehicle restraint 10 further include a roller 66 (or a plurality of rollers 66) rotatable about an axis 68 that is at a fixed location relative to the carriage frame 36, and a cam surface 70 on the underside of the barrier 18 to engage and/or move along (e.g., glide over) the roller 66.

To rotate the barrier 18 between the stored position and the raised position and/or to slide the barrier 18 laterally to the capturing position, the vehicle restraint system 10 of the illustrated example includes an actuator assembly 72. The actuator assembly 72 includes a drive unit 72a (e.g., a motor) that moves the track follower 50 and the barrier 18 in the forward direction 20 and/or the rearward direction 22 along the secondary track 48. Additionally, as described in greater detail below, movement of the barrier 18 along the secondary track 48 via the track follower 50 causes the barrier 18 to rotate about the pivot 64 between the stored position and the raised position. For example, the barrier 18 rotates between the stored position and the raised position as the track follower 50 moves between the first end 56 of the secondary track 48 and the second end 58 of the secondary track 48. The drive unit 72a of the illustrated example is a powered rack-and-pinion assembly that includes a rack 90, a lower pinion 82 (e.g., a gear, a pinion gear), and upper pinions 86 (e.g., two upper pinions or gears, pinion gears, etc.). The upper pinions 86 enmesh with one or more projections and/or voids (e.g., serrated teeth, saw-tooth shaped teeth, etc.) of the rack 90 of the track follower 50 such that rotation of the upper pinions 86 cause the track follower 50 to translate (e.g., move or slide) along the secondary track 48 between the first end 56 and the second end 58. For example, the drive unit 72a may include a motor (e.g., an electric motor) that rotates the lower pinion 82 in the clockwise direction 88 and the counterclockwise direction 84. Rotation of the lower pinion 82 in the counterclockwise direction 84 causes rotation of the upper pinions 86 in the clockwise direction 88, and vice versa. The drive unit 72a (e.g., the illustrated rack-and-pinion assembly) of the illustrated example includes the upper pinions 86 to enable a greater travel distance of the track follower 50 than would otherwise be possible in alternative examples in which the track follower 50 is driven by just one of the upper pinions 86 engaging the rack 90. The actuator assembly 76 of the illustrated example is shown outside (e.g., a dimensional envelope) of the carriage frame 36. However, in some examples, the actuator assembly 76 may be positioned within (e.g. a dimensional envelope or inside) of the carriage frame 36. For example, in some such example, the carriage frame 36 may be formed with a width that is greater than shown in the example illustration to accommodate the actuator assembly 76.

To (e.g., selectively) hold and release the barrier 18 and/or the track follower 50, the vehicle restraint system 10 of the illustrated example includes a catch 74. The catch 74 of the illustrated example includes one or more voids and/or projections (e.g., serrated teeth, saw-tooth shaped teeth, etc.). To move the catch 74 between a holding position and a release position, the vehicle restraint system 10 of the illustrated example includes actuator assembly 76. The actuator assembly 76 of the illustrated example includes an actuator 76a (e.g., a hydraulic cylinder, a solenoid, an electric motor, a linear motor, etc.), a mechanism 77 (e.g., a sliding block, a pivotal block, etc.), or some combination thereof (e.g., a powered rack-and-pinion assembly, a powered chain-and-sprocket assembly, a powered leadscrew, a powered pivotal arm, etc.). Thus, the actuator assembly 76 (e.g., the actuator 76a and the mechanism 77) moves the catch 74 in a first direction (e.g., the upward direction 24) into engagement with (e.g., teeth of) the track follower 50 to lock or prevent movement of the barrier relative to the carriage frame 36 and a second direction (e.g., the downward direction 26) to disengage the catch 74 from the track follower 50 to allow movement of the barrier 18 relative to the carriage frame 36. The catch 74 can be an integral portion of the actuator assembly 76 (e.g., the mechanism 77) or a separate component. In some examples, the track follower 50 includes a rack (e.g., a linear gear or gear rack) with projections and/or voids (i.e., teeth) having a shape that provides a greater holding force when engaged with similar voids and/or projections (i.e., teeth) formed in the catch (e.g., such as the track follower 50a and the catch 74a of FIG. 9).

An example operating sequence of the vehicle restraint system 10 is described in FIGS. 17D-17G. The barrier 18 as shown in FIG. 17D is in the stored position (e.g., a fully retracted position). In the retracted position, the barrier 18 is below an upper surface of the carriage frame 36 that the rear impact guard RIG 12 engages when the vehicle 14 moves in the rearward direction 22 toward the forward-facing wall. In some examples, when the barrier 18 is in the stored position, the barrier 18 rests against, engages or otherwise is supported by a lower support bar 78 that extends laterally between the first panel 36a and the second panel, and the cam surface 70 of the barrier 18 engages the roller 66 at a first contact point 80. For example, the cam surface 70 is oriented toward the rearward direction 22 or the forward-facing wall 34 of the loading dock 16 when the barrier 18 is in the stored position.

Referring to FIG. 17D, the vehicle 14 moves rearward such that the rear impact guard 12 is positioned on the carriage frame 36 displacing the carriage frame 36 in the downward direction 26 along the main track 44 while the bias element 42 urges the carriage frame 36 in the upward direction 24 against an underside of the RIG 12. The horizontal RIG sensor 214 senses the RIG 12 and provides a signal to the controller 22. The vertical RIG sensor 216 senses for the RIG and provides a signal to the controller 22 indicative of the RIG not being present adjacent the barrier 18. In other words, the horizontal RIG sensor 214 and the vertical RIG sensor 216 provide feedback to the controller 222 to enable the controller 222 to determine that the RIG 12 is in position for capturing by the barrier 18 and the RIG 12 will not interfere with the operation of the barrier 18.

Figure 17E:
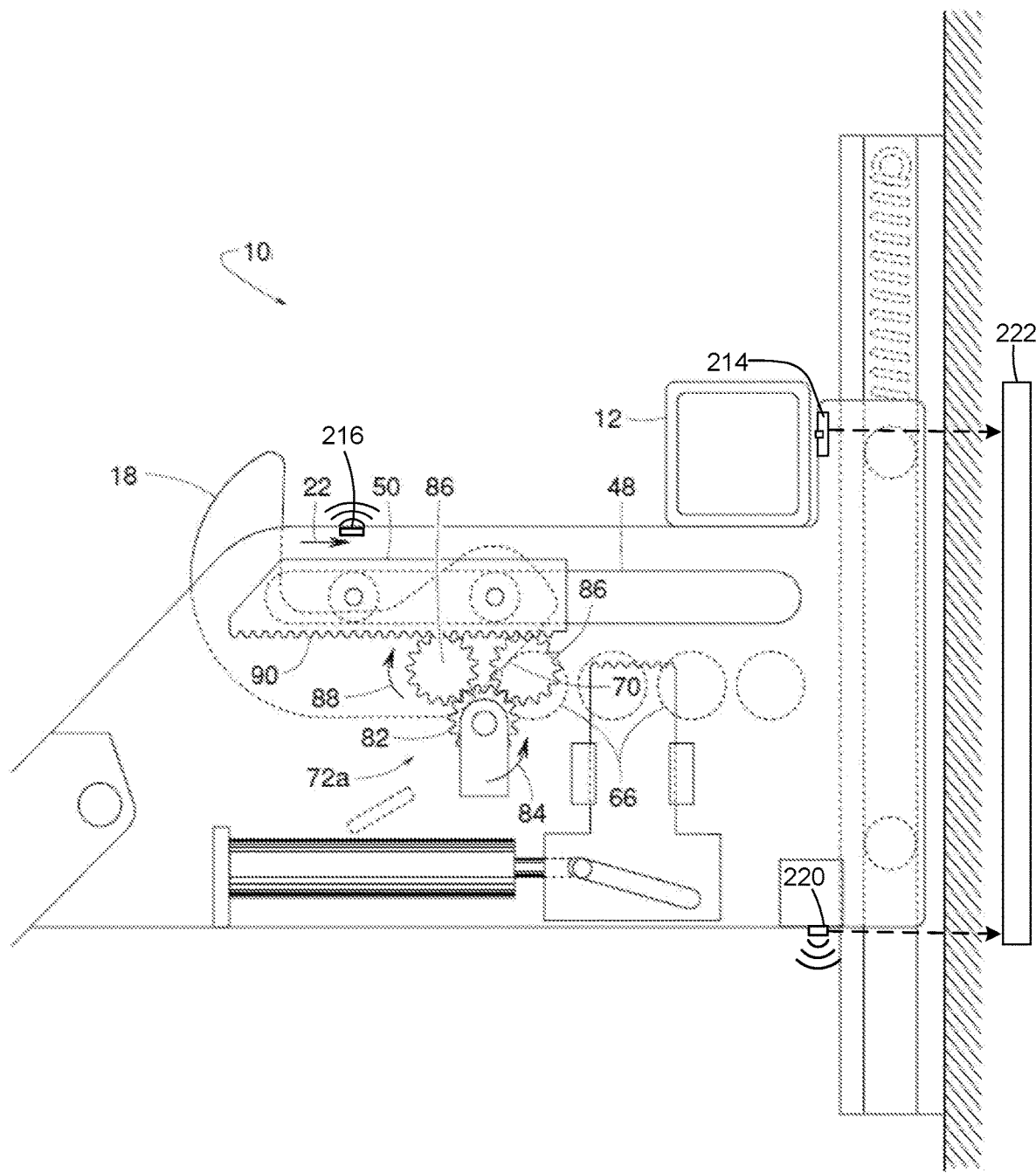

Referring to FIG. 17E, in response to determining that the RIG 12 is in position to be captured by the barrier 18, the controller 222 initiates operation of the barrier 18. To initiate operation, the controller 222 commands or activates the drive unit 72a to begin movement of the barrier 18 from the stored position toward the raised position and into the exit path of the rear impact guard 12. The barrier 18 rotates between the stored position and the raised position (e.g., a blocking position) when the track follower 50 moves along a first portion of the secondary track 48, and the barrier 18 translates (e.g., from the raised position or the blocking position) to the capturing position (e.g., to engage the RIG 12) when the track follower 50 moves along a second portion of the secondary track 48 different than the first portion. For example, the first portion of the secondary track 48 is between the first end 56 and an intermediate point (e.g., between the first end 56 and the second end 58), and the second portion is between the intermediate point and the second end 58.

In the illustrated example, the drive unit 72a drives or rotates the pinion 82 in the counterclockwise direction 84, which in turn causes the upper pinions 86 to rotate in the clockwise direction 88. The upper pinions 86 mesh with a rack 90 (e.g., a toothed gear, a toothed rack, a linear gear rack) of the track follower 50. In the illustrated example, rotation of the upper pinions 86 in the clockwise direction 88 causes the track follower 50 to move in the rearward direction 22 along the secondary track 48. Movement of the track follower 50 in the rearward direction 22 when the cam surface 70 is in engagement with the roller 66 at the first contact point 80 causes or forces the barrier 18 to rotate about the pivot 64 in the clockwise direction 88, causing the barrier 18 to rotate to a partially deployed position shown in FIG. 5 (e.g., in the upward direction 24 relative to the carriage frame 36) and extend above the upper surface of the carriage frame 36 (e.g., toward a blocking position).

Figure 17F:
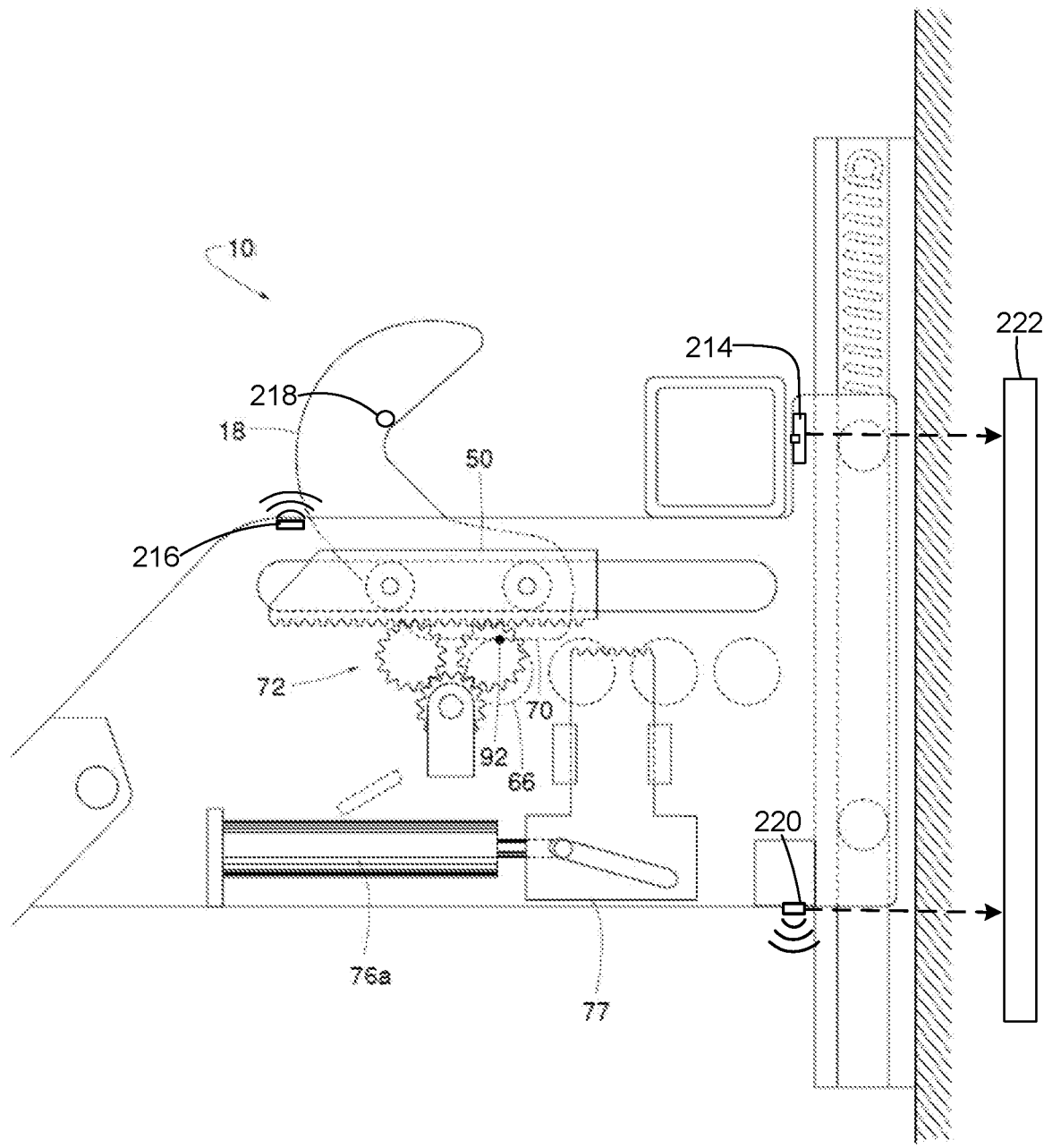

FIG. 17F shows the drive unit 72a having moved the cam surface 70 of the barrier 18 on top of the roller 66 such that the cam surface 70 engages the roller 66 at a second contact point 92. For example, the cam surface 70 is oriented in the downward direction 26 (e.g., oriented toward a ground of the loading dock 16). As illustrated in this example, as a point of contact between the cam surface 70 and the roller 66 shifts from the first contact point 80 to the second contact point 92, the barrier 18 rotates (e.g., pivots) from the stored position (FIG. 17D), through the partially deployed position (FIG. 17E), and to the raised position (FIG. 17F) (e.g., a maximum deployed or raised position). As shown in FIG. 17F, the rotation of the barrier 18 from the stored position (e.g., a fully stored position) to the raised position (e.g., a fully raised position or blocking position) occurs as the track follower 50 moves along a portion of the secondary track 48 from the first end 56 toward the second end 58. In the fully raised position, the barrier 18 of the illustrated example is closer to the main track 44 than when the barrier 18 is in the stored position, thereby reducing a horizontal distance that the rear impact guard 12 can freely travel away from the forward-facing wall 34. Additionally, in the raised position, the barrier 18 is positioned in a travel path of the rear impact guard 12, which can block movement of the rear impact guard 12 if the vehicle 14 attempts to leave the loading dock 16 when the barrier 18 is in the raised position (i.e., the blocking position). For example, in FIG. 17F, the barrier 18 is in a first deployed, blocking position.

Figure 17G:
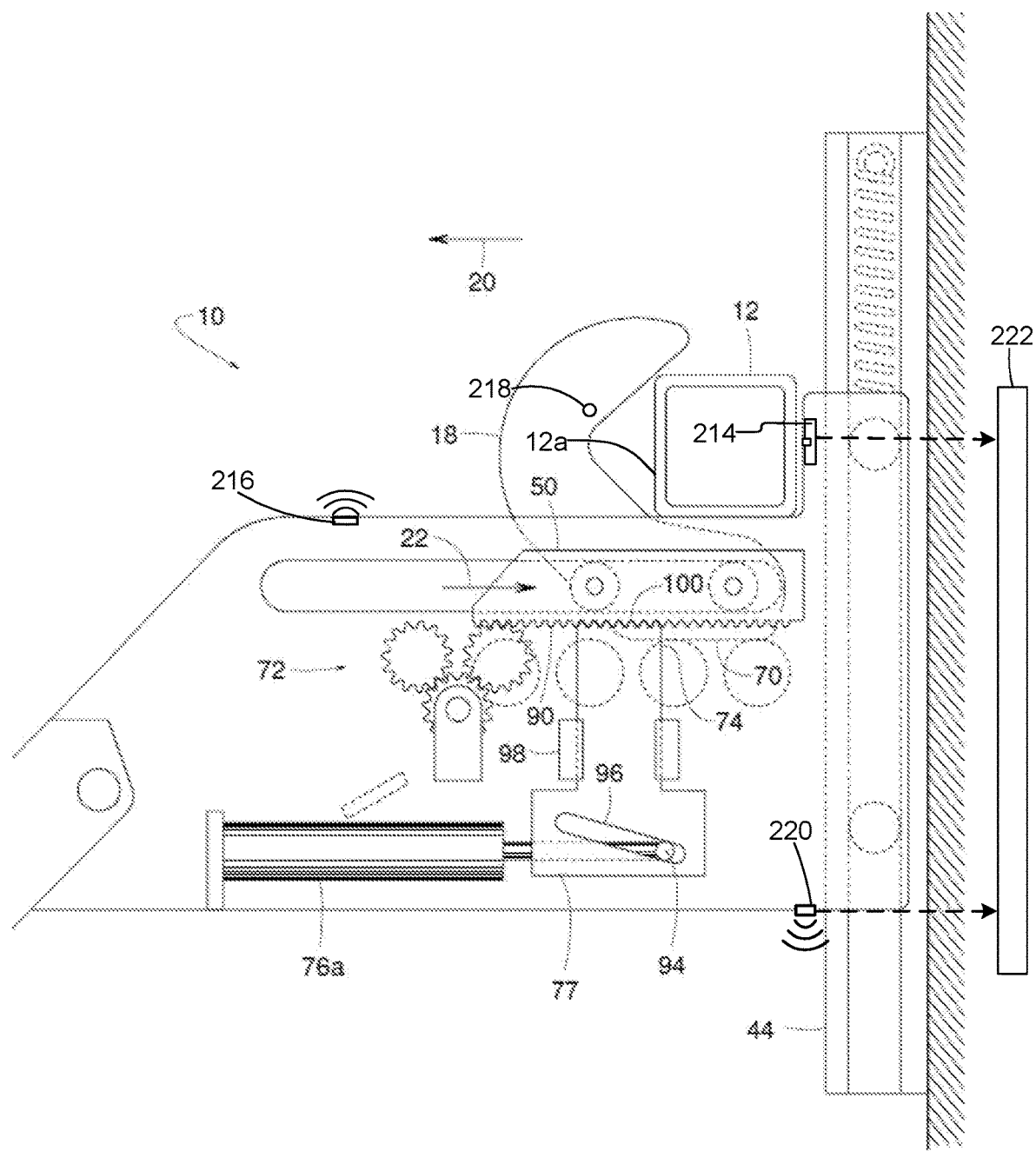

Referring to FIG. 17G, to move the barrier 18 into engagement with the rear impact guard 12 (e.g., a capturing position), the drive unit 72a continues to rotate the pinion 82 in the counterclockwise direction 84, which causes the track follower 50 and the barrier 18 to continue movement in the rearward direction 22. In some examples, the drive unit 72a is powered to move the track follower 50 until the barrier 18 directly engages, contacts, restrains and/or otherwise captures the rear impact guard 12. In other words, the drive unit 72a moves the barrier 18 laterally along the secondary track 48 from the blocking position (FIG. 17F) to the capturing position (FIG. 17G). In some examples, the drive unit 72a moves the track follower 50 and the barrier 18 to a specific distance in the rearward direction 22 to reduce a gap between the barrier 18 and the rear impact guard 12. For example, in FIG. 17G, the barrier 18 is in a deployed, capturing position. In some examples, the barrier sensor 218 detects when the barrier 18 is in the capturing position. For example, the barrier sensor 218 can include an ultrasonic sensor and/or a laser sensor to detect a distance (e.g., a horizontal distance) between the barrier 18 and a front side 12a of the RIG 12. In some examples, the drive unit 72a moves the barrier 18 toward the RIG 12 until a distance (e.g., a horizontal distance) between the barrier 18 and the RIG 12 is less than a threshold (e.g., a maximum allowable distance of separation between the barrier 18 and the RIG 12). In some examples, the threshold can be approximately between a quarter of an inch and three-quarters of an inch (e.g., one-half inch). In some example, the threshold can be a direct engagement between the barrier 18 and the RIG 12.

To secure the barrier 18 in the deployed, capturing position (FIG. 17G), the actuator 76a is activated to extend to lift the catch 74 from the release position (FIG. 17F) to the holding position (FIG. 17G). In the illustrated example, an extended moving end 94 of the actuator 76a travels along an inclined slot 96 formed in the catch 74 so that the linear (e.g., horizontal) movement of the extended end 94 translates to the vertical movement of the catch 74. Guide blocks 98 guide the vertical movement of the catch 74 between the release position and the holding position. In the holding position, a plurality of projections and/or voids 100 on the catch 74 engage rack 90 to firmly hold the track follower 50 and the barrier 18 in a locked position (e.g., preventing movement of the barrier 18 and/or the track follower 50 in the rearward direction 22 and/or the forward direction 20).

In some examples, the drive unit 72a can be reactivated to move the barrier 18 toward the RIG. 12 when the RIG 12 moves away from the barrier 18. For example, the horizontal RIG sensor 214 can sense if the RIG 12 has moved away from the dock face a distance that is greater than the distance threshold ($D_{LT}$) and/or the barrier sensor 218 can detect if the RIG 12 moves away from the barrier 18 to position at which a distance (e.g., a horizontal distance) between the barrier 18 and the RIG 12 is greater than a threshold (e.g., half an inch). In some such examples, the feedback (e.g., feedback signals) provided by the sensors 218 can cause the vehicle restraint system 10 (e.g., the controller 222 communicatively coupled to the horizontal RIG sensor 214 and/or the barrier sensor 218) to activate (e.g., reactivate) the drive unit 72a to move the barrier 18 toward the RIG 12 until the horizontal RIG sensor 214 provides a signal indicative of the RIG 12 being within the distance threshold ($D_T$) and/or the barrier sensor 218 provides a signal indicative of the distance (e.g., the horizontal distance) between the barrier 18 and the RIG 12 is less than the threshold (e.g., a maximum allowable distance of separation between the barrier 18 and the RIG 12, direct engagement between the RIG. 12 and the barrier 18, etc.). In some examples, the actuator 76a can be actuated to move the catch 74 to the release position prior to the drive unit 72a moving the barrier 18 to a distance relative to the RIG 12 that is within the threshold. After the drive unit 72a moves the barrier 18 to a distance relative to the RIG 12 that is within the threshold, the actuator assembly 76a can be activated to move the catch 74 to the holding position.

To release the barrier 18 and enable the vehicle's rear impact guard 12 to disengage from the vehicle restraint 10a, the sequence illustrated in FIGS. 17D, 17E, 17F and 17G is performed in reverse. In other words, the actuator 76a retracts to lower the catch 74 from the holding position to the release position to release the voids and/or projections of the rack 90 of the track follower 50. The drive unit 72a rotates the pinion 82 in the clockwise direction 88, causing the upper pinions 86 to rotate in the counterclockwise direction 84. In turn, the track follower 50 moves in the forward direction 20 via engagement between the teeth (projections and/or voids) of the rack 90 and the upper pinions 86, which causes the barrier 18 to translate from the capturing position (FIG. 17G) to the blocking position (FIG. 17F) and then rotate from the raised position (FIG. 17F), through the partially deployed position (FIG. 17E), and to the stored position (FIG. 17D). For example, when the cam surface 70 moves over or across the roller 66 at the second contact point 92 (e.g., the roller 66 closest to the first end 56 of the secondary track 48), the barrier 18 rotates (e.g., via gravity) counterclockwise about the pivot 64 such that the cam surface 70 then engages the roller 66 at the first contact point 80 (FIG. 17D). The support bar 78 (e.g., a stop) restricts rotation of the barrier 18 in the counterclockwise direction 84 beyond the stored position of FIG. 17D.

The example vehicle restraint 10 of FIGS. 17D-17G is a lift and slide type restraint. Various examples of lift and slide restraints, suitable actuator assemblies and/or catches can be used to employ the teachings of this disclosure. Some example vehicle restraints, actuator assemblies and/or catches are disclosed in U.S. patent application Ser. No. 15/991,790, which is incorporated herein by reference in its entirety.

Additionally, several examples have been described throughout this specification. Any features from any example can be included with, a replacement for, or otherwise combined with other features from other examples. In other words, the examples disclosed herein are not mutually exclusive to each other. For example, the vehicle restraint system 108 of FIG. 1 can include the drive system 1752 of FIGS. 17B and 17C. In some examples, the vehicle restraint system 1750 can include the example vertical RIG sensor 216, the example barrier sensor 218 and/or the example vertical movement sensor 220 of FIGS. 2A and 2B.

In some examples, the example controller 222, the example horizontal RIG sensor 214, example vertical RIG sensor 216, the example barrier sensor 218 and/or the example vertical movement sensor 220 can retrofit vehicle restraints and/or vehicle restraints in the field.

A flowchart representative of example hardware logic, machine readable instructions, hardware implemented state machines, and/or any combination thereof for implementing the controller 222 of FIG. 2A is shown in FIGS. 18A, 18B, 19-23, 24A, 24B, and 25-27. The machine readable instructions can be an executable program or portion of an executable program for execution by a computer processor such as the processor 2812 shown in the example processor platform 2800 discussed below in connection with FIG. 28. The program can be embodied in software stored on a non-transitory computer readable storage medium such as a CD-ROM, a floppy disk, a hard drive, a DVD, a Blu-ray disk, or a memory associated with the processor 2812, but the entire program and/or parts thereof could alternatively be executed by a device other than the processor 2812 and/or embodied in firmware or dedicated hardware. Further, although the example program is described with reference to the flowcharts illustrated in FIGS. 18A, 18B, 19-23, 24A, 24B, and 25-27, many other methods of implementing the example controller 222 can alternatively be used. For example, the order of execution of the blocks can be changed, and/or some of the blocks described can be changed, eliminated, or combined. Additionally or alternatively, any or all of the blocks can be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 18A, 18B, 19-23, 24A, 24B, and 25-27 can be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. can be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 18A:
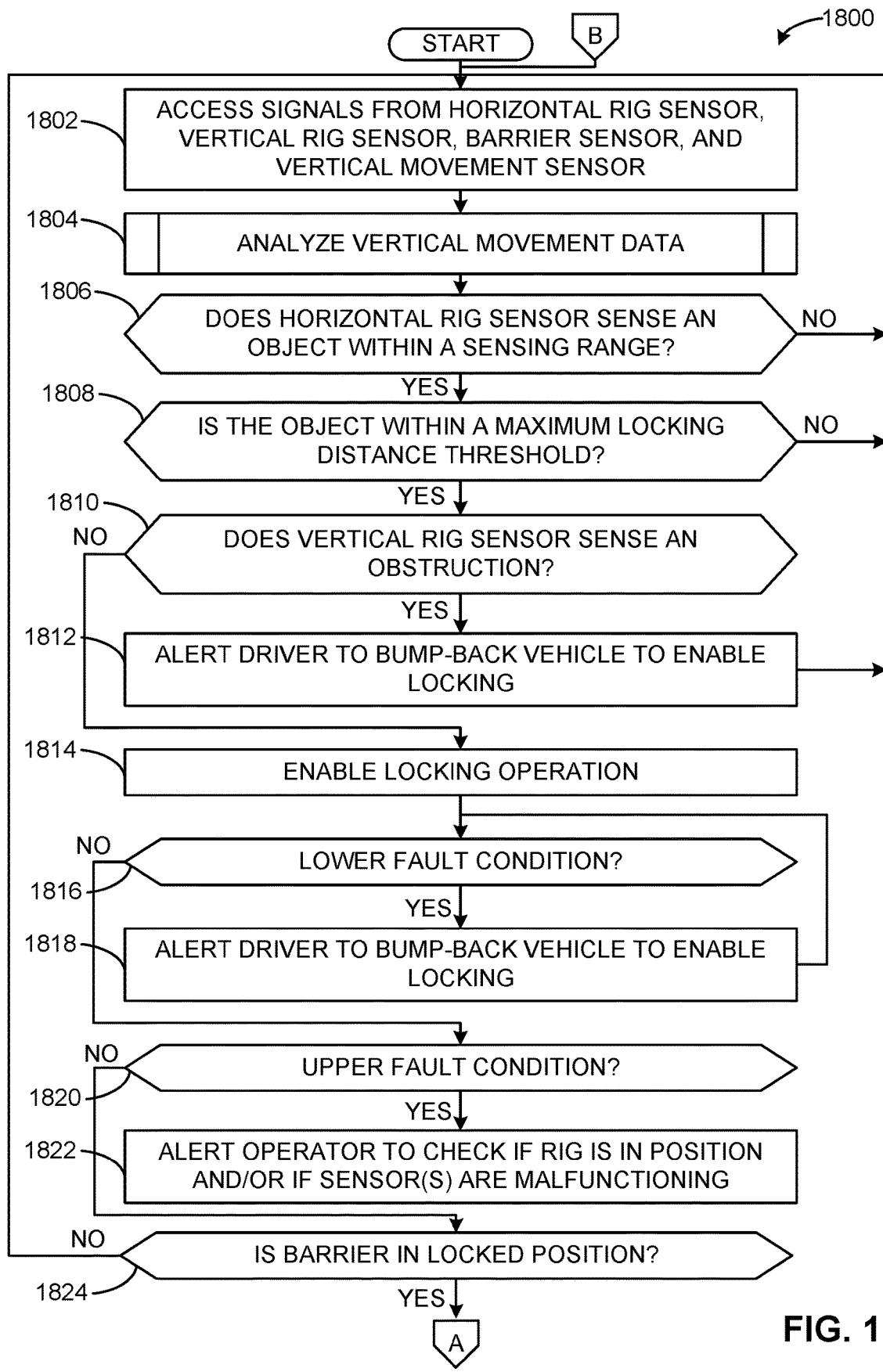
FIGS. 18A-18B illustrate a flowchart representative of example machine readable instructions which can be executed to implement the example controller of FIG. 2 to analyze sensor data and issue commands and alerts associated with a vehicle restraint system.
Figure 18B:
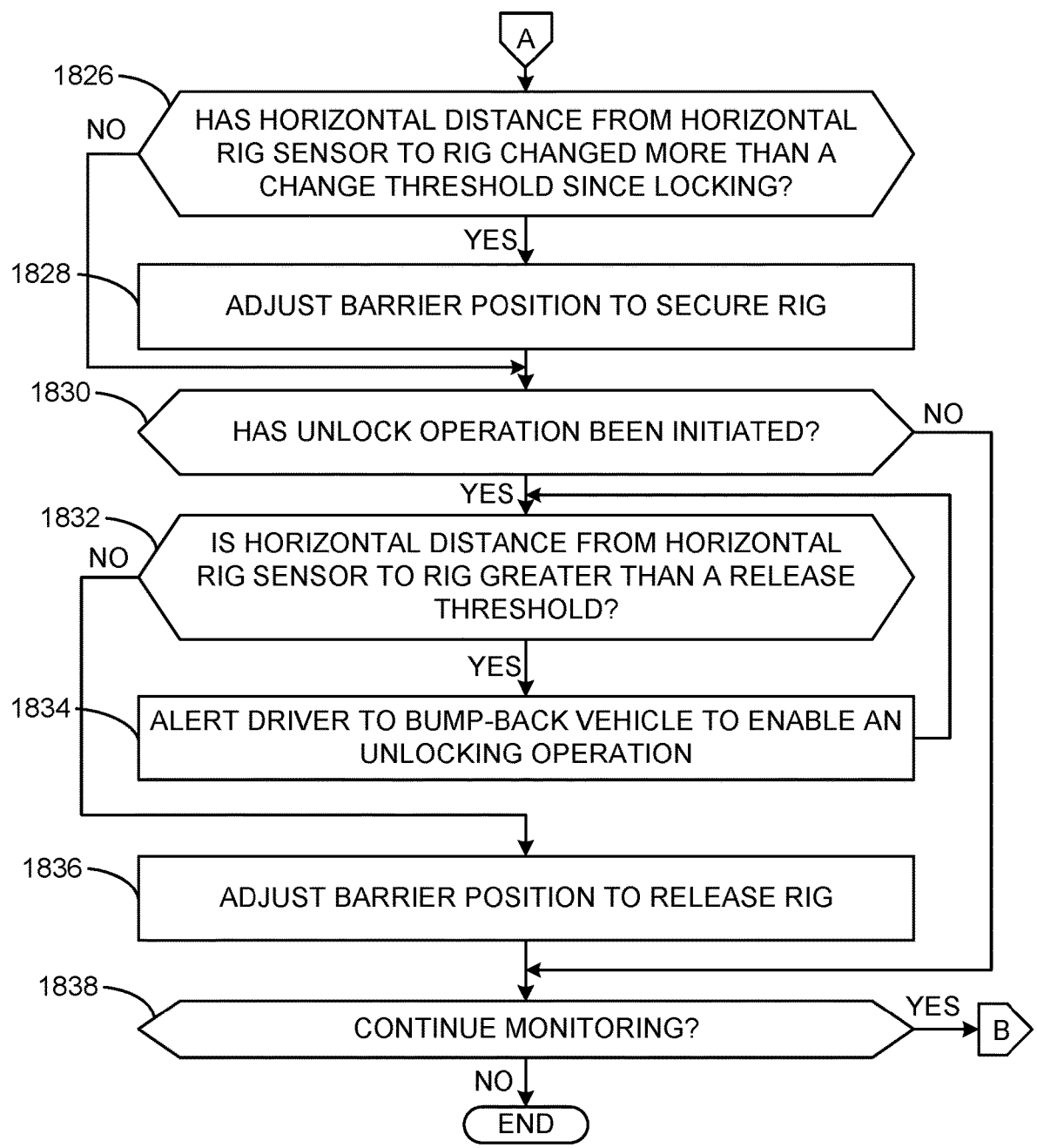

Example machine readable instructions 1800 that can be executed by the controller 222 to analyze sensor data and issue commands and alerts associated with a vehicle restraint system are illustrated in FIGS. 18A-18B. With reference to the preceding figures and associated descriptions, the example machine readable instructions 1800 of FIG. 18A begin with the controller 222 accessing signals from the horizontal RIG sensor 214, the vertical RIG sensor 216, the barrier sensor 218, and the vertical movement sensor 220 (Block 1802). In some examples, the horizontal RIG signal analyzer 302 accesses horizontal RIG data from the horizontal RIG sensor 214. In some examples, the vertical RIG signal analyzer 304 accesses vertical RIG data from the vertical RIG sensor 216. In some examples, the rotational signal analyzer 306 accesses rotational data from the barrier sensor 218. In some examples, the vertical movement signal analyzer 308 accesses vertical movement data from the vertical movement sensor 220.

At block 1804, the controller 222 analyzes vertical movement data. Example instructions to analyze vertical movement data are illustrated and described in connection with FIG. 19.

At block 1806, the controller 222 determines whether the horizontal RIG sensor 214 detects an object within a sensing range. In some examples, the horizontal RIG signal analyzer 302 determines whether the horizontal RIG sensor 214 has detected an object. In response to the horizontal RIG signal analyzer 302 determining an object has been sensed, processing transfers to block 1808. Conversely, in response to no object being sensed, processing transfers to block 1802.

At block 1808, the controller 222 determines if the sensed object is within a maximum locking distance threshold. In some examples, the horizontal RIG signal analyzer 302 determines whether the object was within the maximum locking distance threshold. In response to the object being within the maximum locking distance threshold, processing transfers to block 1810. Conversely, in response to the horizontal RIG signal analyzer 302 determining that the object is not within the maximum locking distance threshold, processing transfers to block 1802.

At block 1810, the controller 222 determines whether the vertical RIG sensor 216 senses an obstruction. In some examples, the vertical RIG signal analyzer 304, based on a signal received from the vertical RIG sensor 216, determines whether an obstruction is detected. In response to the vertical RIG signal analyzer 304 determining the vertical RIG sensor 216 sensed an obstruction, processing transfers to block 1812. Conversely, in response to the vertical RIG signal analyzer 304 determining the vertical RIG sensor 216 did not sense an obstruction, processing transfers to block 1814.

At block 1812, the controller 222 alerts a driver to bump-back the vehicle 102 to enable locking. In some examples, the alert generator 316 alerts the driver to move the vehicle 102 to the dock face wall 114 to enable locking. For example, the alert generator 316 can alert the driver via a visual alert (e.g., a yellow light), via an audible noise (e.g., an alarm), via an instruction message, etc.

At block 1814, the controller 222 enables a locking operation. In some examples, an operator manually initiates the locking operation (e.g., to move the barrier 206 from the stored position to the operational position). In some examples, the controller 222 initiates the locking operation without operator input.

At block 1816, the controller 222 determines if the barrier is in a lower fault condition. In some examples, the rotational signal analyzer 306 determines whether a lower fault has been indicated. For example, the rotational signal analyzer 306 compares a rotational value from the barrier sensor 218 that is associated with the barrier 206 with a range of angles associated with the allowable operational positions to determine whether the barrier 206 failed to enter into the operational position after being commanded to move to the operational position. In some examples, a lower fault may not be indicated merely because the command has not been issued to move the barrier 206 to the operational position. In response to sensing a lower fault condition, processing transfers to block 1818. Conversely, in response to a lower fault condition not being sensed, processing transfers to block 1820.

At block 1818, the controller 222 alerts the driver to bump-back the vehicle to enable locking. In some examples, the alert generator 316 alerts the driver to bump-back the vehicle to enable locking.

At block 1820, the controller 222 determines whether an upper fault has been indicated. In some examples, the rotational signal analyzer 306 determines an upper fault condition. For example, the rotational signal analyzer 306 compares the rotational position of the barrier 206, based on a signal from the barrier sensor 218, with a range of rotational values associated with the allowable operational positions and determines that an upper fault condition exists if the rotational position of the barrier 206 exceeds the upper fault limit of rotational values associated with the allowable operational position. In response to sensing an upper fault condition, processing transfers to block 1822. Conversely, in response to not sensing an upper fault condition, processing transfers to block 1824.

At block 1822, the controller 222 alerts the operator to check if the RIG is in position and/or if the sensor(s) are malfunctioning. In some examples, the alert generator 316 alerts the operator to check if the RIG 106 is in position and/or if the sensor(s) are malfunctioning, as the barrier 206 should only move beyond the operational position if a RIG is not present.

At block 1824, the controller 222 determines if the barrier 206 is in the locked position. In some examples, the barrier controller 314 determines if the barrier 206 is in the locked position, based on data from one or more of the analyzers 302-308. In some examples, the rotational signal analyzer 306, and/or the contact switch signal analyzer 310 determine if the barrier 206 is in the locked position. In response to the barrier 206 not being in the locked position, processing transfers to block 1802. Conversely, in response to the barrier 206 being in the locked position, processing transfers to block 1826 of FIG. 18B.

The example machine readable instructions 1800 continue in FIG. 18B. With reference to the preceding figures and associated descriptions, the example machine readable instructions 1800 continue with the example controller 222 determining if the horizontal distance between the horizontal RIG sensor 214 to the RIG 106 changed more than a change threshold since locking (Block 1826). In some examples, the horizontal RIG signal analyzer 302 determines if a change in the horizontal distance between the horizontal RIG sensor 214 and the RIG 106 is greater than a change threshold. In response to a detected change in the horizontal distance from being greater than the change threshold, processing transfers to block 1828. Conversely, if the detected change in horizontal distance is not greater than the change threshold, processing transfers to block 1830.

In response to detecting a change in the horizontal distance that is greater than the change threshold at block 1826, the controller 222 adjusts the barrier position to reengage the RIG 106 (block 1828). In some examples, the barrier controller 314 adjusts the position of the barrier 206 to engage the RIG 106. For example, the barrier controller 314 can cause the barrier 206 to rotate counter-clockwise about the shaft 208 in the orientation of FIG. 4 to cause the barrier to contact the RIG 106.

At block 1830, the controller 222 determines whether an unlock operation has been initiated. In some examples, the barrier controller 314 can determine whether the unlock operation has been initiated. In response to detecting the unlock operation, processing transfers to block 1832. Conversely, in response to the unlock operation not being initiated, processing transfers to block 1838.

At block 1832, the controller 222 determines if the horizontal distance between the horizontal RIG sensor 214 or the dock face wall 114 and the RIG 106 is greater than a release threshold. In some examples, the horizontal RIG signal analyzer 302 determines if the horizontal distance is greater than the release threshold. In some examples, the horizontal RIG signal analyzer 302 accesses the release threshold from the threshold configurator 312 and compares the release threshold to the horizontal distance based on the horizontal RIG data accessed from the horizontal RIG signal analyzer 302. In response to determining that the horizontal distance is greater than the release threshold, processing transfers to block 1834. Conversely, in response to the horizontal distance not being greater than the release threshold, processing transfers to block 1836.

At block 1834, the controller 222 alerts the driver to bump-back the vehicle 102 to enable the unlocking operation. In some examples, the alert generator 316 alerts the driver to bump-back the vehicle (e.g., move the vehicle in reverse toward the dock face wall 114 to contact the dock bumper 116) to enable unlocking. For example, the alert generator 316 can issue an alert to the alert device 224 to alert the driver to bump-back the vehicle to enable the unlocking operation.

At block 1836, the controller 222 adjusts the barrier position to release the RIG 106. In some examples, the barrier controller 314 adjusts the position of the barrier 206 to release the RIG 106.

At block 1838, the controller 222 determines whether to continue monitoring. For example, the controller 222 can be configured to continue monitoring as long as it remains powered. In response to monitoring to be continued, processing returns to block 1802 of FIG. 18A. Conversely, in response to monitoring not to be continued, processing terminates.

Figure 19:
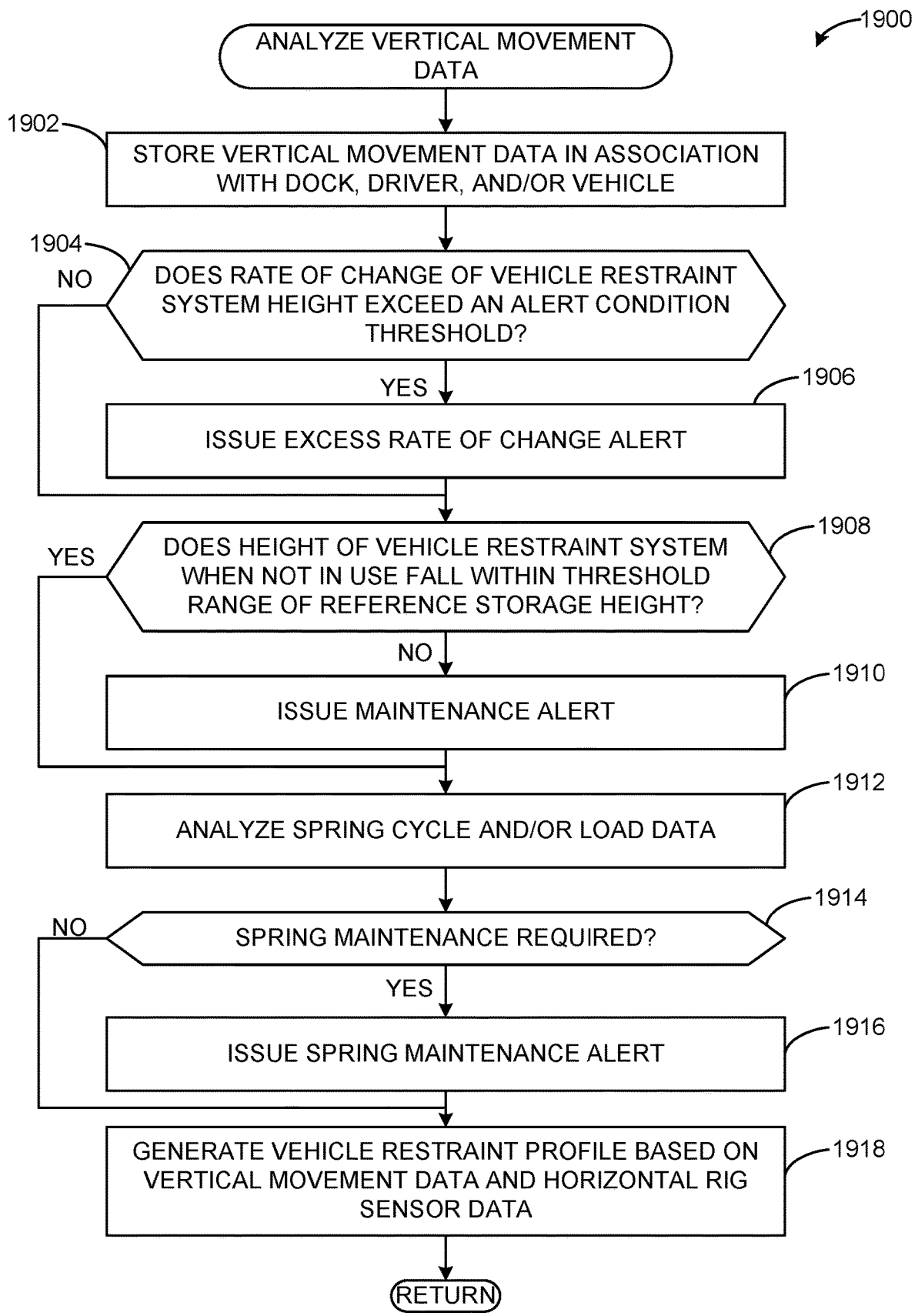
FIG. 19 is a flowchart representative of example machine readable instructions which can be executed to implement the example controller of FIG. 2 to analyze vertical movement sensor data.

Example machine readable instructions 1900 that can be executed by the controller 222 to analyze vertical movement data are illustrated in FIG. 19. While some examples in the following description refer to the vehicle restraint system 108 and/or components of the vehicle restraint system 108, the same descriptions apply to any of the vehicle restraint systems 1102, 1202, 1302, 1402, 1502, 1602, 1702 and/or 1750 and/or any of the components associated with the vehicle restraint systems 1102, 1202, 1302, 1402, 1502, 1602, 1702 and/or 1750. With reference to the preceding figures and associated descriptions, the example machine readable instructions 1900 of FIG. 19 begin with the controller 222 storing vertical movement data in association with a dock, a driver, and/or a vehicle (Block 1902). In some examples, the profile generator 318 stores the vertical movement data in the data store 320 in association with the dock, the driver, and/or the vehicle.

At block 1904, the controller 222 determines whether the rate of change of the vehicle restraint height exceeds an alert condition threshold. In some examples, the vertical movement signal analyzer 308 determines whether the rate of change of the vehicle restraint height exceeds the alert condition threshold. In some examples, the vertical movement signal analyzer 308 accesses the alert condition threshold from the threshold configurator 312 and compares a rate of change determined based on vertical movement data from the vertical movement sensor 220 and the alert condition threshold. In response to the rate of change of the vehicle restraint height exceeding the alert condition threshold, processing transfers to block 1906. Conversely, in response to the rate of change of the vehicle restraint height not exceeding the alert condition threshold, processing transfers to block 1908.

At block 1906, the controller 222 issues an excess rate of change alert. In some examples, the vertical movement signal analyzer 308 causes the alert generator 316 to issue an excess rate of change alert. In some examples, the alert generator 316 issues an alert to the alert device 224. For example, the alert generator 316 can sound an alarm, change a visual signal (e.g., turn on a light), send a text-based message, or use any other form of alert to inform an operator that the vehicle restraint system 108 has exceeded the alert condition threshold.

At block 1908, the controller 222 determines if the height of the vehicle restraint system 108 when not in use falls within a threshold range of a reference storage height. In some examples, the vertical movement signal analyzer 308 determines if the height of the vehicle restraint system 108 when not in use falls within a threshold range of a reference storage height. For example, the vehicle restraint system 108 can be configured to be stored at a height greater than a height of the highest known RIG, such a RIG of any vehicle that approaches the vehicle restraint system will cause the vehicle restraint system 108 to contact the RIG 106. Therefore, it is important that the vehicle restraint system 108 is maintained at the intended stored height. In some examples, the vertical movement signal analyzer 308 accesses the threshold range and/or the reference storage height from the threshold configurator 312 and compares the height of the vehicle restraint system 108 with this threshold range and/or reference storage height. In response to the height of the vehicle restraint system 108 falling within the threshold range of the reference storage height, processing transfers to block 1912. Conversely, in response to the height of the vehicle restraint system 108 not falling within the threshold range of the reference storage height, processing transfers to block 1910.

At block 1910, the controller 222 issues a maintenance alert. In some examples, the alert generator 316 issues the maintenance alert. In some examples, the alert generator 316 issues the maintenance alert (e.g., a message, a sound, a visual indicator, etc.) using the alert device 224.

At block 1912, the controller 222 analyzes spring cycle and/or load data. In some examples, the vertical movement signal analyzer 308 analyzes spring cycle and/or load data. For example, the vertical movement signal analyzer 308 can determine how many times the spring 212 has cycled (e.g., moved between its extended position and a depressed position). In some examples, the vertical movement signal analyzer 308 determines a load value of how much load is placed on the spring 212 or other components of the vehicle restraint system 108.

At block 1914, the controller 222 determines whether spring maintenance is required. In some examples, the vertical movement signal analyzer 308 determines whether spring maintenance is required. For example, the vertical movement signal analyzer 308 can access a threshold number of spring cycles from the threshold configurator 312 representing a maximum number of spring cycles before maintenance is required, and compare the number of spring cycles experienced by the spring 212 with the threshold number of spring cycles to determine whether spring maintenance is required. In response to spring maintenance being required, processing transfers to block 1916. Conversely, in response to spring maintenance not being required, processing transfers to block 1918.

At block 1916, the controller 222 issues a spring maintenance alert. In some examples, the alert generator 316 issues a spring maintenance alert.

At block 1918, the controller 222 generates a vehicle restraint profile based on height data and horizontal RIG sensor data. In some examples, the profile generator 318 generates a vehicle restraint profile based on vertical movement data from the vertical movement sensor 220 and horizontal RIG sensor data from the horizontal RIG sensor 214. In some examples, the profile generator 318 stores position, velocity, and acceleration plots for the vehicle restraint system 108.

Example machine readable instructions 2000 that can be executed by the controller 222 to analyze sensor data and issue commands and alerts associated with the vehicle restraint system 108 including the horizontal RIG sensor 214 are illustrated in FIG. 20. With reference to the preceding figures and associated descriptions, the example machine readable instructions 2000 of FIG. 20 begin with the controller 222 accessing signals from the horizontal RIG sensor 214 (Block 2002). In some examples, the horizontal RIG signal analyzer 302 accesses signals from the horizontal RIG sensor 214.

At block 2004, the controller 222 determines whether the horizontal RIG sensor 214 senses an object within a sensing range. In some examples, the horizontal RIG signal analyzer 302 determines whether the horizontal RIG sensor 214 senses an object within a sensing range. In response to the horizontal RIG signal analyzer 302 determining the horizontal RIG sensor 214 has sensed an object within a sensing range, processing transfers to block 2006. Conversely, in response to the horizontal RIG signal analyzer 302 determining the horizontal RIG sensor 214 has not sensed an object within the sensing range, processing transfers to block 2002.

At block 2006, the controller 222 determines if the object is within a maximum locking distance threshold. In some examples, the horizontal RIG signal analyzer 302 determines whether the object was within the maximum locking distance threshold. In response to the object being within the maximum locking distance threshold, processing transfers to block 2010. Conversely, in response to the object not being within the maximum locking distance threshold, processing transfers to block 2008.

At block 2008, the controller 222 alerts a driver to bump-back the vehicle 102 to enable locking. In some examples, the alert generator 316 alerts the driver to bump the vehicle 102 to enable locking. For example, the alert generator 316 can alert the driver via a visual alert (e.g., a light), via an audible alert (e.g., a noise), via an instruction message, etc.

At block 2010, the controller 222 enables a locking operation. In some examples, the barrier controller 314 enables a locking operation, giving an operator the option to move the barrier 206 from the stored position to the operational position.

At block 2012, the controller 222 determines if the barrier 206 is in the locked position. In some examples, the barrier controller 314 determines if the barrier 206 is in the locked position. In some examples, the rotational signal analyzer 306, and/or the contact switch signal analyzer 310 determine if the barrier 206 is in the locked position. In response to the barrier 206 not being in the locked position, processing transfers to block 1802. Conversely, in response to the barrier 206 being in the locked position, processing transfers to block 1826 of FIG. 18B.

At block 2014, the controller 222 determines if the horizontal distance from the horizontal RIG sensor 214 to the RIG 106 changed more than a change threshold. In some examples, the horizontal RIG signal analyzer 302 determines if the change in horizontal distance from the horizontal RIG sensor 214 to the RIG 106 is greater than a change threshold. In response to the change in the horizontal distance from the horizontal RIG sensor 214 being greater than a change threshold, processing transfers to block 2016. Conversely, if the change in horizontal distance from the horizontal RIG sensor 214 is not greater than the change threshold since locking, processing transfers to block 2018.

At block 2016, the controller 222 adjusts the barrier position to secure the RIG 106. In some examples, the barrier controller 314 adjusts the barrier position to secure the RIG 106. For example, the barrier controller 314 can cause the barrier 206 to rotate counter-clockwise about the shaft 208 until it contacts the RIG 106.

At block 2018, the controller 222 determines whether an unlock operation has been initiated. In some examples, the barrier controller 314 can determine whether the unlock operation has been initiated. In response to the unlock operation being initiated, processing transfers to block 2020. Conversely, in response to the unlock operation not being initiated, processing transfers to block 2026.

At block 2020, the controller 222 determines if the horizontal distance from the horizontal RIG sensor 214 to the RIG 106 is greater than a release threshold. In some examples, the horizontal RIG signal analyzer 302 determines if the horizontal distance from the horizontal RIG sensor 214 to the RIG 106 is greater than a release threshold. In some examples, the horizontal RIG signal analyzer 302 accesses the release threshold from the threshold configurator 312 and compares the release threshold to the horizontal distance based on the horizontal RIG data accessed from the horizontal RIG signal analyzer 302. In response to the horizontal distance from the horizontal RIG sensor 214 to the RIG 106 being greater than the release threshold, processing transfers to block 2022. Conversely, in response to the horizontal distance from the horizontal RIG sensor 214 to the RIG 106 not being greater than the release threshold, processing transfers to block 2024.

At block 2022, the controller 222 alerts the driver to bump-back the vehicle 102 to enable unlocking. In some examples, the alert generator 316 alerts the driver to bump-back the vehicle (e.g., move the vehicle in reverse until it contacts the dock bumper 116) to enable unlocking. For example, the alert generator 316 can issue an alert to the alert device 224 to alert the driver to bump-back the vehicle to enable unlocking.

At block 2024, the controller 222 enables a locking operation. In some examples, the barrier controller 314 enables a locking operation, giving an operator the option to move the barrier 206 from the stored position to the operational position.

At block 2026, the controller 222 determines whether to continue monitoring. For example, the controller 222 can be configured to continue monitoring as long as it remains powered. In response to monitoring to be continued, processing transfers to block 2002. Conversely, in response to monitoring not to be continued, processing terminates.

Example machine readable instructions 2100 that can be executed by the controller 222 to analyze sensor data and issue commands and alerts associated with a vehicle restraint system including a vertical RIG sensor are illustrated in FIG. 21. With reference to the preceding figures and associated descriptions, the example machine readable instructions 2100 of FIG. 21 begin with the controller 222 accessing signals from the vertical RIG sensor 216 (Block 2102). In some examples, the vertical RIG signal analyzer 304f accesses signals from the vertical RIG sensor 216.

At block 2104, the controller 222 determines if the barrier 206 is in the stored position. In some examples, the barrier controller 314 determines if the barrier controller 314 is in the stored position. In response to the barrier 206 being in the stored position, processing transfers to block 2106. Conversely, in response to the barrier 206 not being in the stored position, processing transfers to block 2110.

At block 2106, the controller 222 determines whether the vertical RIG sensor 216 senses an obstruction. In some examples, the vertical RIG signal analyzer 304 determines whether the vertical RIG sensor 216 senses an obstruction. In response to the vertical RIG signal analyzer 304 determining that the vertical RIG sensor 216 has sensed an obstruction, processing transfers to block 2108. Conversely, in response to the vertical RIG signal analyzer 304 determining that the vertical RIG sensor 216 has not sensed an obstruction, processing transfers to block 2102.

At block 2108, the controller 222 disables a locking operation. In some examples, the barrier controller 314 disables the locking operation.

At block 2110, the controller 222 determines if the barrier is in the locked position. In some examples, the barrier controller 314 determines if the barrier 206 is in the locked position. In response to the barrier 206 being in the locked position, processing transfers to block 2112. Conversely, in response to the barrier 206 not being in the locked position, processing transfers to block 2102.

At block 2112, the controller 222 determines if an unlock operation has been initiated. In some examples, the barrier controller 314 determines if an unlock operation has been initiated. In response to the unlock operation being initiated, processing transfers to block 2114. Conversely, in response to the unlock operation not being initiated, processing transfers to block 2110.

At block 2114, the controller 222 determines if the vertical RIG sensor senses an obstruction. In some examples, the vertical RIG signal analyzer 304 determines if the vertical RIG sensor 216 senses an obstruction. In response to sensing an obstruction, processing transfers to block 2116. Conversely, in response to not detecting an obstruction, processing transfers to block 2118.

At block 2116, the controller 222 alerts a driver to bump-back the vehicle to enable unlocking. In some examples, the alert generator 316 alerts the driver to bump back the vehicle 102 to enable unlocking.

At block 2118, the controller 222 enables unlocking. In some examples, the barrier controller 314 enables unlocking.

At block 2120, the controller 222 determines whether to continue monitoring. For example, the controller 222 can be configured to continue monitoring as long as it remains powered. In response to monitoring to be continued, processing transfers to block 2102. Conversely, in response to monitoring not to be continued, processing terminates.

Example machine readable instructions 2200 that can be executed by the controller 222 to analyze sensor data and issue commands and alerts associated with a vehicle restraint system are illustrated in FIG. 22. With reference to the preceding figures and associated descriptions, the example machine readable instructions 2200 of FIG. 21 begin with the controller 222 accessing signals from the barrier sensor 218 (Block 2202). In some examples, the rotational signal analyzer 306 accesses signals from the barrier sensor 218.

At block 2204, the controller 222 determines if the barrier is in a lower fault condition. In some examples, the rotational signal analyzer 306 determines whether a lower fault has been indicated. For example, the rotational signal analyzer 306 can compare a rotational value associated with the barrier 206 with a range of angles associated with the operational position to determine whether the barrier 206 failed to enter into the operational position after being directed to move to the operational position. In some examples, a lower fault may not be indicated merely because the command has not been issued to move the barrier 206 to the operational position. In response to a lower fault being indicated, processing transfers to block 2206. Conversely, in response to a lower fault not being indicated, processing transfers to block 2210.

At block 2206, the controller 222 restores the barrier 206 to the unlocked position. In some examples, the barrier controller 314 restores the barrier 206 to the unlocked position.

At block 2208, the controller 222 alerts the driver to bump-back the vehicle 102 to enable unlocking. In some examples, the alert generator 316 alerts the driver to bump-back the vehicle (e.g., move the vehicle in reverse until it contacts the dock bumper 116) to enable unlocking. For example, the alert generator 316 can issue an alert to the alert device 224 to alert the driver to bump-back the vehicle to enable unlocking.

At block 2210, the controller 222 determines whether an upper fault is indicated. In some examples, the rotational signal analyzer 306 determines whether an upper fault has been indicated. For example, the rotational signal analyzer 306 can compare the rotational position of the barrier 206 with a range of rotational values associated with the allowable operational position(s) and determine that an upper fault state exists if the rotational position of the barrier 206 exceeds this range of rotational values associated with the allowable operational position(s). In response to an upper fault being indicated, processing transfers to block 2212. Conversely, in response to an upper fault not being indicated, processing transfers to block 2214.

At block 2212, the controller 222 alerts the operator to check if a RIG is in position and/or if the sensor(s) are malfunctioning. In some examples, the alert generator 316 alerts the operator to check if the RIG is in position and/or if the sensor(s) are malfunctioning, as the barrier 206 should only move beyond the operational position if a RIG is not present.

At block 2214, the controller 222 determines whether to continue monitoring. For example, the controller 222 can be configured to continue monitoring as long as it remains powered. In response to monitoring to be continued, processing returns to block 2202. Conversely, in response to monitoring not to be continued, processing terminates.

Example machine readable instructions 2300 that can be executed by the controller 222 to analyze sensor data and issue commands and alerts associated with a vehicle restraint system including the horizontal RIG sensor 214 and vertical RIG sensor 216 are illustrated in FIG. 23. With reference to the preceding figures and associated descriptions, the example machine readable instructions 2300 of FIG. 23 begin with the controller 222 accessing signals from the horizontal RIG sensor 214 and the vertical RIG sensor 216 (Block 2302). In some examples, the horizontal RIG signal analyzer 302 accesses signals from the horizontal RIG sensor 214 and the vertical RIG signal analyzer 304 accesses signals from the vertical RIG sensor 216.

At block 2304, the controller 222 determines whether the horizontal RIG sensor 214 senses an object within its sensing range. In some examples, the horizontal RIG signal analyzer 302 determines whether the horizontal RIG sensor 214 has sensed an object. In response to the horizontal RIG signal analyzer 302 determining that the horizontal RIG sensor 214 has sensed an object, processing transfers to block 2306. Conversely, in response to the horizontal RIG signal analyzer 302 determining that the horizontal RIG sensor 214 has not sensed an object, processing transfers to block 2302.

At block 2306, the controller 222 determines if the object is within a maximum locking distance threshold. In some examples, the horizontal RIG signal analyzer 302 determines whether the object was within the maximum locking distance threshold. In response to the object being within the maximum locking distance threshold, processing transfers to block 2308. Conversely, in response to the object not being within the maximum locking distance threshold, processing transfers to block 2302.

At block 2308, the controller 222 determines whether the vertical RIG sensor 216 senses an obstruction. In some examples, the vertical RIG signal analyzer 304 determines whether the vertical RIG sensor 216 senses an obstruction. In response to the vertical RIG signal analyzer 304 determining that the vertical RIG sensor 216 has sensed an obstruction, processing transfers to block 2310. Conversely, in response to the vertical RIG signal analyzer 304 determining that the vertical RIG sensor 216 has not sensed an obstruction, processing transfers to block 2312.

At block 2310, the controller 222 alerts a driver to bump-back the vehicle 102 to enable locking. In some examples, the alert generator 316 alerts the driver to bump the vehicle 102 to enable locking. For example, the alert generator 316 can alert the driver via a visible alert (e.g., yellow light), via an audible alert (e.g., an alarm), via an instruction message, etc.

At block 2312, the controller 222 enables a locking operation. In some examples, the barrier controller 314 enables a locking operation, giving an operator the option to move the barrier 206 from the stored position to the operational position.

At block 2314, the controller 222 determines if the barrier 206 is in the locked position. In some examples, the barrier controller 314 determines if the barrier 206 is in the locked position. In response to the barrier 206 not being in the locked position, processing transfers to block 2302. Conversely, in response to the barrier 206 being in the locked position, processing transfers to block 2316.

At block 2316, the controller 222 determines if the horizontal distance from the horizontal RIG sensor 214 to the RIG 106 changed more than a change threshold since locking. In some examples, the horizontal RIG signal analyzer 302 determines if the horizontal distance from the horizontal RIG sensor 214 to the RIG 106 changed more than a change threshold since locking. In response to the horizontal distance from the horizontal RIG sensor 214 having changed more than a change threshold since locking, processing transfers to block 2318. Conversely, if the horizontal distance from the horizontal RIG sensor 214 has not changed more than the change threshold since locking, processing transfers to block 2320.

At block 2318, the controller 222 adjusts the barrier position to secure the RIG 106. In some examples, the barrier controller 314 adjusts the barrier position to secure the RIG 106. For example, the barrier controller 314 can cause the barrier 206 to rotate counter-clockwise about the shaft 208 until it contacts the RIG 106.

At block 2320, the controller 222 determines whether an unlock operation has been initiated. In some examples, the barrier controller 314 can determine whether the unlock operation has been initiated. In response to the unlock operation being initiated, processing transfers to block 2322. Conversely, in response to the unlock operation not being initiated, processing transfers to block 2328.

At block 2322, the controller 222 determines if the horizontal distance from the horizontal RIG sensor 214 to the RIG 106 is greater than a release threshold. In some examples, the horizontal RIG signal analyzer 302 determines if the horizontal distance from the horizontal RIG sensor 214 to the RIG 106 is greater than a release threshold. In some examples, the horizontal RIG signal analyzer 302 accesses the release threshold from the threshold configurator 312 and compares the release threshold to the horizontal distance based on the horizontal RIG data accessed from the horizontal RIG signal analyzer 302. In response to the horizontal distance from the horizontal RIG sensor 214 to the RIG 106 being greater than the release threshold, processing transfers to block 2324. Conversely, in response to the horizontal distance from the horizontal RIG sensor 214 to the RIG 106 not being greater than the release threshold, processing transfers to block 2326.

At block 2324, the controller 222 alerts the driver to bump-back the vehicle 102 to enable unlocking. In some examples, the alert generator 316 alerts the driver to bump-back the vehicle (e.g., move the vehicle in reverse until it contacts the dock bumper 116) to enable unlocking. For example, the alert generator 316 can issue an alert to the alert device 224 to alert the driver to bump-back the vehicle to enable unlocking.

At block 2326, the controller 222 adjusts the barrier position to release the RIG 106. In some examples, the barrier controller 314 adjusts the position of the barrier 206 to release the RIG 106.

At block 2328, the controller 222 determines whether to continue monitoring. For example, the controller 222 can be configured to continue monitoring as long as it remains powered. In response to monitoring to be continued, processing returns to block 2302. Conversely, in response to monitoring not to be continued, processing terminates.

Example machine readable instructions 2400 that can be executed by the controller 222 to analyze sensor data and issue commands and alerts associated with a vehicle restraint system including a horizontal RIG sensor and a barrier sensor are illustrated in FIGS. 24A-24B. With reference to the preceding figures and associated descriptions, the example machine readable instructions 2400 of FIG. 24A begin with the controller 222 accessing signals from the horizontal RIG sensor 214 and the barrier sensor 218 (Block 2402). In some examples, the horizontal RIG signal analyzer 302 accesses horizontal RIG data from the horizontal RIG sensor 214 and the rotational signal analyzer 306 accesses rotational data from the barrier sensor 218.

At block 2404, the controller 222 determines whether the horizontal RIG sensor 214 senses an object within its sensing range. In some examples, the horizontal RIG signal analyzer 302 determines whether the horizontal RIG sensor 214 has sensed an object. In response to the horizontal RIG signal analyzer 302 determining that the horizontal RIG sensor 214 sensed an object, processing transfers to block 2406. Conversely, in response to the horizontal RIG signal analyzer 302 determining that the horizontal RIG sensor 214 did not sense an object, processing transfers to block 2402.

At block 2406, the controller 222 determines if the object is within a maximum locking distance threshold. In some examples, the horizontal RIG signal analyzer 302 determines whether the object was within the maximum locking distance threshold. In response to the object being within the maximum locking distance threshold, processing transfers to block 2410. Conversely, in response to the object not being within the maximum locking distance threshold, processing transfers to block 2408.

At block 2408, the controller 222 alerts a driver to bump-back the vehicle 102 to enable locking. In some examples, the alert generator 316 alerts the driver to bump the vehicle 102 to enable locking. For example, the alert generator 316 can alert the driver via a visible alert (e.g., a red light), via an audible alert (e.g., an alarm), via an instruction message, etc.

At block 2410, the controller 222 enables a locking operation. In some examples, the barrier controller 314 enables a locking operation, giving an operator the option to move the barrier 206 from the stored position to the operational position.

At block 2412, the controller 222 determines if the barrier is in a lower fault condition. In some examples, the rotational signal analyzer 306 determines whether a lower fault has been indicated. In response to a lower fault being indicated, processing transfers to block 2416. Conversely, in response to a lower fault not being indicated, processing transfers to block 2414.

At 2414, the controller 222 alerts the driver to bump-back the vehicle to enable locking. In some examples, the alert generator 316 alerts the driver to bump-back the vehicle to enable locking.

At block 2416, the controller 222 determines whether an upper fault has been indicated. In some examples, the rotational signal analyzer 306 determines whether an upper fault has been indicated. In response to an upper fault being indicated, processing transfers to block 2418. Conversely, in response to an upper fault not being indicated, processing transfers to block 2420.

At block 2418, the controller 222 alerts the operator to check if a RIG is in position and/or if the sensor(s) are malfunctioning. In some examples, the alert generator 316 alerts the operator to check if the RIG is in position and/or if the sensor(s) are malfunctioning, as the barrier 206 should only move beyond the operational position if a RIG is not present.

At block 2420, the controller 222 determines if the barrier 206 is in the locked position. In some examples, the barrier controller 314 determines if the barrier 206 is in the locked position. In response to the barrier 206 not being in the locked position, processing transfers to block 2402. Conversely, in response to the barrier 206 being in the locked position, processing transfers to block 2422 of FIG. 24B.

The example machine readable instructions 2400 continue in FIG. 24B. With reference to the preceding figures and associated descriptions, the example machine readable instructions 2400 continue with the example controller 222 determining if the horizontal distance from the horizontal RIG sensor 214 to the RIG 106 changed more than a change threshold since locking (Block 2422). In some examples, the horizontal RIG signal analyzer 302 determines whether the horizontal distance from the horizontal RIG sensor 214 to the RIG 106 changed more than the change threshold since locking. In response to the horizontal distance from the horizontal RIG sensor 214 having changed more than a change threshold since locking, processing transfers to block 2424. Conversely, if the horizontal distance from the horizontal RIG sensor 214 has not changed more than the change threshold since locking, processing transfers to block 2426.

At block 2424, the controller 222 adjusts the barrier position to secure the RIG 106. In some examples, the barrier controller 314 adjusts the barrier position to secure the RIG 106. For example, the barrier controller 314 can cause the barrier 206 to rotate counter-clockwise about the shaft 208 until it contacts the RIG 106.

At block 2426, the controller 222 determines whether an unlock operation has been initiated. In some examples, the barrier controller 314 can determine whether the unlock operation has been initiated. In response to the unlock operation being initiated, processing transfers to block 2428. Conversely, in response to the unlock operation not being initiated, processing transfers to block 2434.

At block 2428, the controller 222 determines if the horizontal distance from the horizontal RIG sensor 214 to the RIG 106 is greater than a release threshold. In some examples, the horizontal RIG signal analyzer 302 determines if the horizontal distance from the horizontal RIG sensor 214 to the RIG 106 is greater than a release threshold. In response to the horizontal distance from the horizontal RIG sensor 214 to the RIG 106 being greater than the release threshold, processing transfers to block 2430. Conversely, in response to the horizontal distance from the horizontal RIG sensor 214 to the RIG 106 not being greater than the release threshold, processing transfers to block 2432.

At block 2430, the controller 222 alerts the driver to bump-back the vehicle 102 to enable unlocking. In some examples, the alert generator 316 alerts the driver to bump-back the vehicle (e.g., move the vehicle in reverse until it contacts the dock bumper 116) to enable unlocking.

At block 2432, the controller 222 adjusts the barrier position to release the RIG 106. In some examples, the barrier controller 314 adjusts the position of the barrier 206 to release the RIG 106.

At block 2434, the controller 222 determines whether to continue monitoring. In response to monitoring to be continued, processing returns to block 2402 of FIG. 24A. Conversely, in response to monitoring not to be continued, processing terminates.

Example machine readable instructions 2500 that can be executed by the controller 222 to analyze sensor data and issue commands and alerts associated with a vehicle restraint system including a vertical RIG sensor and a barrier sensor are illustrated in FIG. 25. With reference to the preceding figures and associated descriptions, the example machine readable instructions 2500 of FIG. 25 begin with the controller 222 accessing signals from the vertical RIG sensor 216 and the barrier sensor 218 (Block 2502). In some examples, the vertical RIG signal analyzer 304 accesses signals from the vertical RIG sensor 216 and the rotational signal analyzer 306 accesses signals from the barrier sensor 218.

At block 2504, the controller 222 determines whether the vertical RIG sensor 216 senses an obstruction. In some examples, the vertical RIG signal analyzer 304 determines whether the vertical RIG sensor 216 senses an obstruction. In response to the vertical RIG signal analyzer 304 determining that the vertical RIG sensor 216 sensed an obstruction, processing transfers to block 2506. Conversely, in response to the vertical RIG sensor 216 not sensing an obstruction, processing transfers to block 2508.

At block 2506, the controller 222 alerts a driver to bump-back the vehicle 102 to enable locking. In some examples, the alert generator 316 alerts the driver to bump the vehicle 102 to enable locking. For example, the alert generator 316 can alert the driver via a visible alert (e.g., a yellow light), via an audible alert (e.g., an alarm), via an instruction message, etc.

At block 2508, the controller 222 determines if the barrier is in a lower fault condition. In some examples, the rotational signal analyzer 306 determines whether a lower fault has been indicated. In response to a lower fault being sensed, processing transfers to block 2510. Conversely, in response to a lower fault not being indicated, processing transfers to block 2514.

At block 2510, the controller 222 restores the barrier 206 to the stored position. In some examples, the barrier controller 314 restores the barrier 206 to the stored position.

At block 2512, the controller 222 alerts the driver to bump-back the vehicle 102 to enable locking. In some examples, the alert generator 316 alerts the driver to bump-back the vehicle to enable locking.

At block 2514, the controller 222 determines if an upper fault has been sensed. In some examples, the rotational signal analyzer 306 determines if an upper fault has been sensed. In response to an upper fault being sensed, processing transfers to block 2516. Conversely, in response to an upper fault not being sensed, processing transfers to block 2518.

At block 2516, the controller 222 alerts the operator to check if the RIG 106 is in position and/or if the sensor(s) are malfunctioning. In some examples, the alert generator 316 alerts the operator to check if the RIG 106 is in position and/or if the sensor(s) are malfunctioning.

At block 2518, the controller 222 determines whether to continue monitoring. In response to continuing monitoring, processing transfers to block 2502. Conversely, in response to not continuing monitoring, processing terminates.

Example machine readable instructions 2600 that can be executed by the controller 222 to analyze sensor data and issue commands and alerts associated with a vehicle restraint system including a contact switch are illustrated in FIG. 26. With reference to the preceding figures and associated descriptions, the example machine readable instructions 2600 of FIG. 26 begin with the controller 222 accessing signals from the contact switch 1708 (Block 2602). In some examples, the contact switch signal analyzer 310 accesses signals from the contact switch 1708.

At block 2604, the controller 222 determines whether a lock operation has been initiated. In some examples, the barrier controller 314 determines whether a lock operation has been initiated. In response to a lock operation being initiated, processing transfers to block 2606. Conversely, in response to a lock operation not being initiated, processing transfers to block 2620.

At block 2606, the controller 222 measures a time until the contact switch 1708 is actuated. In some examples, the contact switch signal analyzer 310 measures a time until the contact switch 1708 is actuated. For example, the contact switch signal analyzer 310 can start a timer to measure the time until the contact switch 1708 is actuated.

At block 2608, the controller 222 determines if a maximum actuation time has been reached. In some examples, the contact switch signal analyzer 310 determines if the maximum actuation time has been reached. In some examples, the maximum actuation time is associated with the maximum amount of time that it would be reasonably expected for it the barrier 206 to move from the stored position to the operational position. In response to the maximum actuation time being reached, processing transfers to block 2618. Conversely, in response to the maximum actuation time not being reached, processing transfers to block 2610.

At block 2610, the controller 222 determines if the contact switch 1708 has been actuated. In some examples, the contact switch signal analyzer 310 determines if the contact switch 1708 has been actuated. In response to the contact switch being actuated, processing transfers to block 2612. Conversely, in response to the contact switch not being actuated, processing transfers to block 2606.

At block 2612, the controller 222 determines if the time until the contact switch 1708 was actuated was less than or equal to a minimum actuation time threshold. In some examples, the contact switch signal analyzer 310 determines if the time until the contact switch 1708 was actuated was less than or equal to a minimum actuation time threshold. In response to the time until the contact switch 1708 was actuated not being less than or equal to the minimum actuation time threshold, processing transfers to block 2616. Conversely, in response to the time until the contact switch 1708 was actuated being less than or equal to the minimum actuation time threshold, processing transfers to block 2614.

At block 2614, the controller 222 indicates a lower fault. In some examples, the contact switch signal analyzer 310 indicates a lower fault.

At block 2616, the controller 222 indicates a successful lock operation. In some examples, the contact switch signal analyzer 310 indicates a successful lock operation.

At block 2618, the controller 222 indicates an upper fault. In some examples, the contact switch signal analyzer 310 indicates an upper fault.

At block 2620, the controller 222 determines whether to continue monitoring. In response to continuing monitoring, processing transfers to block 2602. Conversely, in response to not continuing monitoring, processing terminates.

Figure 27:
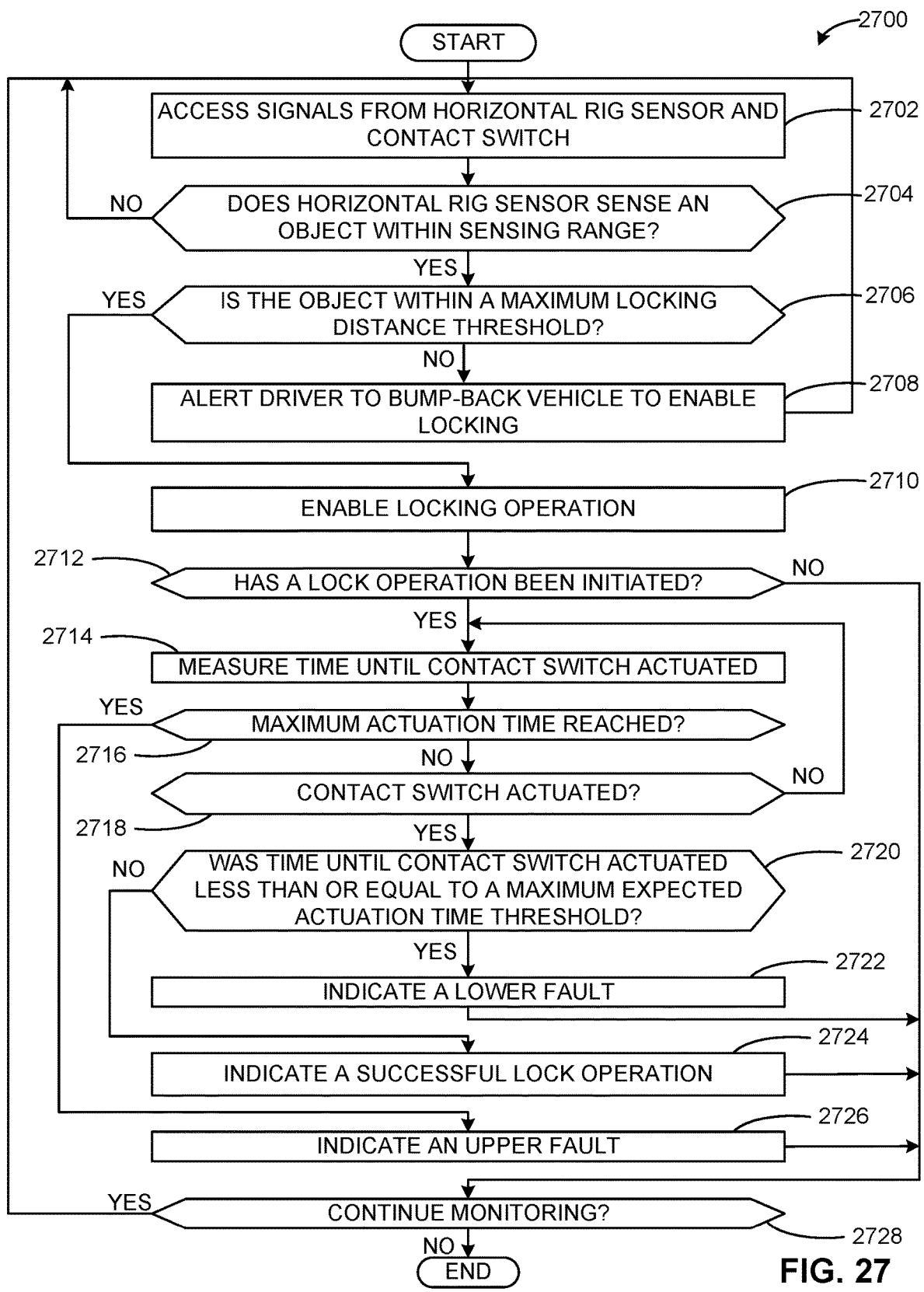
FIG. 27 is a flowchart representative of example machine readable instructions that can be executed to implement the example controller of FIG. 2 to analyze sensor data and issue commands and alerts for an example vehicle restraint system having an example horizontal RIG sensor and an example contact switch disclosed herein.

Example machine readable instructions 2700 that can be executed by the controller 222 to analyze sensor data and issue commands and alerts associated with a vehicle restraint system including the contact switch 1708 and the horizontal RIG sensor 214 are illustrated in FIG. 27. With reference to the preceding figures and associated descriptions, the example machine readable instructions 2700 of FIG. 26 begin with the controller 222 accessing signals from the contact switch 1708 and the horizontal RIG sensor 214 (Block 2702). In some examples, the contact switch signal analyzer 310 accesses signals from the contact switch 1708 and the horizontal RIG signal analyzer 302 accesses signals from the horizontal RIG sensor 214.

At block 2704 the controller 222 determines if the horizontal RIG sensor 214 senses an object within its sensing range. In some examples, the horizontal RIG signal analyzer 302 determines if the horizontal RIG sensor 214 senses an object within its sensing range. In response to the horizontal RIG signal analyzer 302 determining if the horizontal RIG sensor 214 has sensed an object within its sensing range, processing transfers to block 2706. Conversely, in response to the horizontal RIG signal analyzer 302 determining if the horizontal RIG sensor 214 has not sensed an object within its sensing range, processing transfers to block 2702.

At block 2706, the controller 222 determines if the object is within a maximum locking distance threshold. In some examples, the horizontal RIG signal analyzer 302 determines if the object is within the maximum locking distance threshold. In response to the object being within the maximum locking distance threshold, processing transfers to block 2710. Conversely, in response to the object not being within the maximum locking distance threshold, processing transfers to block 2708.

At block 2708, the controller 222 alerts the driver to bump-back the vehicle 102 to enable locking. In some examples, the alert generator 316 alerts the driver to bump-back the vehicle to enable locking.

At block 2710, the controller 222 enables the locking operation. In some examples, the barrier controller 314 enables locking, thereby enabling an operator to move the barrier 206 from the stored position to the operational position.

At block 2712, the controller 222 determines if a lock operation has been initiated. In some examples, the barrier controller 314 determines if a lock operation has been initiated. In response to a lock operation being initiated, processing transfers to block 2714. Conversely, in response to no lock operation being initiated, processing transfers to block 2728.

At block 2714, the controller 222 measures the time until the contact switch 1708 is actuated. In some examples, the contact switch signal analyzer 310 measures the time until the contact switch 1708 is actuated.

At block 2716, the controller 222 determines if the maximum actuation time has been reached. In some examples, the contact switch signal analyzer 310 determines if the maximum actuation time has been reached. In response to the maximum actuation time having been reached, processing transfers to block 2726. Conversely, in response to the maximum actuation time not having been reached, processing transfers to block 2718.

At block 2718, the controller 222 determines if the contact switch 1708 has been actuated. In some examples, the contact switch signal analyzer 310 determines if the contact switch 1708 has been actuated. In response to the contact switch 1708 having been actuated, processing transfers to block 2720. Conversely, in response to the contact switch 1708 not having been actuated, processing transfers to block 2714.

At block 2720, the controller 222 determines if the time until the contact switch 1708 was actuated was less than or equal to a maximum actuation time threshold. In some examples, the contact switch signal analyzer 310 determines if the time until the contact switch 1708 was actuated was less than or equal to a maximum actuation time threshold. In response to the time until the contact switch 1708 was actuated having been less than or equal to the maximum actuation time threshold, processing transfers to block 2722. Conversely, in response to the time until the contact switch was actuated not being less than or equal to the maximum actuation time threshold, processing transfers to block 2724.

At block 2722, the controller 222 indicates a lower fault. In some examples, the contact switch signal analyzer 310 indicates a lower fault.

At block 2724, the controller 222 indicates a successful lock operation. In some examples, the contact switch signal analyzer 310 indicates a successful lock operation.

At block 2726, the controller 222 indicates an upper fault. In some examples, the contact switch signal analyzer 310 indicates an upper fault.

At block 278, the controller 222 determines whether to continue monitoring. In response to continuing monitoring, processing transfers to block 2702. Conversely, in response to not continuing monitoring, processing terminates.

Figure 28:
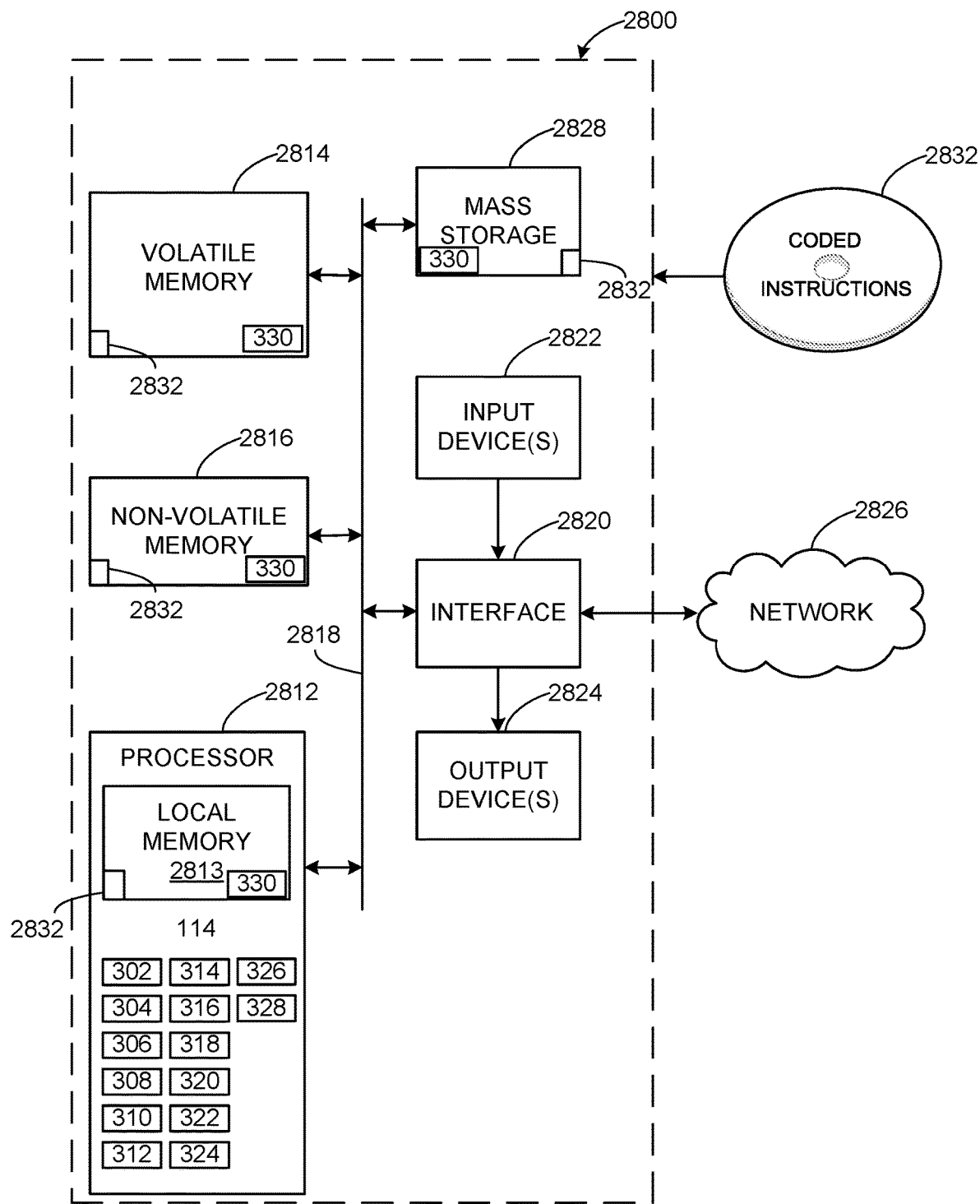
FIG. 28 is a block diagram of an example processing platform structured to execute the instructions of FIGS. 18A, 18B, 19-23, 24A, 24B, and 25-27 to implement the example controller of FIG. 3.

FIG. 28 is a block diagram of an example processor platform 1000 structured to execute the instructions of FIGS. 18-26 to implement the controller 222 of FIG. 3. The processor platform 2800 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 2800 of the illustrated example includes a processor 2812. The processor 2812 of the illustrated example is hardware. For example, the processor 2812 can be implemented by one or more integrated circuits, logic circuits, microprocessors, GPUs, DSPs, or controllers from any desired family or manufacturer. The hardware processor can be a semiconductor based (e.g., silicon based) device. In this example, the processor implements the example horizontal RIG signal analyzer 302, the vertical RIG signal analyzer 304, the rotational signal analyzer 306, the vertical movement signal analyzer 308, the contact switch signal analyzer 310, the threshold configurator 312, the barrier controller 314, the alert generator 316, the profile generator 318, the data store 320, and/or, more generally, the example controller 222 of FIG. 3.

The processor 2812 of the illustrated example includes a local memory 3113 (e.g., a cache). The processor 2812 of the illustrated example is in communication with a main memory including a volatile memory 2814 and a non-volatile memory 2816 via a bus 2818. The volatile memory 2814 can be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2816 can be implemented by flash memory and/or any other desired type of memory device. Access to the main memory 2814, 2816 is controlled by a memory controller.

The processor platform 2800 of the illustrated example also includes an interface circuit 2820. The interface circuit 2820 can be implemented by any type of interface standard, such as an Ethernet interface, a universal serial bus (USB), a Bluetooth® interface, a near field communication (NFC) interface, and/or a PCI express interface.

In the illustrated example, one or more input devices 2822 are connected to the interface circuit 2820. The input device(s) 2822 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2824 are also connected to the interface circuit 2820 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2820 of the illustrated example, thus, typically includes a graphics driver card, a graphics driver chip and/or a graphics driver processor.

The interface circuit 2820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2800 of the illustrated example also includes one or more mass storage devices 2828 for storing software and/or data. Examples of such mass storage devices 2828 include floppy disk drives, hard drive disks, compact disk drives, Blu-ray disk drives, redundant array of independent disks (RAID) systems, and digital versatile disk (DVD) drives.

The machine executable instructions 2832 of FIGS. 18-27 can be stored in the mass storage device 2828, in the volatile memory 2814, in the non-volatile memory 2816, and/or on a removable non-transitory computer readable storage medium such as a CD or DVD.

From the foregoing, it will be appreciated that example methods, apparatus and articles of manufacture have been disclosed that enable usage of a plurality of sensors to enhance techniques for restraining vehicles during loading and unloading operations. The example methods, apparatus, and articles of manufacture disclosed herein enable and/or disable actuation of a barrier of a vehicle restraint system based on conditions associated with a vehicle, thereby reducing risks associated with drivers and/or dock operators being unaware of whether the vehicle restraint is properly engaged. Further, the example methods, apparatus, and articles of manufacture enable intelligent alerts that inform a driver as to when to move the vehicle in reverse to enable the vehicle restraint system to lock, and can provide information such as when maintenance is required, or when components appear to be working incorrectly. The example methods, apparatus, and articles of manufacture disclosed herein describe techniques for utilizing multiple sensors to provide redundant verification of conditions associated with a vehicle restraint system and to enable full characterization of the behavior of a vehicle restraint system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Some example vehicle restraint systems disclosed herein include a barrier to restrain a vehicle. The barrier is movable between a stored position and an operational position. A sensor to detect a presence of a rear impact guard (RIG) of the vehicle. A controller to enable the barrier to move to the operational position in response to the sensor detecting the presence of the RIG.

In some example vehicle restraint systems disclosed herein, the sensor is a horizontal RIG sensor to sense a distance between the horizontal RIG sensor and the RIG.

In some examples, the controller is to enable the barrier to move to the operational position when the distance from the horizontal RIG sensor to the RIG is less than a distance threshold.

In some example vehicle restraint systems disclosed herein, the sensor is a vertical RIG sensor to detect the RIG positioned above the barrier prior to the controller enabling movement of the barrier to the operational position.

In some example vehicle restraint systems disclosed herein, the controller does not enable the barrier to move to the operational position when the vertical RIG sensor senses the RIG.

Some example vehicle restraint systems disclosed herein further include a barrier sensor to sense a rotational position of the barrier relative to an axis of rotation of the barrier.

In some examples the barrier sensor is to sense the barrier is in a lower fault state or an upper fault state.

In some example vehicle restraint systems disclosed herein, the controller does not enable movement of the barrier toward the operational position when the barrier is in the lower fault state.

In some example vehicle restraint systems disclosed herein, the barrier sensor is to sense that the barrier is in the lower fault state when the barrier is unable to move to the operational position, and the barrier is at a rotational position that is less than a rotational position corresponding to the operational position.

In some example vehicle restraint systems disclosed herein, the barrier sensor is to sense the barrier is in the upper fault state when a rotational position of the barrier exceeds an upper rotational limit of the operational position.

Some example vehicle restraint systems disclosed herein further include a vertical movement sensor to sense a vertical position of the vehicle restraint.

In some example vehicle restraint systems disclosed herein, the controller is to generate an alert in response to the vertical position of the vehicle restraint changing at a rate exceeding a maximum height rate change threshold.

Some example vehicle restraint systems disclosed herein further include a contact switch to detect engagement between the barrier and the RIG.

In some example vehicle restraint systems disclosed herein, the controller is to determine a duration between an initial movement of the barrier toward the operational position and the contact switch activating.

In some example vehicle restraint systems disclosed herein, the controller is to determine the barrier encountered a lower fault state when the duration is less than a minimum actuation time threshold.

In some example vehicle restraint systems disclosed herein, the controller is to determine the barrier encountered an upper fault state when the duration exceeds a maximum actuation time threshold.

Some example non-transitory computer readable storage media disclosed herein comprise computer readable instructions that, when executed, cause a processor to at least determine a presence of a RIG, and enable a barrier to move to an operational position when the RIG is present.

In some example non-transitory computer readable storage media disclosed herein, the instructions, when executed, further cause a processor to determine a distance between a horizontal RIG sensor and the RIG, and enable the barrier to move to the operational position when the distance between the horizontal RIG sensor and the RIG is less than a distance threshold.

In some example non-transitory computer readable storage media disclosed herein, the instructions, when executed, further cause the processor to determine if the RIG is positioned adjacent an end of the barrier prior to the barrier moving to the operational position.

In some example non-transitory computer readable storage media disclosed herein, the instructions, when executed, further cause the processor to not enable movement of the barrier to the operational position when the processor determines that the RIG is present adjacent the end of the barrier while the barrier is in a stored position.

In some example non-transitory computer readable storage media disclosed herein, the instructions, when executed, further cause the processor to determine a rotational position of the barrier relative to an axis of rotation of the barrier, and determine whether the barrier is in a lower fault state or an upper fault state based on the determined rotational position.

In some example non-transitory computer readable storage media disclosed herein, the instructions, when executed, further cause the processor to prevent movement of the barrier to the operational position when the barrier is in the lower fault state.

In some example non-transitory computer readable storage media disclosed herein, the instructions, when executed, further cause the processor to determine the barrier is in the lower fault state when the barrier is unable to move to the operational position and the barrier is at a rotational position that is less than a lower rotational limit example 22 includes the non-transitory computer readable storage medium of example 21, wherein the instructions, when executed, further cause the processor to determine the barrier is in the upper fault state when the barrier exceeds an upper rotational limit.

In some example non-transitory computer readable storage media disclosed herein, the instructions, when executed, further cause the processor to determine a vertical position of a vehicle restraint.

In some example non-transitory computer readable storage media disclosed herein, the instructions, when executed, further cause the processor to generate an alert in response to the vertical position of the vehicle restraint changing at a rate exceeding a maximum height rate change threshold.

In some example non-transitory computer readable storage media disclosed herein, the instructions, when executed, further cause the processor to detect engagement between the barrier and the RIG.

In some example non-transitory computer readable storage media disclosed herein, the instructions, when executed, further cause the processor to determine a duration between an initial movement of the barrier toward the operational position and engagement between the barrier and the RIG.

In some example non-transitory computer readable storage media disclosed herein, the instructions, when executed, further cause the processor to determine the barrier encountered a lower fault state when the duration is less than a minimum actuation time threshold.

In some example non-transitory computer readable storage media disclosed herein, the instructions, when executed, further cause the processor to determine the barrier encountered an upper fault state when the duration exceeds a maximum actuation time threshold.

Some example vehicle restraint systems disclosed herein comprise means for restraining a vehicle at a loading dock, the means for restraining selectively movable between a stored position and an operational position, means for detecting a presence of a RIG of the vehicle, and means for enabling the means for restraining to move to the operational position when the RIG is present.

In some example vehicle restraint systems disclosed herein, the means for detecting the presence of the RIG of the vehicle includes a means for sensing a distance between a reference and the RIG, the means for enabling to enable the means for restraining to move to the operational position when the distance between the reference and the RIG is less than a distance threshold.

In some example vehicle restraint systems disclosed herein, the means for detecting includes a second means for sensing the RIG positioned adjacent an end of the means for restraining.

In some example vehicle restraint systems disclosed herein, the means for enabling is to prevent the means for restraining from moving to the operational position when the second means for sensing senses the RIG positioned adjacent the end of the means for restraining.

Some example vehicle restraint systems disclosed herein further include a means for measuring a rotational position of the means for restraining relative to an axis of rotation of the means for restraining, the means for measuring the rotational position to determine the means for restraining is in a lower fault state or an upper fault state.

In some example vehicle restraint systems disclosed herein, the means for enabling is to prevent movement of the means for restraining toward the operational position when the means for restraining is in the lower fault state.

In some example vehicle restraint systems disclosed herein, the means for measuring the rotational position is to detect that the means for restraining is in the lower fault state when the means for restraining is unable to move to the operational position and the means for restraining is at a rotational position that is less than a lower limit rotational position.

In some example vehicle restraint systems disclosed herein, the means for measuring the rotational position is to determine the means for restraining is in the upper fault state when the rotational position of the means for restraining exceeds an upper rotational limit.

Some example vehicle restraint systems disclosed herein further include a second means for measuring a vertical position of the vehicle restraint system.

In some example vehicle restraint systems disclosed herein, the means for enabling is to generate an alert in response to the vertical position of the vehicle restraint system changing at a rate exceeding a maximum height rate change threshold.

Some example vehicle restraint systems disclosed herein further include a third means for sensing engagement between the means for restraining and the RIG.

In some example vehicle restraint systems disclosed herein, the means for enabling is to determine a duration between an initial movement of the means for restraining toward the operational position and activation of the third means for sensing.

In some example vehicle restraint systems disclosed herein, the means for enabling is to determine the means for restraining encountered a lower fault state when the duration is less than a minimum actuation time threshold.

In some example vehicle restraint systems disclosed herein, the means for enabling is to determine the means for restraining encountered an upper fault state when the duration exceeds a maximum actuation time threshold.

Some example methods disclosed herein comprise determining a presence of a RIG and enabling a barrier to move to an operational position when the RIG is present.

Some example methods disclosed herein further include determining a distance between a horizontal RIG sensor and the RIG and enabling the barrier to move to the operational position when the distance between the horizontal RIG sensor and the RIG is less than a distance threshold.

Some example methods disclosed herein further include detecting that the RIG is positioned adjacent an end of the barrier prior to the barrier moving to the operational position.

Some example methods disclosed herein further include causing a controller to disable movement of the barrier to the operational position when the RIG is present adjacent the end of the barrier while the barrier is in a stored position.

Some example methods disclosed herein further include sensing a rotational position of the barrier relative to an axis of rotation of the barrier, and determining the barrier is in a lower fault state or an upper fault state.

Some example methods disclosed herein further include causing a controller to disable movement of the barrier to the operational position when the barrier is in the lower fault state.

Some example methods disclosed herein further include determining the barrier is in the lower fault state when the barrier is unable to move to the operational position and the barrier is at a rotational position that is less than a lower rotational value of the operational position.

Some example methods disclosed herein further include determining the barrier is in the upper fault state when the barrier exceeds an upper rotational limit of the operational position.

Some example methods disclosed herein further include sensing a vertical position of a vehicle restraint.

Some example methods disclosed herein further include generating an alert in response to the vertical position of the vehicle restraint changing at a rate exceeding a maximum height rate change threshold.

Some example methods disclosed herein further include detecting engagement between the barrier and the RIG.

Some example methods disclosed herein further include determining a duration between an initial movement of the barrier toward the operational position and engagement being detected between the barrier and the RIG.

Some example methods disclosed herein further include detecting the barrier encountered a lower fault state when the duration is less than a minimum actuation time threshold.

Some example methods disclosed herein further include detecting the barrier encountered an upper fault state when the duration exceeds a maximum actuation time threshold.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. A vehicle restraint system comprising:
a main body moveable along a track;
a barrier to restrain a rear impact guard (RIG) of a vehicle, the barrier movable between a stored position and an operational position;
a horizontal RIG sensor carried by the main body and moveable relative to a dock wall of a loading dock, the horizontal RIG sensor to sense a distance between the horizontal RIG sensor and the RIG;
a vertical RIG sensor to detect the RIG positioned above the barrier prior to the controller enabling movement of the barrier to the operational position; and
controller circuitry to enable the barrier to move to the operational position in response to determining that: (1) the distance between the horizontal RIG sensor and the RIG is less than a distance threshold; and (2) the vertical RIG sensor does not detect a presence of the RIG.

2. The vehicle restraint system as defined in claim 1, further including a barrier sensor to sense a rotational position of the barrier relative to an axis of rotation of the barrier.

3. The vehicle restraint system as defined in claim 2, wherein the barrier sensor is to sense the barrier is in a lower fault state or an upper fault state.

4. The vehicle restraint system as defined in claim 3, wherein the controller circuitry does not enable movement of the barrier toward the operational position when the barrier is in the lower fault state.

5. The vehicle restraint system as defined in claim 4, wherein the barrier sensor is to sense that the barrier is in the lower fault state when the barrier is unable to move to the operational position, and the barrier is at a rotational position that is less than a rotational position corresponding to the operational position.

6. The vehicle restraint system as defined in claim 5, wherein the barrier sensor is to sense the barrier is in the upper fault state when a rotational position of the barrier exceeds an upper rotational limit of the operational position.

7. The vehicle restraint system as defined in claim 1, wherein the controller circuitry is to cause an alert device to emit a bump-back alert in response to the controller circuitry determining that the barrier is positioned at an outer limit of a locking range of the barrier.

8. A non-transitory computer readable storage medium comprising computer readable instructions that, when executed, cause a processor to at least:
determine a distance between a horizontal RIG sensor and a rear surface of a rear impact guard (RIG) of a vehicle;
compare the distance to a distance threshold;
determine a presence of the RIG via a vertical RIG sensor spaced from the horizontal RIG sensor; and
enable a barrier to move to an operational position in response to determining that the distance between the horizontal RIG sensor and the RIG is less than the distance threshold and in response to determining that the vertical RIG sensor does not detect a presence of the RIG.

9. The non-transitory computer readable storage medium of claim 8, wherein the instructions, when executed, further cause the processor to:
determine a position of the barrier relative to an axis of rotation of the barrier; and
determine whether the barrier is in a lower fault state or an upper fault state based on the determined rotational position.

10. The non-transitory computer readable storage medium of claim 9, wherein the instructions, when executed, further cause the processor to prevent movement of the barrier to the operational position when the barrier is in the lower fault state.

11. The non-transitory computer readable storage medium of claim 10, wherein the instructions, when executed, further cause the processor to determine the barrier is in the lower fault state when the barrier is unable to move to the operational position and the barrier is at a rotational position that is less than a lower rotational limit.

12. The non-transitory computer readable storage medium of claim 11, wherein the instructions, when executed, further cause the processor to determine the barrier is in the upper fault state when the barrier exceeds an upper rotational limit.

13. The non-transitory computer readable storage medium of claim 11, wherein the instructions, when executed, further cause the processor to cause an alert device to emit a bump-back alert in response to determining that the barrier is positioned at an outer limit of a locking range of the barrier.

14. A method comprising:
   determining, via one or more processors, a distance between a horizontal RIG sensor and a rear impact guard (RIG) of a vehicle;
   comparing, via one or more processors, the distance to a distance threshold;
   determining, via one or more processors, a presence of the RIG via a vertical RIG sensor spaced from the horizontal RIG sensor; and
   enabling, via one or more processors, a barrier to move to an operational position in response to determining that the distance between the horizontal RIG sensor and the RIG is less than a distance threshold and in response to determining that the vertical RIG sensor does not detect a presence of the RIG.

15. The method as defined in claim 14, further including:
   determining a rotational position of the barrier relative to an axis of rotation of the barrier; and
   determining the barrier is in a lower fault state or an upper fault state.

16. The method as defined in claim 15, further including causing a controller to disable movement of the barrier to the operational position when the barrier is in the lower fault state.

17. The method as defined in claim 16, further including determining the barrier is in the lower fault state when the barrier is unable to move to the operational position and the barrier is at a rotational position that is less than a lower rotational value of the operational position.

18. The method as defined in claim 17, further including determining the barrier is in the upper fault state when the barrier exceeds an upper rotational limit of the operational position.

19. The method as defined in claim 14, further including causing an alert device to emit a bump-back alert in response to determining that the barrier is positioned at an outer limit of a locking range of the barrier.

* * * * *